(12) United States Patent
Yoshino

(10) Patent No.: US 11,888,524 B2
(45) Date of Patent: Jan. 30, 2024

(54) COMMUNICATION APPARATUS, AND COMMUNICATION METHOD

(71) Applicant: NIPPON TELEGRAPH AND TELEPHONE CORPORATION, Tokyo (JP)

(72) Inventor: Manabu Yoshino, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 146 days.

(21) Appl. No.: 17/638,831

(22) PCT Filed: Sep. 2, 2019

(86) PCT No.: PCT/JP2019/034396
§ 371 (c)(1),
(2) Date: Feb. 27, 2022

(87) PCT Pub. No.: WO2021/044474
PCT Pub. Date: Mar. 11, 2021

(65) Prior Publication Data
US 2022/0329321 A1 Oct. 13, 2022

(51) Int. Cl.
*H04B 10/272* (2013.01)
*H04L 12/44* (2006.01)
(Continued)

(52) U.S. Cl.
CPC ........... *H04B 10/272* (2013.01); *H04L 12/44* (2013.01); *H04L 12/4641* (2013.01); *H04Q 11/0067* (2013.01)

(58) Field of Classification Search
CPC ... H04B 10/272; H04L 12/44; H04L 12/4641; H04L 12/4645; H04Q 11/0067; H04Q 2011/0064; H04Q 2011/0088
(Continued)

(56) References Cited

U.S. PATENT DOCUMENTS 9,106,332 B2 * 8/2015 Zheng ............... H04Q 11/0067
2009/0162063 A1 * 6/2009 Mizutani .............. H04J 3/1694
398/58

FOREIGN PATENT DOCUMENTS

JP 2015073195 A * 4/2015
JP 2015210551 A * 11/2015
(Continued)

OTHER PUBLICATIONS

NTT Access Network Service Systems Laboratories, Welcome to the FASA Home Page, Nippon Telegraph and Telephone Corporation, Jan. 23, 2018 (Reading Day), http://www.ansl.ntt.co.jp/j/FASA/index.html.
(Continued)

*Primary Examiner* — Abbas H Alagheband
(74) *Attorney, Agent, or Firm* — Harness, Dickey & Pierce, P.L.C.

(57) ABSTRACT

A communication device includes: a first transmission-reception unit connected with a first optical line terminal; a second transmission-reception unit connected with a second optical line terminal; and a control unit, the first transmission-reception unit acquires a control signal having a destination at the second or third optical line terminal from the first optical line terminal, the control unit forwards the control signal toward the second transmission-reception unit connected with the second or third optical line terminal, and the second transmission-reception unit forwards the control signal to the second or third optical line terminal.

12 Claims, 16 Drawing Sheets

(51) Int. Cl.
*H04L 12/46* (2006.01)
*H04Q 11/00* (2006.01)

(58) Field of Classification Search
USPC .......................................................... 398/72
See application file for complete search history.

(56) References Cited

FOREIGN PATENT DOCUMENTS

| WO | WO-2014094268 A1 | * | 6/2014 | ........... H04B 10/032 |
| WO | WO-2016027820 A1 | * | 2/2016 | ............. H04B 10/27 |

OTHER PUBLICATIONS

Junichi Kani and Kenichi Suzuki, Standardization trend of next-generation 10G class PON system, NTT Technology Journal, vol. 21, No. 9, 2009.

* cited by examiner

| TRANSMISSION-RECEPTION UNIT IDENTIFIER (PORT NUMBER) | VLAN |
|---|---|
| 11a-1 | V1 |
| ... | ... |
| 11a-N | V1 |

| TRANSMISSION-RECEPTION UNIT IDENTIFIER (PORT NUMBER) | VLAN IDENTIFIER (VLAN ID) |
|---|---|
| 11b-1 | V1 |
| ... | ... |
| 11b-N | V2 |

| TRANSMISSION-RECEPTION UNIT IDENTIFIER (PORT NUMBER) | VLAN IDENTIFIER (VLAN ID) |
|---|---|
| V1 | V2 |
| V2 | V1 |
| ... | ... |

| PRE-REPLACEMENT OLT MAC ADDRESS | POST-REPLACEMENT OLT MAC ADDRESS |
|---|---|
| A1 | A2 |
| ... | ... |

Fig. 19

| FUNCTION GROUP | FUNCTION | EXTENSION EXAMPLE BY USE OF FASA APPLICATION API | APPLICATION/BOARD |
|---|---|---|---|
| PON MAIN SIGNAL PROCESSING | BASIC FUNCTION | STANDARD-COMPLIANT FRAME/HEADER GENERATION AND SEPARATION, FRAGMENT PROCESSING, SCRAMBLER, FEC, ENCRYPTION | BOARD |
| PON ACCESS CONTROL | ONU REGISTRATION/AUTHENTICATION | UNIQUE AUTHENTICATION PROCEDURE (ABUSE PREVENTION) | APPLICATION |
| | DBA | STANDARD-COMPLIANT DBA FRAME PROCESSING (FOR EXAMPLE, FRAME HEADER READING AND WRITING) | BOARD |
| | DBA | HANDLING OF UNIQUE QoS DEFINITION (DELAY, FAIRNESS, BAND USAGE EFFICIENCY, AND THE LIKE) | APPLICATION |
| | DBA | HANDLING OF SERVICE REQUEST (FOR EXAMPLE, LOW-LATENCY REQUEST FOR MOBILE PROVISION) | APPLICATION |
| | DBA | HANDLING OF PROGRAM ENCRYPTION | APPLICATION |
| | DWA | STANDARD-COMPLIANT WAVELENGTH SWITCHING SEQUENCE (ITU-T G.989.3) | BOARD |
| | DWA | HANDLING OF UNIQUE QoS DEFINITION (DELAY, FAIRNESS, AND THE LIKE) | APPLICATION |
| | DWA | SECUREMENT OF CONSISTENCY WITH UNIQUE MAINTENANCE-MANAGEMENT SYSTEM | APPLICATION |
| | DWA | CHARACTERISTIC IMPROVEMENT THROUGH COOPERATION WITH TRAFFIC MONITOR | APPLICATION |
| | DoS COUNTERMEASURE | APPLICATION OF UNIQUE FILTER (FOR EXAMPLE, MATCH WITH SPECIFIC FIELD AND FLOW RATE EQUAL TO OR HIGHER THAN CERTAIN VALUE) | APPLICATION |
| | SNI PORT | PROVISION OF MIRRORING PORT, PROVISION OF MULTICAST PORT, AND SPECIFICATION OF CONNECTOR TYPE, TRANSMISSION AND RECEPTION FRAMES, AUTO-NEGOTIATION, AND TRANSMISSION MEDIUM | BOARD |
| | BRIDGE FUNCTION | STANDARD-COMPLIANT BRIDGE PROCESSING (MAC ADDRESS LEARNING, IEEE 802.1Q VLAN tag PROCESSING, AND THE LIKE) | BOARD |
| | TRAFFIC MONITOR | PROVISION OF TRAFFIC MONITOR (SPECIFIC ITEMS NEED TO BE DEFINED IN SPECIFICATIONS) | BOARD |
| L2 MAIN SIGNAL PROCESSING | CONCENTRATOR | PROVISION OF POLICING FUNCTION, PROVISION OF METER/MARKER | BOARD |
| | CONCENTRATOR | HANDLING OF UNIQUE QoS DEFINITION (DELAY, PACKET LOSS, FAIRNESS, AND THE LIKE) | APPLICATION |
| | PRIORITY PROCESSING | PROVISION OF STANDARD-COMPLIANT QUEUE/SCHEDULAR (SPQ) | BOARD |
| | PRIORITY PROCESSING | HANDLING OF UNIQUE QoS DEFINITION (DELAY, PACKET LOSS, FAIRNESS, AND THE LIKE) | APPLICATION |
| | VLAN MANAGEMENT | SECUREMENT OF CONSISTENCY WITH UNIQUE MAINTENANCE-OPERATION SYSTEM (FOR EXAMPLE, WAY OF USING VLAN IN PON INTERVAL) | APPLICATION |

Fig. 20

| FUNCTION GROUP | FUNCTION | | EXTENSION EXAMPLE BY USE OF FASA APPLICATION API | APPLICATION/BOARD |
|---|---|---|---|---|
| MAINTENANCE-OPERATION | MAINTENANCE-OPERATION FRAME PROCESSING | | STANDARD-COMPLIANT MAINTENANCE-OPERATION FRAME (OMCI, PLOAM, OAM) PROCESSING | BOARD |
| | MAINTENANCE-OPERATION PORT/MONITORING-CONTROL PORT | | SPECIFICATION OF CONNECTOR, TRANSMISSION AND RECEPTION FRAMES (Ethernet), AUTO-NEGOTIATION, AND TRANSMISSION MEDIUM | BOARD |
| | | SBI | TIMING CONTROL FUNCTION FOR COMMUNICATION OF CONTROL SIGNAL WITH CONTROLLER AND COOPERATION WITH OTHER TRANSMISSION DEVICE AND SERVER BY ONU AND OLT | APPLICATION |
| | | SETTING | PROVISION OF CLI | BOARD |
| | | | HANDLING (FOR EXAMPLE, PROVISION OF UPDATE MEANS) OF FASA APPLICATION ADDITION AND CHANGE | APPLICATION |
| | | | SECUREMENT OF CONSISTENCY WITH UNIQUE MAINTENANCE-OPERATION SYSTEM (PROTOCOL OF CONNECTION WITH MAINTENANCE-OPERATION SYSTEM, EXCHANGE PARAMETER, AND THE LIKE; FOR EXAMPLE, ACQUISITION OF USER CONTRACT SERVICE) | APPLICATION |
| | | MANAGEMENT | HANDLING OF UNIQUE SOFTWARE UPDATE SCHEME (FORWARDING SCHEME, UPDATE TIMING, UPDATE PROCESSING TIME, INTERRUPTION TIME ALLOWANCE, AND THE LIKE) | APPLICATION |
| | | | SECUREMENT OF CONSISTENCY WITH UNIQUE MAINTENANCE-OPERATION SYSTEM (ONU SETTING AND THE LIKE) | APPLICATION |
| | | | UNIQUE LOG STORING MEANS (THE NUMBER OF STORED ENTRIES, FORMAT, AND THE LIKE) | APPLICATION |
| | | MONITORING-CONTROL | PROVISION OF SNMP AGENT | BOARD |
| | | | PROVISION OF Ether-OAM | BOARD |
| | | | SECUREMENT OF CONSISTENCY WITH UNIQUE MAINTENANCE-OPERATION SYSTEM (SETTING OF ALERT NOTIFICATION PORT, ALERT NOTIFICATION PROTOCOL, AND THE LIKE) | APPLICATION |
| | | | HANDLING OF UNIQUE MONITORING ITEMS AND UNIQUE ALERT ISSUING CONDITIONS | APPLICATION |
| | | TEST | HANDLING OF UNIQUE TEST (ROUND-TRIP DELAY TIME MEASUREMENT) AND THE LIKE | APPLICATION |
| PON MULTICAST | IP MULTICAST | | MULTICAST FRAME (IGMP AND MLD) PROCESSING | BOARD |
| | FILTER SETTING | | APPLICATION OF UNIQUE FILTER (SCHEME USING VLAN/MAC ADDRESS AND THE LIKE) | APPLICATION |
| | MULTICAST PROXY | | UNIQUE QoS DEFINITION (Zapping PERFORMANCE, RELIABILITY, AND THE LIKE) | APPLICATION |
| POWER SAVING CONTROL | ONU POWER SAVING | | SECUREMENT OF CONSISTENCY WITH UNIQUE SERVICE (FOR EXAMPLE, VIDEO SERVICE) AND THE LIKE COMPLIANT WITH STANDARD-COMPLIANT SEQUENCE (ITU-T G.989.3 AND IEEE 1904.1) | BOARD |
| | | | HANDLING OF UNIQUE QoS DEFINITION (DELAY TIME AND THE LIKE) | APPLICATION |
| | OLT POWER SAVING | | PROVISION OF STATE TRANSITION NECESSARY FOR OLT POWER SAVING | BOARD |
| | | | HANDLING OF UNIQUE QoS DEFINITION (DELAY TIME AND THE LIKE) | APPLICATION |
| FREQUENCY/TIME SYNCHRONIZATION | SYNCHRONIZATION MEANS | | STANDARD-COMPLIANT (IEEE 1588 AND THE LIKE) SYNCHRONIZATION SCHEME | BOARD |
| | | | SECUREMENT OF CONSISTENCY WITH UNIQUE SERVICE | APPLICATION |
| PROTECTION | PROTECTION | | PROVISION OF STATE TRANSITION NECESSARY FOR PROTECTION (NEED TO BE DEFINED IN SPECIFICATIONS) | BOARD |
| | | | HANDLING OF UNIQUE QoS DEFINITION (INTERRUPTION TIME AND THE LIKE) | APPLICATION |
| | | | HANDLING OF MULTIPLE REDUNDANT CONFIGURATIONS (SW REDUNDANCY, OSU REDUNDANCY, 1+1 REDUNDANCY, N:1 REDUNDANCY, AND THE LIKE) | APPLICATION |

COMMUNICATION APPARATUS, AND COMMUNICATION METHOD

CROSS-REFERENCE TO RELATED APPLICATIONS

This application is a 371 U.S. National Phase of International Application No. PCT/JP2019/034396, filed on Sep. 2, 2019. The entire disclosure of the above application is incorporated herein by reference.

TECHNICAL FIELD

The present invention relates to a communication device and a communication method.

BACKGROUND ART

A communication system including a communication device is, for example, a passive optical network (PON) system. The PON system includes an optical network unit (ONU) installed in a customer house or the like, an optical line terminal (OLT) that is a communication device installed in a station, and an optical distribution network (ODN). In the ODN, a plurality of ONUs and a plurality of OLTs are connected in some cases.

In a communication device, a function having low dependency related to at least one of a compliant standard, a generation, a scheme, a system, an instrument type, and a manufacturing vendor of the device is implemented as a component, and at least part of an input-output interface (IF) of the function, such as an application programming interface (API) or an application binary interface (ABI) is clarified to increase versatility, portability, and scalability, thereby facilitating sharing and unique function addition among instruments for which at least one of the compliant standard, the generation, the scheme, the system, the instrument type, and the manufacturing vendor is different (refer to Non-Patent Literature 1).

An Ethernet (registered trademark; the same notation applies below) switch (SW) deployed at an OLT forwards a signal to the OLT with a destination at the media access control (MAC) address of the OLT (transmission source MAC address) in some cases (refer to Non-Patent Literature 2). This signal is, for example, a signal related to dynamic bandwidth assignment (DBA), such as a gate or a grant, among control signals. Such control signal forwarding occurs, for example, when bands or a medium such as an optical fiber and wavelength regions of the medium are shared by a plurality of OLTs or when DBA is performed outside the OLT.

CITATION LIST

Patent Literature

Non-Patent Literature 1: "Welcome to FASA home page", [online], NTT access service laboratory, [searched on Feb. 8, 2017], the Internet <URL: http://www.ansl.ntt.co.jp/j/FASA/index.html>
Non-Patent Literature 2: "Standardization trend of next-generation 10G PON system", NTT technology journal 2009.9

SUMMARY OF THE INVENTION

Technical Problem

However, in virtualization such as network functions virtualization (NFV) or software-defined networking (SDN), a configuration of a physical network is sometimes hidden from a higher-level layer that uses a logical network. Thus, the identifier (for example, MAC address) of a device (actual device) included in the physical network needs to be hidden from the higher-level layer.

The present invention is intended to solve the above-described problem and provide a communication device and a communication method that are capable of hiding a configuration of a physical network, in particular, an identifier of an actual device from a higher-level layer.

Means for Solving the Problem

An aspect of the present invention is a communication device including: a first transmission-reception unit being connected with a first optical line terminal; a second transmission-reception unit being connected with a second optical line terminal replaceable with a third optical line terminal; and a control unit, and the communication device executes any of processing in which the first transmission-reception unit acquires a control signal having a destination at the second or third optical line terminal from the first optical line terminal, the control unit forwards the control signal to the second transmission-reception unit connected with the second or third optical line terminal, and the second transmission-reception unit forwards the control signal to the second or third optical line terminal, and processing in which the second transmission-reception unit acquires a control signal having a destination at the first optical line terminal from the second or third optical line terminal, the control unit forwards the control signal to the first transmission-reception unit connected with the first optical line terminal, and the first transmission-reception unit forwards the control signal to the first optical line terminal.

Effects of the Invention

According to the present invention, it is possible to hide the configuration of a physical network, in particular, the identifier of an actual device from a higher-level layer.

BRIEF DESCRIPTION OF DRAWINGS

FIG. 19 is a diagram illustrating a first example of main functions of an access system and a FASA application targets in the embodiment.

FIG. 20 is a diagram illustrating a second example of the main functions of the access system and the FASA application targets in the embodiment.

DESCRIPTION OF EMBODIMENTS

Figure 1:
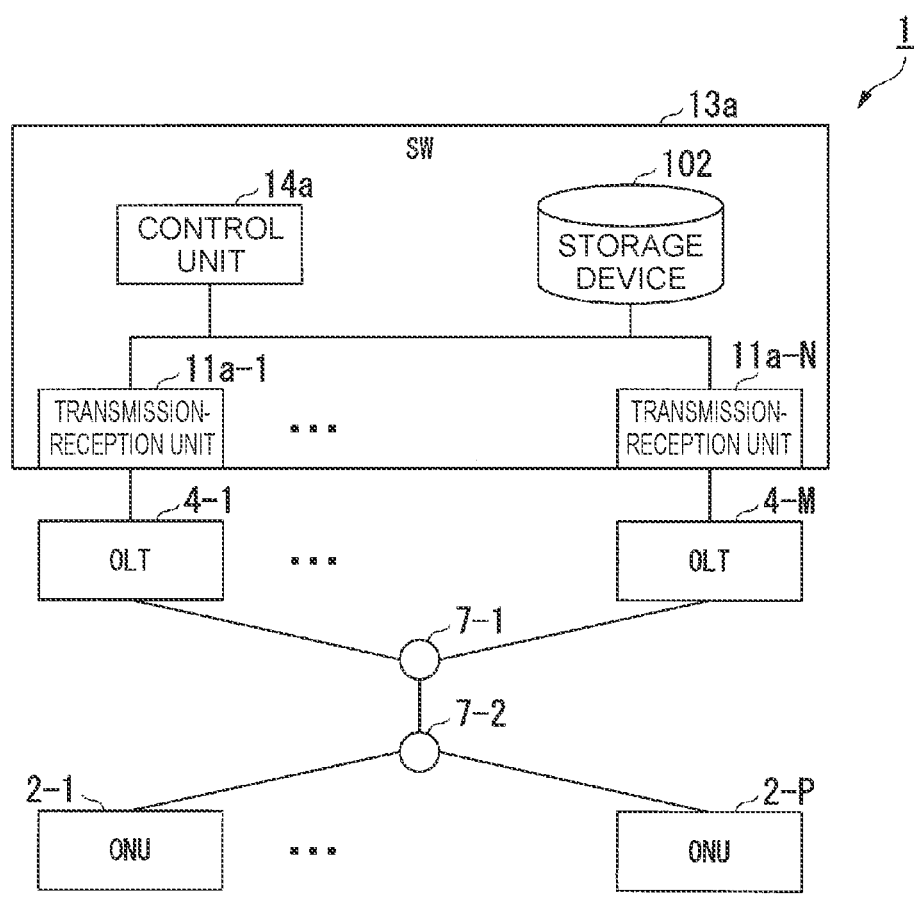
FIG. 1 is a diagram illustrating a first example of a configuration of a communication system in which a port-based VLAN is used for control signal forwarding in an embodiment.

A communication system includes, as communication devices, for example, a small form-factor pluggable (SFP) OLT, a calculation unit (such as a server) at which a predetermined function is deployed, and a switch (SW) connecting the SFP OLT and the calculation unit. The OLTs are not limited to SFP OLTs but may be any OLTs sharing a medium such as an optical fiber and wavelength regions of the medium.

The SFP OLT includes, for example, an optical signal module, an OLT management module, a DBA module, and a forwarding module. The optical signal module transmits and receives optical signals between the SFP OLT and an ONU. The OLT management module communicates with any other module included in the OLT. The DBA module permits the ONU to transmit a frame in accordance with a report or the like received from the ONU. The forwarding module forwards, into the switch, the frame received from the ONU.

The switch forwards an OLT main signal between a communication device (hereinafter referred to as an "upstream device") positioned upstream in a signal flow and a communication device (hereinafter referred to as a "downstream device") positioned downstream in the signal flow. The switch forwards an OLT control signal to the calculation unit (such as a server) at which a predetermined function is deployed. The OLT control signal is, for example, a DBA signal such as a GATE or a grant, which is a transmission permit, an ONU management control interface (OMCI), or operation administration and maintenance (OAM). The switch may forward the OLT control signal to another OLT.

The OLT control signal is forwarded, for example, in a case in which a medium such as an optical fiber and wavelength regions of the medium are shared by a plurality of OLTs, or when cooperative control is performed with another OLT in a case of congestion control at the upstream device after merging.

The case in which a medium such as an optical fiber and wavelength regions of the medium are shared by a plurality of OLTs is, for example, a case in which an upstream signal wavelength (upstream wavelength) is not shared but a downstream signal wavelength (downstream wavelength) is shared, an ONU is notified of a transmission permit by each of the plurality of OLTs or a representative OLT among the plurality of OLTs is notified of a transmission permit by an ONU. Alternatively, the case is, for example, a case in which a downstream wavelength is not shared but an upstream wavelength is shared, and a time slot used for communication is cooperatively shared by the plurality of OLTs.

The representative OLT among the plurality of OLTs may collectively calculate a plurality of transmission permits and transmit the plurality of collected transmission permits to an ONU. The representative OLT for the calculation and the representative OLT for the notification may be different or the same. Alternatively, a device other than an OLT may collectively or dispersedly calculate transmission permits of the plurality of OLTs and transmit the plurality of collected or dispersed transmission permits to an ONU. In a case in which the representative OLT transmits transmission permits of the plurality of OLTs, the representative OLT may transmit downstream data in place of another OLT.

The OLT control signal is forwarded by any method. For example, the OLT control signal is forwarded through an Ethernet switch by an Ethernet frame having a destination at an identifier of an OLT as an actual device, such as a media access control (MAC) address.

An OLT transmits and receives optical signals to and from an ONU. OLTs sharing a band of an upstream or downstream device or sharing the same core line or wavelength communicate with each other. Management modules that manage an OLT may communicate with each other. In DBA, a declaration (report, band request, transmission request) transmitted by an ONU and received is identified, and a permit (transmission permit, gate, or grant) corresponding to the declaration is generated. In a transmission permit, a time slot of an upstream data burst is specified. In DBA, an OLT may include a transmission permit in a notification frame of another OLT. The forwarding module forwards the notification frame to the switch (SW) of a network device.

The MAC address of an OLT does not necessarily need to be used as the destination of the OLT.

In a modification, the optical signal module is an enhanced small form-factor pluggable (SFP+) transceiver including a MAC layer. Independent wavelengths may be used in upstream communication and downstream communication, respectively, for an OLT and another OLT.

Subsequently, an OLT or management module that governs DBA or the like identifies a transmission permit including a permit from another OLT.

For example, a second declaration received from a second ONU of a different OLT is identified. In response, a second permit corresponding to a second report may be generated and included in a transmission permit having a destination at the second ONU in DBA.

In upstream communication between an OLT and another OLT, wavelengths overlapping with each other may be used. The switch forwards a data frame received at each OLT.

The switch may process the notification frame with the highest priority. Description is made with an example in which an OLT of an EPON of 1 Gbit/s (1G) and an OLT of an EPON of 10 Gbit/s (10G) coexist on one fiber.

The form of a small form-factor pluggable (SFP) or enhanced small form-factor pluggable (SFP+) transceiver module, a small form-factor pluggable (XFP) transceiver, a visa box, an enclosure, or the like is used for an OLT. In a case of the shape of an SFP, an SFP+, an XFP, or the like, the OLT may be inserted into a port of the switch and used. In a case of a visa box or an enclosure, the OLT may be connected with the switch through an interface of 1000BASE-T, 10GBASE-T, or the like or may include the switch. The OLT is connected with a core fiber through an optical multiplexer/demultiplexer or the like.

In this case, the coexistence of the 1G EPON and the 10G EPON requires MAC operation integrated for data rates of both networks.

The switch may forward an Ethernet frame between OLTs. The switch is coupled with one or a plurality of external devices. The switch may forward an Ethernet frame received from an OLT to the one or a plurality of external devices.

An OLT may include an IEEE 802.3 media access controller (MAC) layer and a 802.3 physical (PHY) layer or part thereof. Communication between MAC layers may be performed through the switch.

Each MAC layer is connected with each of 1G and 10G PHY layers. In the downstream direction, the MAC layer broadcasts Ethernet traffic through each or one of the 1G and 10G PHY layers. In the upstream direction, the MAC layer executes dynamic bandwidth assignment (DBA). DBA is used to arbitrate upstream traffic from 1G and 10G ONUs. For coexistence of 1G and 10G ONUs, a plurality of MAC layers may be integrated as a single MAC layer service. In addition, forward error correction (FEC) may be executed in both the downstream direction and the upstream direction.

Coupling with an upstream device is made through some interfaces in an Ethernet switch. Each interface may be a media-independent interface (MII), a gigabit MII (GMII), a 10-gigabit MII (XGMII), a 10-bit parallel interface (TBI), or the like but is not limited to these examples. A PON system may include a built-in microprocessor that enables EPON management and control.

MAC layers may operate in parallel within a single chip, and PHY layers may operate in parallel within a single transceiver module. The transceiver module may include a transmitter for both the 1G and 10G EPONs and a receiver for the 1G or 10G EPON. For compatibility with both the 1G and 10G EPONs, the transmitter and the receiver may include a burst receiver and two continuous-transmitters.

The switch can connect traffic of a MAC chip of an EPON to an uplink port. A plurality of ports may be included in a single MAC chip.

When a core wire and a wavelength or a band in the upstream direction are shared, schedulers for DBA of 1G and 10G OLTs may not individually generate upstream scheduling transmission permits for 1G and 10G ONUs, only one of the schedulers may generate upstream scheduling transmission permits for both the 1G and 10G ONUs, the other scheduler may be disabled, the switch may forward the permits for the ONUs to the other OLT, and the other OLT may forward the permits through a wavelength used for downstream communication thereof.

An OLT or management module that schedules signal transmission of an ONU forwards a signal transmission permit to the ONU. The destination of the transmission permit forwarded to the ONU may be the OLT that forwards the transmission permit.

Embodiments of the present invention will be described below in detail with reference to the accompanying drawings.

Hereinafter, a communication system is, for example, a PON system. Hereinafter, a communication device may be used in a PON system alone, may be used in a cascade-connected PON system (cascade PON system), or may be used in a combination of a plurality of access systems that share a band of an upstream or downstream device.

FIG. 1 is a diagram illustrating a first example of the configuration of a communication system 1 in which a port-based virtual local area network (VLAN) is used for control signal forwarding. The communication system 1 includes ONUs 2-1 to 2-P (P is an integer equal to or larger than one), OLTs 4-1 to 4-M (M is an integer equal to or larger than one), optical multiplexer/demultiplexers 7-1 and 7-2, and a SW 13a (switch unit). In FIG. 1, the SW 13a includes transmission-reception units 11a-1 to 11a-N (N is an integer equal to or larger than one), a control unit 14a, and a storage device 102.

Figures 2, 3:
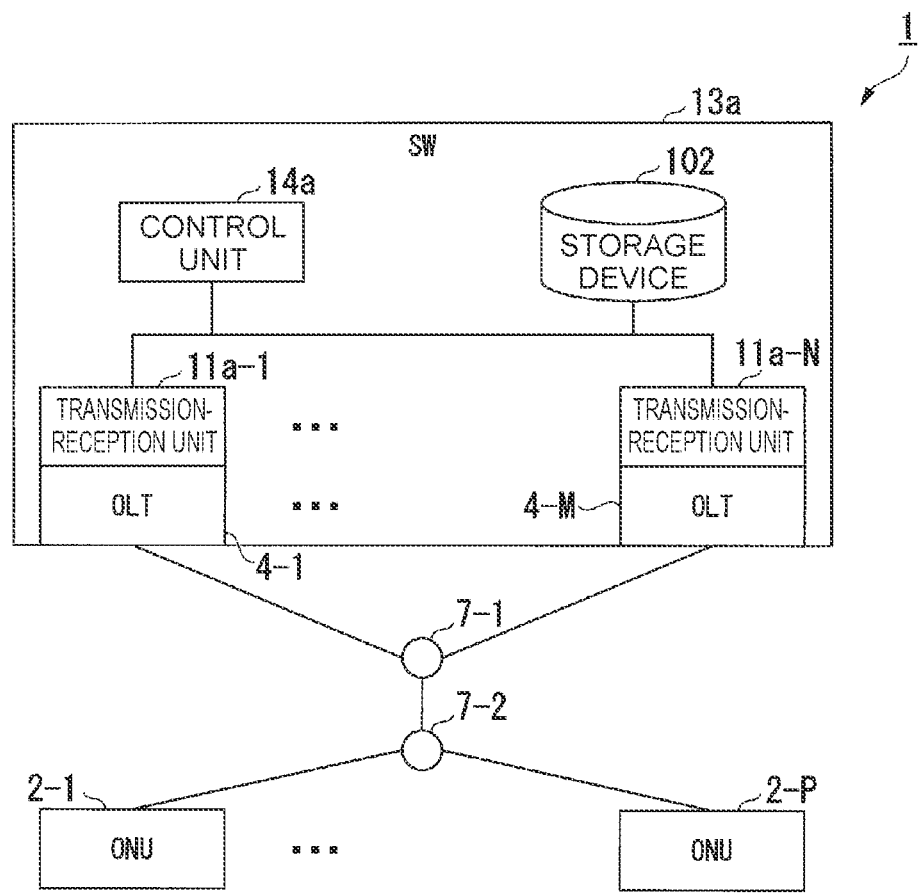
FIG. 2 is a diagram illustrating a second example of the configuration of the communication system in which a port-based VLAN is used for control signal forwarding in the embodiment.
FIG. 3 is a diagram illustrating a first example of correspondence between an identifier of a transmission-reception unit and an identifier of a VLAN in the embodiment.

FIG. 2 is a diagram illustrating a second example of the configuration of the communication system 1 in which a port-based VLAN is used for control signal forwarding. In FIG. 2, the SW 13a includes the transmission-reception units 11a-1 to 11a-N, the control unit 14a, and the storage device 102. The SW 13a may include the OLTs 4-1 to 4-M.

Each transmission-reception unit 11a (communication unit) is a port (physical interface). The transmission-reception unit 11a may be connected with the corresponding OLT 4. The OLT 4 is, for example, a SFP OLT. Hereinafter, the OLT 4 is replaceable (changeable) with a new OLT 4 for a reason such as failure. Note that although it is described that one of the OLTs is replaceable, the other OLT may be replaceable, both may be replaceable, or no replaceable OLT may be replaced.

In FIGS. 1 and 2, the port-based VLAN is used in place of a destination MAC address not for priority control but for control signal forwarding. In other words, the communication system 1 performs control signal forwarding by using the port-based VLAN. At control signal forwarding between OLTs, it is assumed that the OLTs perform transmission and reception even when at least the MAC address of an OLT to be replaced is different. In other words, in a case in which an OLT on the transmitting side is replaced, a control signal is transmitted and received even when a source MAC address is different. In a case in which an OLT on the receiving side is replaced, a control signal is transmitted and received even when a destination MAC address is different. When reception is impossible, an configuration example for rewriting a MAC address, which will be described later, is combined with the configuration examples in FIGS. 1 and 2. The storage device 102 stores a data table indicating the correspondence between the identifier of a transmission-reception unit and a VLAN.

FIG. 3 is a diagram illustrating a first example of the correspondence between the identifier (port number) of a transmission-reception unit and a VLAN. In FIG. 3, as an example, a transmission-reception unit identifier "11a-1" and a VLAN "V1" are associated with each other. A transmission-reception unit identifier "11a-N" and the VLAN "V1" are associated with each other.

In FIGS. 1 and 2, each ONU 2 communicates an optical signal such as a control signal with each OLT 4 through the optical multiplexer/demultiplexer 7-1 and the optical multiplexer/demultiplexer 7-2. The optical multiplexer/demultiplexer 7-1 demultiplexes an upstream optical signal. The optical multiplexer/demultiplexer 7-1 multiplexes downstream optical signals. The optical multiplexer/demultiplexer 7-2 multiplexes upstream optical signals. The optical multiplexer/demultiplexer 7-2 demultiplexes a downstream optical signal. The OLT 4 converts an optical signal such as a control signal that is received into an electric signal. The OLT 4 forwards the received control signal (electric signal) to the transmission-reception unit 11a connected with the OLT.

The control unit 14a forwards the control signal based on the data table indicating the correspondence between the identifier of a transmission-reception unit and a VLAN by using the port-based VLAN. For example, the control unit 14a forwards the control signal to the transmission-reception unit 11a-N to which the VLAN "V1" same as the VLAN "V1" allocated to the transmission-reception unit 11a-1 having acquired the control signal is allocated, based on the VLAN.

The control unit 14a may forward the control signal to a transmission-reception unit 11a and an OLT 4 to which the same VLAN is allocated. For example, the control unit 14a may forward, to the transmission-reception unit 11a-N and the OLT 4-M, the control signal forwarded to the transmission-reception unit 11a-1.

In other words, the control unit 14a forwards a control signal toward the transmission-reception unit 11a connected with the replaceable OLT 4 to which a VLAN same as a VLAN allocated to the transmission-reception unit 11a having acquired the control signal from the OLT 4 as a communication counterpart of the replaceable OLT 4 is allocated, or forwards a control signal toward the transmission-reception unit 11a connected with the OLT 4 as a communication counterpart to which a VLAN same as a VLAN allocated to the transmission-reception unit 11a having acquired the control signal from the replaceable OLT 4 is allocated.

Note that when a downstream or upstream user signal is to be transmitted from one of OLTs, an OLT not transmitting the signal may forward the user signal toward the OLT transmitting the signal, or the switch may forward the user signal not through the OLT not transmitting the signal.

A tagged virtual local area network (tagged VLAN) may be used in place of the port-based VLAN. Specifically, the communication system 1 forwards a control signal by using a tagged VLAN in place of a destination MAC address not for priority control but for control signal forwarding. A tag may be applied by an OLT 4 or a transmission-reception unit 11a. This applies to the following examples. The storage device 102 stores a data table indicating the correspondence between the identifier of a transmission-reception unit and the identifier (VLAN ID or VID) of a VLAN.

FIG. 3 is understood instead as a diagram illustrating a first example of the correspondence between the identifier (port number) of a transmission-reception unit and the identifier of a VLAN. In FIG. 3, as an example, the transmission-reception unit identifier "11a-1" and the VLAN identifier "V1" are associated with each other. The transmission-reception unit identifier "11a-N" and the VLAN identifier "V1" are associated with each other.

In FIGS. 1 and 2, each ONU 2 communicates an optical signal such as a control signal with each OLT 4 through the optical multiplexer/demultiplexer 7-1 and the optical multiplexer/demultiplexer 7-2. The optical multiplexer/demultiplexer 7-1 demultiplexes an upstream optical signal. The optical multiplexer/demultiplexer 7-1 multiplexes downstream optical signals. The optical multiplexer/demultiplexer 7-2 multiplexes upstream optical signals. The optical multiplexer/demultiplexer 7-2 demultiplexes a downstream optical signal. The OLT 4 converts an optical signal such as a control signal that is received into an electric signal. The OLT 4 forwards the received control signal (electric signal) to a transmission-reception unit 11a connected with the OLT.

The control unit 14a forwards the control signal based on a data table indicating the correspondence between the identifier of a transmission-reception unit and the identifier of a VLAN by using the tagged VLAN. For example, the control unit 14a forwards the control signal to the transmission-reception unit 11a-N to which the VLAN identifier "V1" same as the VLAN identifier "V1" allocated to the transmission-reception unit 11a-1 having acquired the control signal is allocated, based on the VLAN identifier.

The control unit 14a may forward the control signal to the transmission-reception unit 11a and the OLT 4 to which the same VLAN identifier is allocated. For example, the control unit 14a may forward, to the transmission-reception unit 11a-N and the OLT 4-M, the control signal forwarded to the transmission-reception unit 11a-1.

In other words, the control unit 14a forwards a control signal toward the transmission-reception unit 11a having acquired the control signal from the OLT 4 as a communication counterpart of the replaceable OLT 4 or the transmission-reception unit 11a to which a VLAN identifier same as a VLAN identifier allocated to the OLT 4 as the communication counterpart of the replaceable OLT 4 is allocated or toward a transmission-reception unit connected with an OLT as a communication counterpart of a replaceable OLT or the transmission-reception unit 11a connected with a pre-replacement or post-replacement OLT to which the VLAN identifier same as the VLAN identifier allocated to the replaceable OLT is allocated, based on the VLAN identifier. The control unit 14a forwards a control signal toward the transmission-reception unit 11a having acquired the control signal from a replaceable OLT or the transmission-reception unit 11a to which a VLAN identifier same as a VLAN identifier allocated to a pre-replacement OLT 4 is allocated or, the transmission-reception unit 11a connected with the replaceable OLT or toward the transmission-reception unit 11a connected with the OLT 4 as a communication counterpart to which the VLAN identifier same as the VLAN identifier allocated to the pre-replacement OLT 4 is allocated, based on the VLAN identifier.

Figure 4:
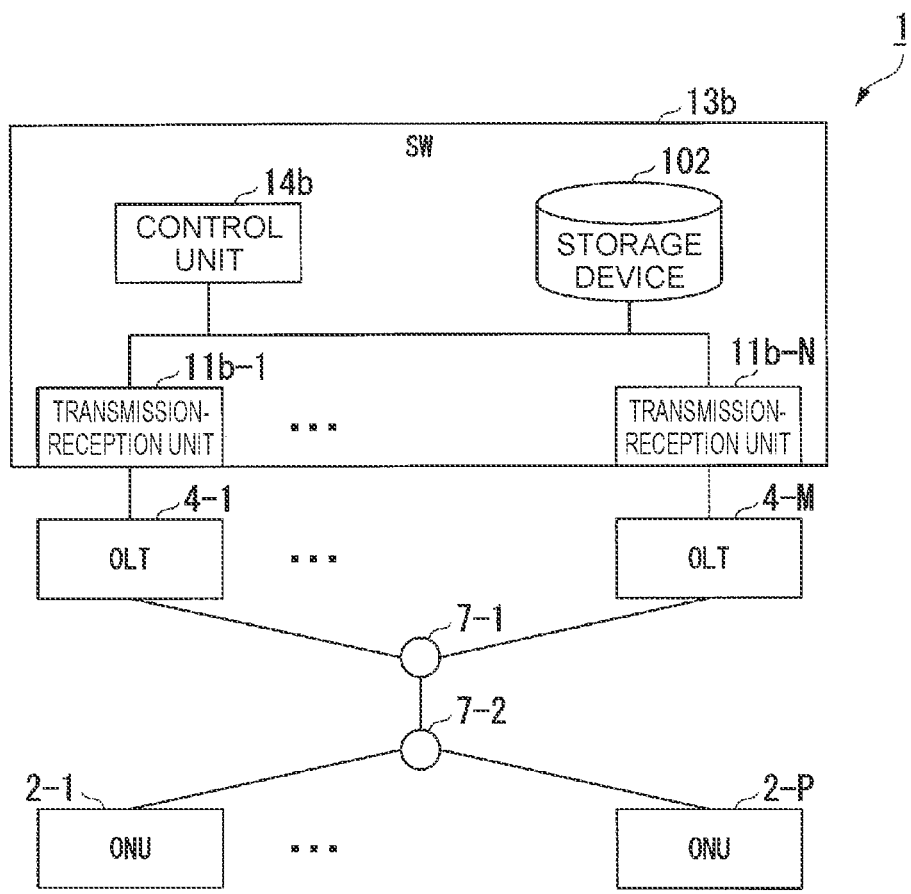
FIG. 4 is a diagram illustrating a first example of a configuration of a communication system in which a tagged VLAN is used for control signal forwarding in the embodiment.

FIG. 4 is a diagram illustrating a first example of the configuration of the communication system 1 in which a tagged VLAN is used for control signal forwarding. The communication system 1 includes the ONUs 2-1 to 2-P, the OLTs 4-1 to 4-M, the optical multiplexer/demultiplexers 7-1 and 7-2, and a SW 13*b* (switch unit). In FIG. 4, the SW 13*b* includes transmission-reception units 11*b*-1 to 11*b*-N, a control unit 14*b*, and the storage device 102.

Figures 5, 6:
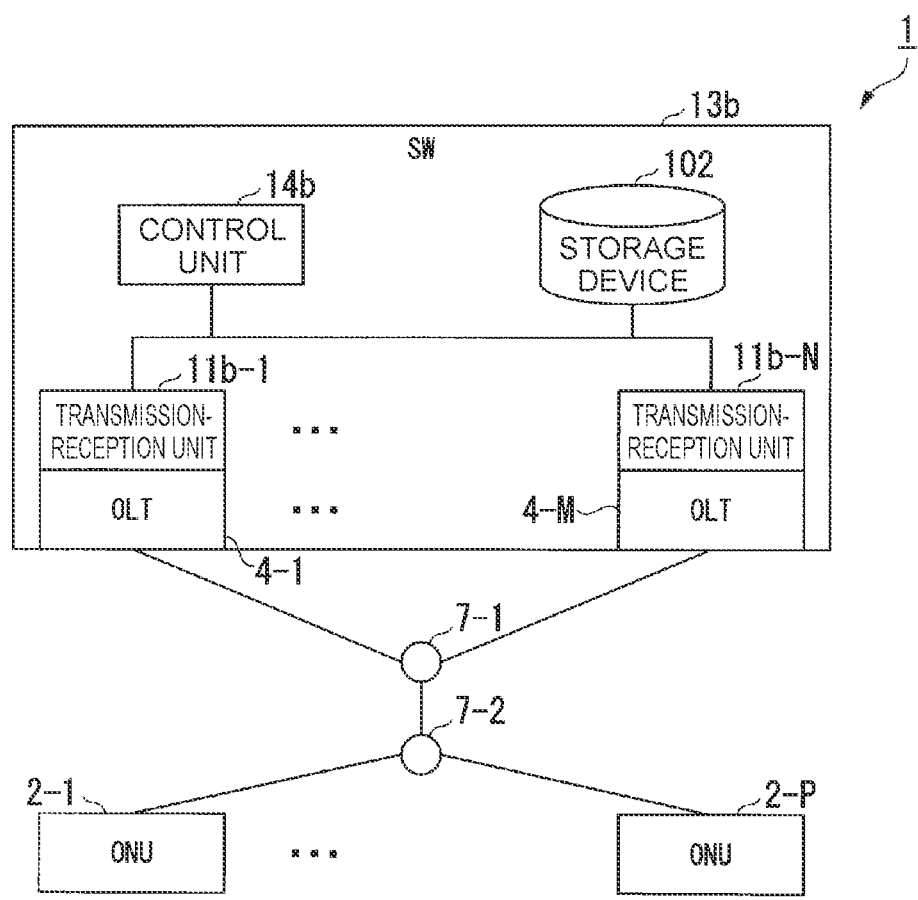
FIG. 5 is a diagram illustrating a second example of the configuration of the communication system in which a tagged VLAN is used for control signal forwarding in the embodiment.
FIG. 6 is a diagram illustrating a second example of the correspondence between the identifier of a transmission-reception unit and the identifier of a VLAN in the embodiment.

FIG. 5 is a diagram illustrating a second example of the configuration of the communication system 1 in which a tagged VLAN is used for control signal forwarding. In FIG. 5, the SW 13*b* includes the transmission-reception units 11*b*-1 to 11*b*-N, the control unit 14*b*, and the storage device 102. The SW 13*b* may include the OLTs 4-1 to 4-M.

Each transmission-reception unit 11*b* (communication unit) is a port (physical interface). The transmission-reception unit 11*b* may be connected with an OLT 4.

In FIGS. 4 and 5, a tagged VLAN is used in place of a destination MAC address not for priority control but for control signal forwarding. For example, the control unit 14*b* converts the VLAN identifier "V1" written in the header of a control signal acquired by the transmission-reception unit 11*b*-1 into a VLAN identifier "V2" of the transmission-reception unit 11*b*-N. The control unit 14*b* forwards a control signal to which the post-conversion VLAN identifier "V2" is written to the transmission-reception unit 11*b*-N based on the post-conversion VLAN identifier "V2". The storage device 102 stores a data table indicating the correspondence between the identifier (port number) of a transmission-reception unit and the identifier of a VLAN.

FIG. 6 is a diagram illustrating a second example of the correspondence between the identifier (port number) of a transmission-reception unit and the identifier (VLAN ID) of a VLAN. In FIG. 6, as an example, the transmission-reception unit identifier "11*b*-1" and the VLAN identifier "V1" are associated with each other. The transmission-reception unit identifier "11*b*-N" and the VLAN identifier "V2" are associated with each other.

The storage device 102 stores a data table indicating the correspondence between a pre-conversion VLAN identifier and a post-conversion VLAN identifier.

Figures 7, 8:
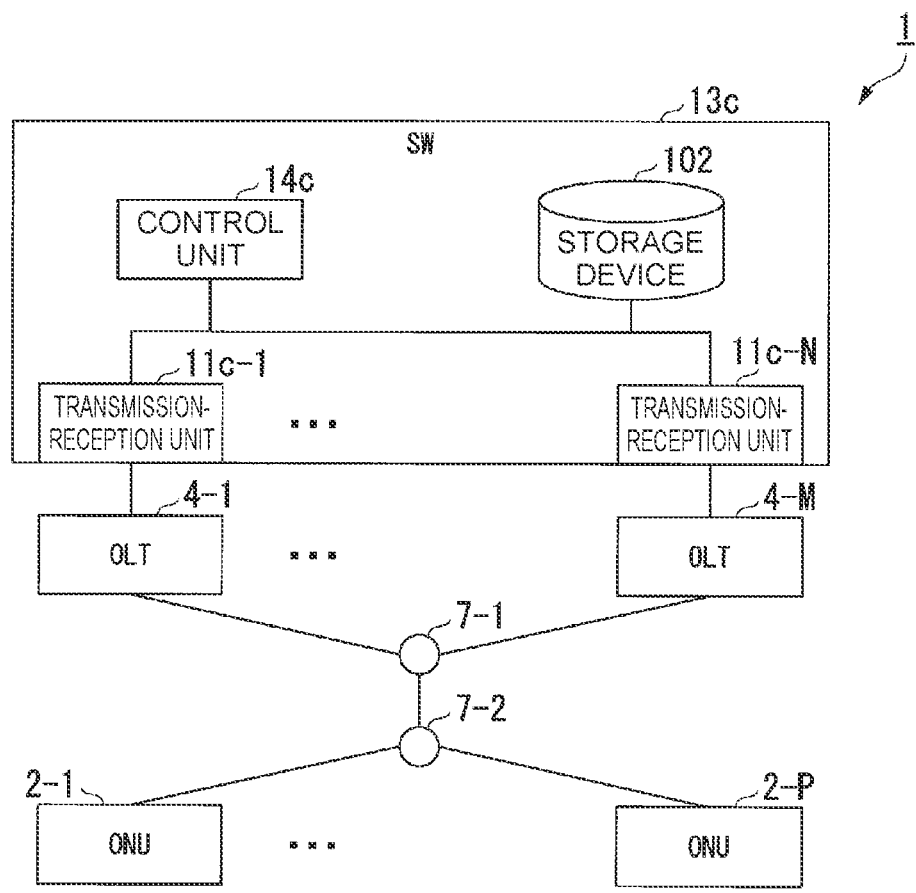
FIG. 7 is a diagram illustrating an example of correspondence between a pre-conversion VLAN identifier and a post-conversion VLAN identifier in the embodiment.
FIG. 8 is a diagram illustrating a first example of a configuration of a communication system including a SW configured to substitute a MAC address in the embodiment.

FIG. 7 is a diagram illustrating an example of the correspondence between a pre-conversion VLAN identifier and a post-conversion VLAN identifier. When an OLT 4 is replaced, for example, an operation system (OpS) notifies the control unit 14*b* of the post-conversion VLAN identifier of the OLT 4. In FIG. 7, as an example, the pre-conversion VLAN identifier "V1" and the post-conversion VLAN identifier "V2" are associated with each other. The pre-conversion VLAN identifier "V2" and the post-conversion VLAN identifier "V1" are associated with each other.

In FIGS. 4 and 5, each ONU 2 communicates an optical signal such as a control signal with each OLT 4 through the optical multiplexer/demultiplexer 7-1 and the optical multiplexer/demultiplexer 7-2. The OLT 4 or a transmitter-receptor 11*b* applies a tag in the above description, but for example, the ONU 2-1 may apply a tag (MAC address) having a destination at the OLT 4-M to the header of a control signal. This applies to the other examples. The ONU 2-1 transmits, for example, to the OLT 4-1 through the tagged VLAN, an optical signal such as a control signal to which a tag having a destination at the OLT 4-M is applied. The optical multiplexer/demultiplexer 7-2 multiplexes upstream optical signals such as control signals. The optical multiplexer/demultiplexer 7-1 demultiplexes an upstream optical signal such as a control signal. For example, the OLT 4-1 converts an optical signal such as a control signal into an electric signal. The OLT 4-1 forwards the control signal (electric signal) to the transmission-reception unit 11*b*-1.

The control unit 14*b* (VLAN conversion unit) forwards the control signal based on the data table indicating the correspondence between a pre-conversion VLAN identifier and a post-conversion VLAN identifier by using the tagged VLAN. Specifically, the control unit 14*b* converts a VLAN identifier (tag) written to the header of the control signal into a corresponding VLAN identifier. The control unit 14*b* forwards the control signal to the transmission-reception unit 11*b* to which the post-conversion VLAN identifier is allocated. For example, the control unit 14*b* forwards the control signal forwarded to the transmission-reception unit 11*b*-1, to the transmission-reception unit 11*b*-N to which the post-conversion VLAN identifier is allocated.

The control unit 14*b* may not only forward the control signal to the transmission-reception unit 11*b* but also forward the control signal to the transmission-reception unit 11*b* and the OLT 4 to which a post-conversion VLAN identifier is allocated. For example, the control unit 14*b* may forward, to the transmission-reception unit 11*b*-N and the OLT 4-M, the control signal forwarded to the transmission-reception unit 11*b*-1.

Specifically, the control unit 14*b* converts a VLAN identifier written to a control signal acquired by the transmission-reception unit 11*b* connected with the OLT 4 as a communication counterpart of the replaceable OLT 4 into the VLAN identifier of the transmission-reception unit 11*b* connected with the replaceable OLT 4 or the VLAN identifier of the replaceable OLT 4, and forwards a control signal to which the post-conversion VLAN identifier is written toward the transmission-reception unit 11*b* connected with the replaceable OLT 4 based on the post-conversion VLAN identifier. The control unit 14*b* converts the VLAN identifier written to the control signal acquired by the transmission-reception unit 11*b* connected with the replaceable OLT 4 into the VLAN identifier of the transmission-reception unit 11*b* connected with the OLT 4 as the communication counterpart of the replaceable OLT or the VLAN identifier of the OLT as the communication counterpart of the replaceable OLT 4, and forwards the control signal to which the post-conversion VLAN identifier is written toward the transmission-reception unit 11*b* based on the post-conversion VLAN identifier.

FIG. 8 is a diagram illustrating a first example of the configuration of the communication system 1 including a SW configured to substitute a MAC address. The communication system 1 includes the ONUs 2-1 to 2-P, the OLTs 4-1 to 4-M, the optical multiplexer/demultiplexers 7-1 and 7-2, and a SW 13*c* (switch unit). In FIG. 8, the SW 13*c* includes transmission-reception units 11*c*-1 to 11*c*-N, a control unit 14*c*, and the storage device 102.

Figures 9, 10:
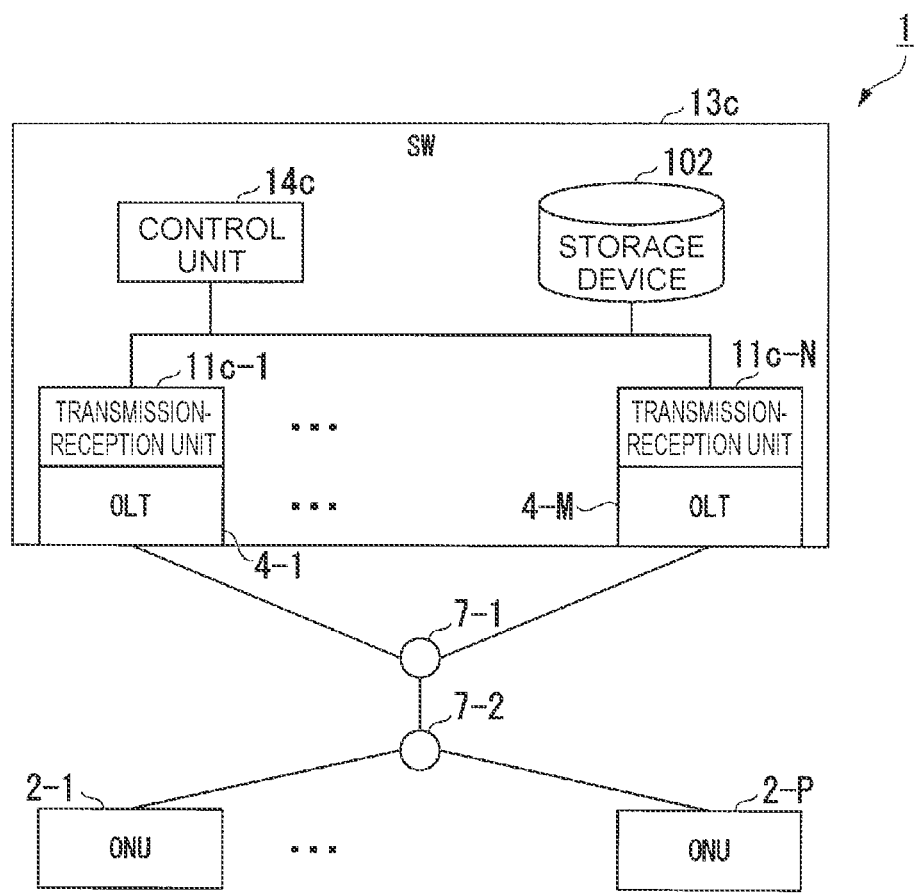
FIG. 9 is a diagram illustrating a second example of the configuration of the communication system including a SW configured to substitute a MAC address in the embodiment.
FIG. 10 is a diagram illustrating an example of correspondence between a pre-replacement OLT identifier (MAC address) and a post-conversion OLT identifier (MAC address) in the embodiment.

FIG. 9 is a diagram illustrating a second example of the configuration of the communication system 1 including a SW configured to substitute a MAC address. In FIG. 9, the SW 13*c* includes the transmission-reception units 11*c*-1 to 11*c*-N, the control unit 14*c*, and the storage device 102. The SW 13*c* may include the OLTs 4-1 to 4-M.

Each transmission-reception unit 11*c* (communication unit) is a port (physical interface). The transmission-reception unit 11*c* may be connected with an OLT 4.

In FIGS. 8 and 9, the control unit 14*c* records the MAC address of a pre-replacement OLT 4 and the MAC address of a post-replacement OLT 4 in the storage device 102. For example, the operation system (OpS) or a MAC layer notifies the control unit 14*c* of the MAC address of the pre-replacement OLT 4 and the MAC address of the post-replacement OLT 4.

FIG. 10 is a diagram illustrating an example of the correspondence between the identifier (MAC address) of a pre-replacement OLT 4 and the identifier (MAC address) of a post-conversion OLT 4. In FIG. 10, as an example, the MAC address "A1" of the pre-replacement OLT 4-M and the MAC address "A2" of the post-replacement OLT 4-M are associated with each other.

When an OLT 4 is replaced, the control unit 14c does not use the MAC address "A1" of the pre-replacement OLT 4-M for forwarding but uses the MAC address "A2" of the post-replacement OLT 4-M for forwarding. When an OLT 4 is replaced, the control unit 14c forwards a control signal to which the MAC address of the pre-replacement OLT 4 is written to an OLT 4 having the MAC address of the post-replacement OLT 4 associated with the MAC address of the pre-replacement OLT 4. Alternatively, the control unit 14c forwards a control signal from the OLT 4 having the MAC address of the post-replacement OLT 4 to an OLT having communicated with the pre-replacement OLT 4.

In other words, when an OLT 4 is replaced, the control unit 14c (MAC address substitution unit) substitutes the MAC address of the post-replacement (post-change) OLT 4 into the MAC address (transmission destination MAC address) of the pre-replacement OLT 4. The control unit 14c forwards a control signal, to the header, in which the MAC address of the pre-replacement OLT 4 is written as a transmission destination MAC address to an OLT 4 having the MAC address of the post-replacement OLT 4. The control unit 14c forwards a control signal, to the header, in which the MAC address of the post-replacement OLT 4 is written as a source MAC address to an OLT having communicated with the pre-replacement OLT 4. The control unit 14c may forward a control signal, to the header, in which the MAC address of the pre-replacement OLT 4 is written as a transmission destination MAC address to the transmission-reception unit 11c connected with the OLT 4 having the MAC address of the post-replacement OLT 4 and to the OLT 4 having the MAC address of the post-replacement OLT 4. The control unit 14c may forward a control signal, to the header, in which the MAC address of the post-replacement OLT 4 is written as a destination MAC address to the transmission-reception unit 11c connected with an OLT communicating with the pre-replacement OLT and to the OLT communicating with the pre-replacement OLT.

The same procedure may be applied when a user signal is forwarded. Specifically, the control unit 14c substitutes a post-replacement optical line terminal into the destination of a control signal to which an identifier having a destination at the pre-replacement OLT 4 is written, and forwards the control signal to the post-replacement OLT 4. The control unit 14c forwards a control signal to which an identifier having a destination at an OLT 4 as a communication counterpart of the replaceable OLT 4 is written to the OLT 4 as the communication counterpart of the replaceable OLT 4. The control unit 14c forwards a control signal to which an identifier having a source at the post-replacement OLT 4 is written to the OLT as the communication counterpart of the replaceable OLT 4. Although the control signal is forwarded, for example, neither MAC address nor CRC is rewritten.

The control unit 14c may overwrite the MAC address of the post-replacement OLT 4 to the MAC address (transmission destination MAC address) of the pre-replacement OLT 4 in the header of a control signal and forward the control signal or may overwrite the MAC address of the post-replacement OLT 4 to the MAC address (destination MAC address) of the pre-replacement OLT 4 and forward the control signal.

The control unit 14c may forward a control signal, to the header, in which the MAC address of the post-replacement OLT 4 is newly written as a source MAC address toward an OLT 4 communicating with the pre-replacement OLT 4.

The control unit 14c may forward a control signal, to the header, in which the MAC address of the post-replacement OLT 4 is newly written as a destination MAC address toward an OLT 4 having the MAC address of the post-replacement OLT 4.

The control unit 14c may forward a control signal, to the header, in which the MAC address of a post-replacement OLT 4 is newly written as a source MAC address toward a transmission-reception unit 11c connected with an OLT communicating with a pre-replacement OLT and toward the OLT communicating with the pre-replacement OLT.

The control unit 14c may forward a control signal, to the header, in which the MAC address of the post-replacement OLT 4 is newly written as a destination MAC address toward a transmission-reception unit 11c connected with an OLT 4 having the MAC address of the post-replacement OLT 4 and toward the OLT 4 having the MAC address of the post-replacement OLT 4.

The control unit 14c may overwrite the MAC address of the pre-replacement OLT 4 to the MAC address (transmission source MAC address) of the post-replacement OLT 4 in the header of a control signal and forward the control signal, or may overwrite the MAC address of the pre-replacement OLT 4 to the MAC address (destination MAC address) of the post-replacement OLT 4 and forward the control signal.

The control unit 14c may forward a control signal, to the header, in which the MAC address of the pre-replacement OLT 4 is newly written as a source MAC address toward an OLT 4 communicating with the pre-replacement OLT 4.

The control unit 14c may forward a control signal, to the header, in which the MAC address of the pre-replacement OLT 4 is newly written as a destination MAC address toward an OLT 4 having the MAC address of the post-replacement OLT 4.

The control unit 14c may forward a control signal, to the header, in which the MAC address of the pre-replacement OLT 4 is newly written as a source MAC address toward the transmission-reception unit 11c connected with an OLT communicating with the pre-replacement OLT and toward the OLT communicating with the pre-replacement OLT.

The control unit 14c may forward a control signal, to the header, in which the MAC address of the pre-replacement OLT 4 is newly written as a destination MAC address toward the transmission-reception unit 11c connected with an OLT 4 having the MAC address of the post-replacement OLT 4 and toward the OLT 4 having the MAC address of the post-replacement OLT 4.

The calculated value of the CRC changes through MAC address rewriting, and thus the value of the FCS is desirably rewritten to obtain the calculated value of the CRC after the rewriting. This is the same when a user signal is forwarded.

A MAC address rewritten at forwarding may be written back by an OLT 4 as a communication counterpart. For example, at inputting to a post-replacement OLT, a destination MAC address may be written back to the MAC address of the post-replacement OLT. At inputting to an OLT at a communication destination, a source MAC address may be written back to the MAC address of a pre-replacement OLT.

Note that although pre-replacement and post-replacement MAC addresses are used above, a predetermined MAC address may be used or rewriting to a predetermined MAC address may be performed irrespective of replacement.

Specifically, the control unit 14c rewrites, with an identifier having a destination at a post-replacement OLT, a control signal to which an identifier having a destination at a pre-replacement OLT is written, and forwards the control signal. The control unit 14*c* forwards a control signal to which an identifier having a destination at an OLT as a communication counterpart of a replaceable OLT is written, based on the identifier having a destination at the OLT as the communication counterpart of the replaceable OLT. The control unit 14*c* rewrites, with an identifier having a source at the pre-replacement OLT, a control signal to which an identifier having a source at the post-replacement OLT is written, and forwards the control signal.

Figure 11:
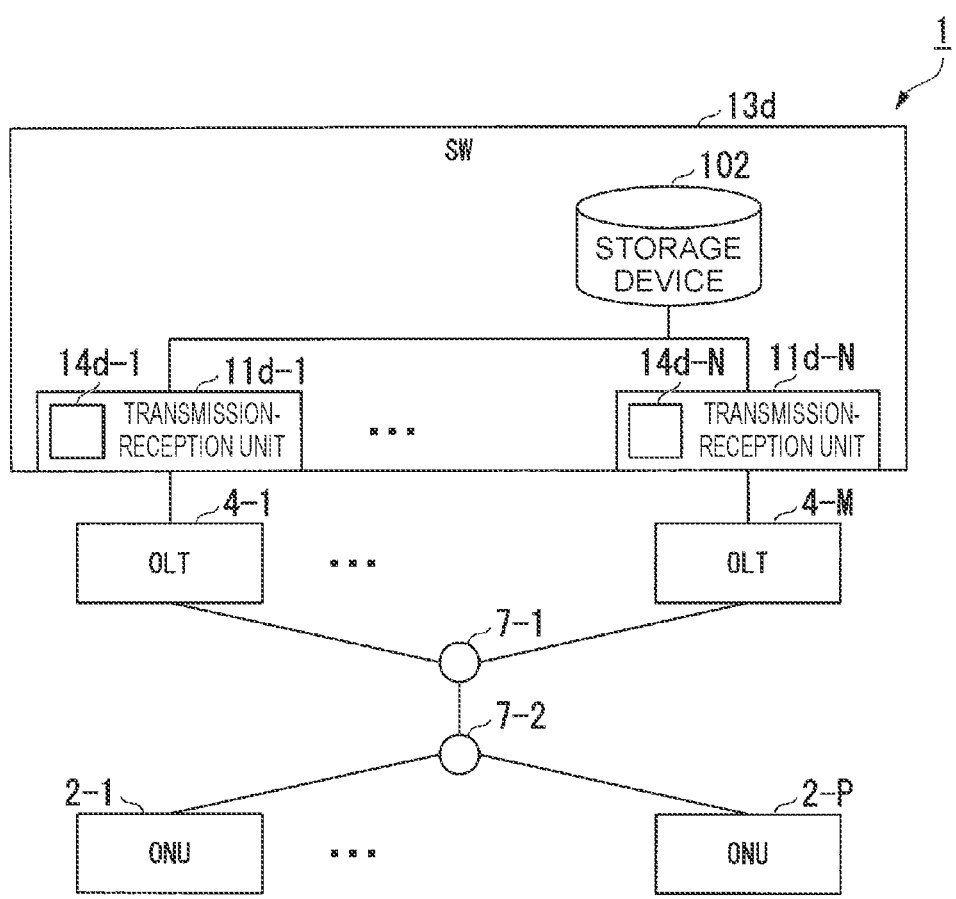
FIG. 11 is a diagram illustrating a first example of a configuration of a communication system including a transmission-reception unit or a SW configured to transmit an OLT MAC address by proxy in the embodiment.

FIG. 11 is a diagram illustrating a first example of the configuration of the communication system including a transmission-reception unit or SW (device other than OLTs) configured to transmit an OLT MAC address by proxy. The communication system 1 includes the ONUs 2-1 to 2-P, the OLTs 4-1 to 4-M, the optical multiplexer/demultiplexers 7-1 and 7-2, and a SW 13*d* (switch unit). In FIG. 11, the SW 13*d* includes transmission-reception units 11*d*-1 to 11*d*-N and the storage device 102.

Figure 12:
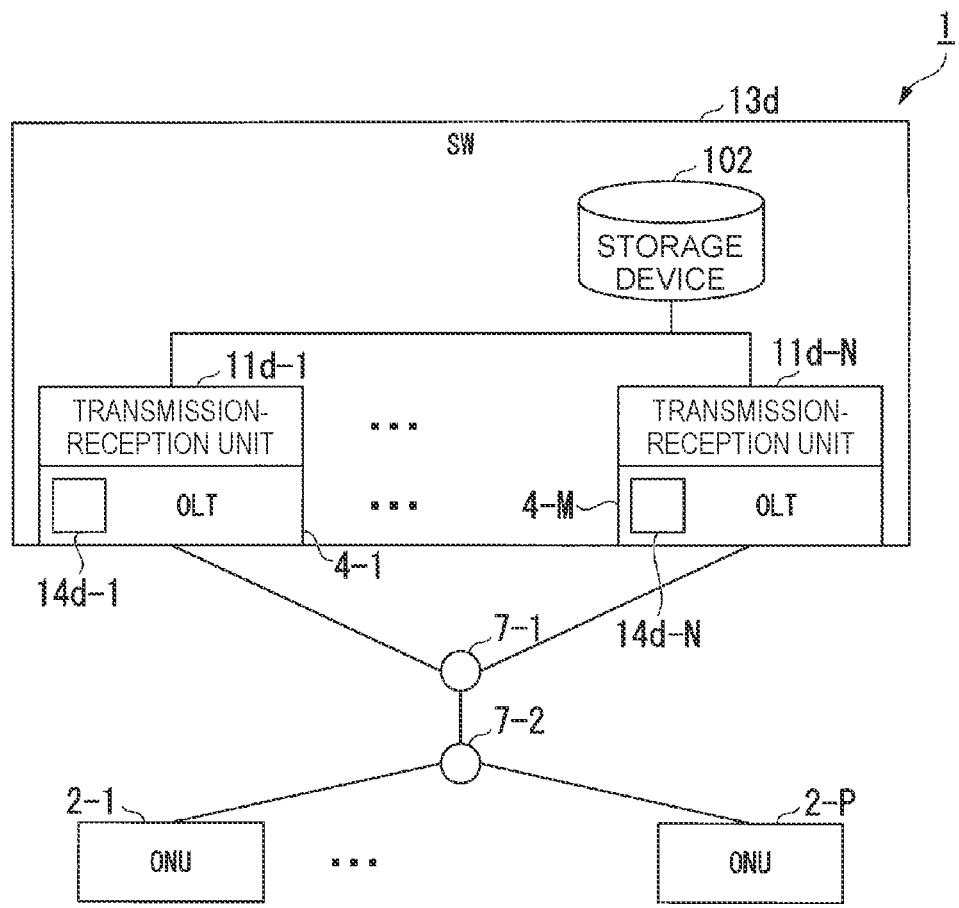
FIG. 12 is a diagram illustrating a second example of the configuration of the communication system including the transmission-reception unit or the SW configured to transmit an OLT MAC address by proxy in the embodiment.

FIG. 12 is a diagram illustrating a second example of the configuration of the communication system including a transmission-reception unit or SW (device other than OLTs) configured to transmit an OLT MAC address by proxy. In FIG. 12, the SW 13*d* includes the transmission-reception units 11*d*-1 to 11*d*-N, the storage device 102, and the OLTs 4-1 to 4-M.

Each transmission-reception unit 11*c* is a port (physical interface). Each transmission-reception unit 11*d* may be connected with an OLT 4. Unlike each transmission-reception unit 11*c* illustrated in FIG. 8, each transmission-reception unit 11*d* (communication unit) illustrated in FIG. 11 includes a control unit 14*d* (MAC address substitution unit). Unlike each OLT 4 illustrated in FIG. 9, each OLT 4 (communication unit) illustrated in FIG. 12 includes the control unit 14*d* (MAC address substitution unit).

In FIGS. 11 and 12, the control unit 14*d* records the MAC address of the pre-replacement OLT 4 and the MAC address of the post-replacement OLT 4 in the storage device 102. For example, the operation system (OpS) notifies the control unit 14*d* of the MAC address of the pre-replacement OLT 4 and the MAC address of the post-replacement OLT 4.

When an OLT 4 is replaced, the control unit 14*d* (MAC address proxy unit) uses a predetermined MAC address for forwarding. The control unit 14*d* notifies another communication device of the predetermined MAC address as the MAC address of the pre-replacement or post-replacement OLT 4. For example, when the OLT 4-N is replaced, the control unit 14*d* notifies the OLT 4-1 of the MAC address of the pre-replacement OLT 4 as the MAC address of the post-replacement OLT 4 connected with the transmission-reception unit 11*d*-N. The OLT 4-1 transmits a control signal to which the notified MAC address of the pre-replacement OLT 4 is written to the transmission-reception unit 11*d*-1.

In other words, when an OLT 4 is replaced, the control unit 14*d* may notify another communication device of a predetermined MAC address, for example, the MAC address of the pre-replacement OLT 4 connected with the transmission-reception unit 11*d*, as the MAC address of the post-replacement OLT 4. Accordingly, the control unit 14*d* enables behavior, for OLTs 4 and the like, as the pre-replacement OLT 4 connected with the transmission-reception unit 11*d*.

The control unit 14*d* (MAC address substitution unit) substitutes a predetermined MAC address, for example, the MAC address (transmission destination MAC address) of the pre-replacement OLT 4 into the MAC address of the post-replacement (post-change) OLT 4. The control unit 14*d* forwards a control signal, to the header, in which the MAC address of the pre-replacement OLT 4 is written as a transmission destination MAC address to an OLT 4 having the MAC address of the post-replacement OLT 4. The control unit 14*d* may forward the control signal, to the header, in which the MAC address of the pre-replacement OLT 4 is written as a transmission destination MAC address to the transmission-reception unit 11*d* connected with the OLT 4 having the MAC address of the post-replacement OLT 4 and to the OLT 4 having the MAC address of the post-replacement OLT 4.

The control unit 14*d* may overwrite the MAC address of the post-replacement OLT 4 to the MAC address (transmission destination MAC address) of the pre-replacement OLT 4 in the header of a control signal. The control unit 14*d* may forward a control signal, to the header, in which the MAC address of the post-replacement OLT 4 is newly written as a transmission destination MAC address to an OLT 4 having the MAC address of the post-replacement OLT 4. The control unit 14*d* may forward a control signal, to the header, in which the MAC address of the post-replacement OLT 4 is newly written as a transmission destination MAC address to the transmission-reception unit 11*d* connected with the OLT 4 having the MAC address of the post-replacement OLT 4 and to the OLT 4 having the MAC address of the post-replacement OLT 4.

In the SW (communication device) in each of FIGS. 1, 2, 4, 5, 8, 9, 11, and 12, a first transmission-reception unit acquires, from a first OLT 4, a control signal having a destination at a second OLT 4. When the second OLT 4 is replaced with a third OLT 4, the control unit forwards the control signal to a second transmission-reception unit connected with the third OLT 4. The second transmission-reception unit forwards the control signal to the third OLT 4.

Accordingly, the identifier (actual device identifier) of a device included in a physical network can be hidden from a higher-level layer. MAC address settings (change control signal forwarding settings) do not need to be changed even when an OLT is replaced for a reason such as failure, and thus processing of replacing the OLT is not complicated. Moreover, a switch that does not use a destination MAC address for control signal forwarding can be used in a communication system.

Figure 13:
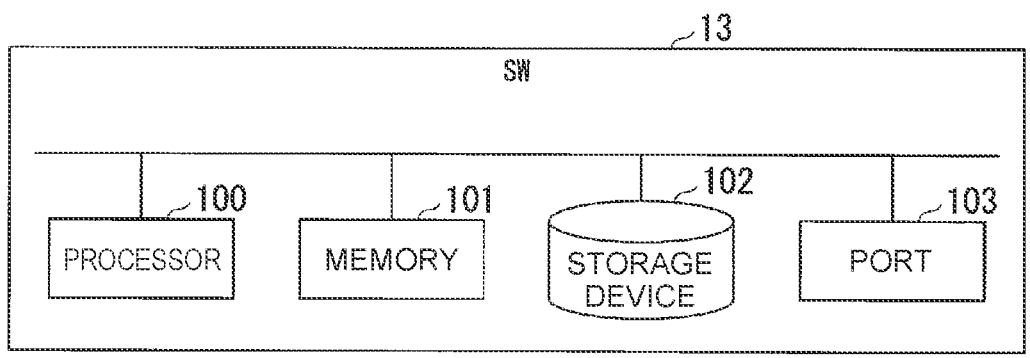
FIG. 13 is a diagram illustrating an example of a hardware configuration of a communication device such as a SW in the embodiment.

FIG. 13 is a diagram illustrating an example of a hardware configuration of a communication device such as a SW in each of FIGS. 1, 2, 4, 5, 8, 9, 11, and 12. The communication device includes a processor 100, a memory 101, the storage device 102, and a port 103 (physical interface).

Part or all of the communication device, such as the SW 13 is achieved as software as the processor such as a central processing unit (CPU) executes a program loaded onto the memory from the storage device that is a non-volatile recording medium (non-temporary recording medium).

Part of the communication device, such as the SW 13 is achieved by using, for example, a storage device. The program may be recorded in a computer-readable recording medium. Examples of the computer-readable recording medium include portable media such as a flexible disk, a magneto optical disc, ROM, and a CD-ROM, and a non-temporary recording medium such as a storage device such as a hard disk built in a computer system. The program may be transmitted through an electric communication line.

Part or all of the communication device, such as the SW 13 may be achieved by using, for example, hardware including an electronic circuit (or circuitry) using a large scale integration circuit (LSI), an application specific integrated circuit (ASIC), a programmable logic device (PLD), an FPGA, or the like.

The communication device is, for example, a communication device configured to execute communication with another communication device through a signal such as an optical signal through a communication network such as an optical fiber network such as an ODN such as a PON. The communication device is, for example, an OLT. The communication device may be, for example, an optical subscriber unit (OSU). The communication device may be, for example, a combination of an OLT and another SW, the OLT including or not including a switch unit (SW: switch) configured to switch an optical signal. The communication device may be, for example, a combination of an OLT and an ONU. The communication device may include a plurality of instruments. Alternatively, the communication device may be another communication device such as an ONU, a multiplexer (MUX), a demultiplexer (DMUX), or a SW. The communication device may be constituted by a plurality of components. The components may be included in a single device or may be included in separate devices. The communication device may be one virtual device made of a plurality of devices. The virtual device may include an operation system (OpS), an operation support system (OSS), an NE-OpS configured to control a network element (NE), an NE controller, an element management system (EMS) that is a setting management system of an OLT such as an NE-OpS, and the like (hereinafter, the OpS, the OSS, the NE-OpS, the NE controller, and the EMS are referred to as the OpS and the like or representatively referred to as one of them).

Subsequently, operation and the like are illustrated based on an assumption that the communication device is an OLT of an ITU-T recommendation compliant PON such as a time and wavelength division multiplexing (TWDM)-PON system such as a Next Generation-PON2 (NG-PON2). The PON is a TWDM-PON here, but may be a PON other than an ITU-T recommendation G.989 series compliant TWDM-PON, for example, any of an XG (10 gigabit capable)-PON, a G (gigabit capable)-PON, and a B (broadband) PON, which are compliant with G.987, G.984, and G.983 series, respectively, a 10GE-PON and a GE-PON which are compliant with IEEE 802.3av, 1904.1, and the like, and 802.3ah, respectively. For example, the PON may be any of an XGPON, a G-PON, a B (broadband) PON, which are compliant with ITU-T recommendation G.987, G.984, and G.983 series, respectively, or may be an IEEE standard compliant PON such as a GE (gigabit ethernet)-PON or a 10 GE-PON. In a case in which the PON is IEEE compliant, the same above description applies when a transmission convergence (TC) layer and a physical medium dependent (PMD) layer are substituted with corresponding layers in the standard.

The communication device includes hardware, software, a component of a combination thereof, or a function configured as a component. For example, the communication device includes a software component such as an application (for example, a flexible access system architecture (FASA) application) achieved by using an input-output interface (for example, a FASA application API) generalized for functions and the like that are different between services or between telecommunication carriers, and a foundational component (for example, a FASA foundation) of an access network device configured to provide the generalized input-output interface to the software component and provide a function that does not need to be changed in accordance with a service or a request because, for example, the function is standardized. The use of the generalized input-output interface facilitates function addition and exchange and flexibly and fast provides services of various requests. Note that application is also written as "app" in the present specification.

Communication between components is performed, for example, through a middleware unit 120 to be described later, but a forwarding path or means unique to the communication device may be used or normalized means such as OpenFlow, Netconf/YANG, or Simple Network Management Protocol (SNMP) may be used.

Communication between components may be a path such as an internal wire, a backboard, an OAM unit, a main signal line, a dedicated wire, the OpS and the like, a controller, or a control board (Cont: control panel). When directly terminated and input, communication between components may be encapsulated in the OAM unit or a main signal. Communication between components may be terminated at a place and input through the path such as the internal wire, the backboard, the QAM unit, the main signal line, the dedicated wire, the OpS and the like, the controller, or the control board. When the OAM unit or the main signal line is used, it is desirable to perform encapsulation in the OAM unit or the main signal. In a case of passing through the main signal line, it is desirable to perform sorting at an OSU or a SW at another place. These apply to the following.

In the present example, the communication device further includes an interface for a software component at an application such as a FASA application, a platform such as a FASA foundation, or the like.

Embodiment 1-1

Embodiment 1-1 describes a configuration of a communication device included in a communication system used for a TWDM-PON. The communication device described in Embodiment 1-1 is used as a communication device such as a device illustrated in FIGS. 1 and 17 or an OLT illustrated in FIGS. 1 and 18. Hereinafter, first to sixth examples are described as examples of the architecture of the communication device. The architecture of the communication device included in the communication system may be an architecture other than the first to sixth examples described below. For example, each software unit of the communication device in the first to sixth examples of the architecture may be a hardware unit.

First Example of Architecture

Figure 14:
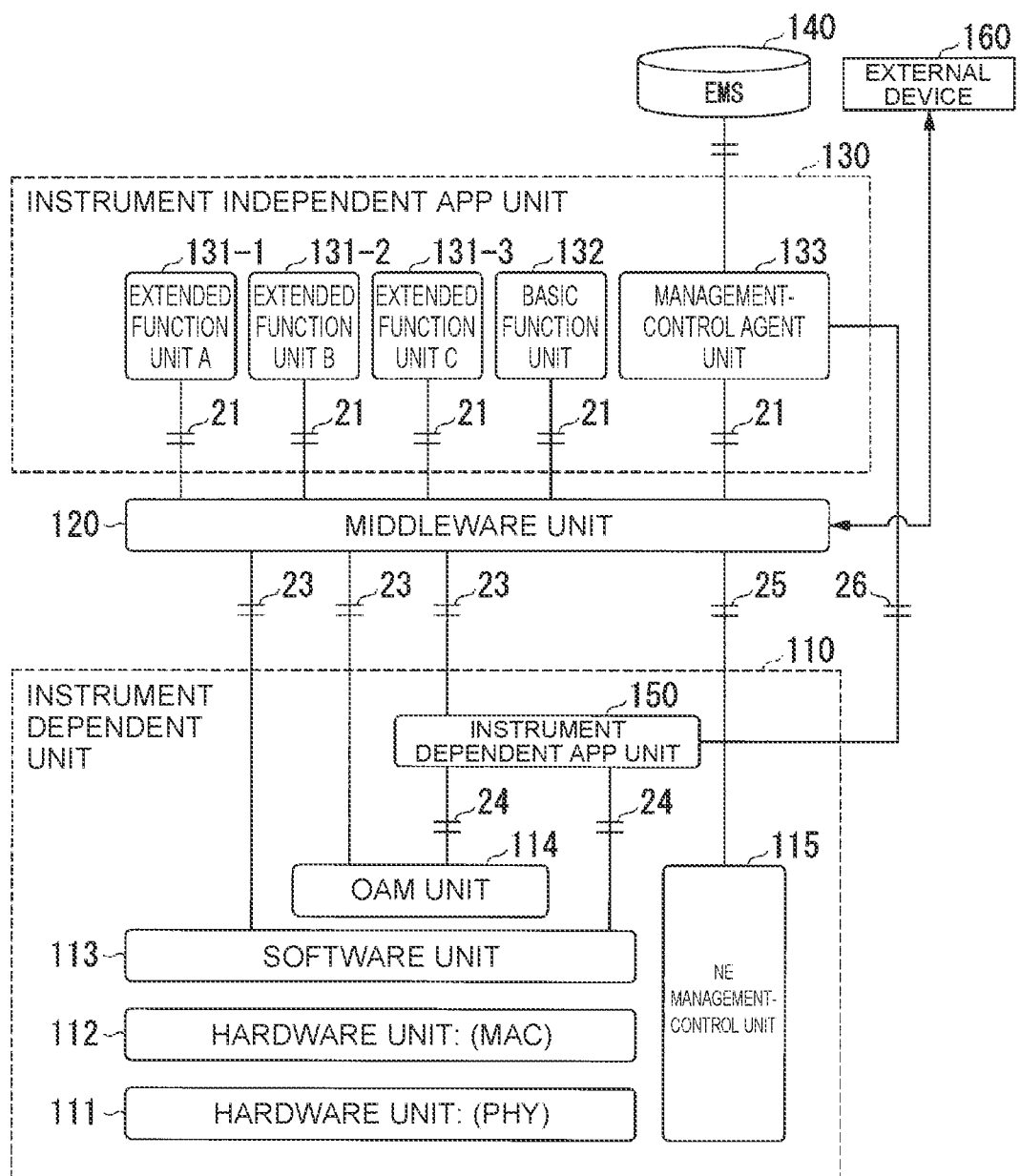
FIG. 14 is a diagram illustrating a first example of an architecture of the communication device in the embodiment.

FIGS. 1 and 14 are a diagrams illustrating a first example of the architecture of the communication device. In the first example of the architecture, the communication device includes a non-generalized, instrument dependent unit 110, which operates in dependence on an instrument, the middleware unit 120 configured to hide a difference among hardware and software of the instrument dependent unit 110 and an instrument dependent app unit 150, a generalized instrument independent app unit 130, which operates independently from an instrument, and the instrument dependent app unit 150. Thus, the instrument dependent unit 110 (vendor dependent unit) is a function unit that depends on a standard with which each instrument of the communication device is compliant and on a manufacturing vendor of the instrument. In other words, the instrument dependent unit 110 has low compatibility with another communication instrument and cannot be directly used for a newly manufactured communication instrument (in particular, an instrument that is compliant with a different standard or different in the manufacturing vendor). The instrument dependent unit 110 executes one or more functions of a network instrument.

The instrument independent app unit 130 is a function unit independent from a standard with which each instrument of the communication device is compliant, a scheme, the type of the instrument, the generation of the instrument, and the manufacturing vendor of the instrument. In other words, the instrument independent app unit 130 has high compatibility with another communication instrument and can be directly used for a newly manufactured communication instrument (in particular, an instrument that is compliant with a different standard or different in the manufacturing vendor). Specific examples of apps provided to the instrument independent app unit 130 include an app configured to perform setting processing at a network instrument, an app configured to perform setting change processing, and an app configured to perform algorithm processing.

The middleware unit 120 and the instrument independent app unit 130 are connected with each other through an instrument independent API 21. The instrument independent API 21 is an instrument independent input-output IF.

The instrument dependent unit 110 includes, for example, a hardware unit 111 (PHY) and a hardware unit 112 (MAC) that depend on a standard with which the instrument dependent unit 110 is compliant or an instrument manufacturing vendor, a driver configured to drive the hardware unit 111 (PHY) and the hardware unit 112 (MAC), a software unit 113 and an OAM unit 114 configured to execute firmware and the like, and the instrument dependent app unit 150 configured to drive at least part of the hardware unit 111 (PHY), the hardware unit 112 (MAC), and the software unit 113 of the instrument dependent unit 110. The hardware unit 111 (PHY), the hardware unit 112 (MAC), the software unit 113, and the OAM unit 114 are each connected with the middleware unit 120 through an instrument dependent API 23. The instrument dependent API 23 is an instrument dependent input-output IF. The instrument dependent unit 110 further includes a NE management-control unit 115. The NE management-control unit 115 and the middleware unit 120 are connected with each other through an instrument dependent API 25. The instrument dependent API 25 is an instrument dependent input-output IF.

The middleware unit 120 and the instrument dependent app unit 150 are connected with each other through the instrument dependent API 23. The instrument dependent app unit 150 is connected with each of the OAM unit 114, the software unit 113, the hardware unit 111 (PHY), and the hardware unit 112 (MAC) of the instrument dependent unit 110 through an instrument dependent API 24. The instrument dependent app unit 150 and a management-control agent unit 133 are connected with each other through an API 26.

What function is achieved by the instrument dependent unit 110 or the instrument independent app unit 130 may be determined in accordance with a restriction attributable to processing for achieving the middleware unit 120 and the instrument independent app unit 130, for example, a restriction attributable to a software processing capacity, as well as the frequency of function update, importance of an extended function, and the like. Accordingly, the communication device can facilitate flexible and fast addition of an extended function unit (unique function unit) by the instrument independent app unit 130 and timely provide communication services.

For example, it may be determined that a high-update-frequency function or a function that contributes to communication service differentiation, such as main-signal priority processing or dynamic bandwidth assignment (DBA) that improves line use efficiency are configured as the instrument dependent unit 110 or the instrument independent app unit 130 in priority. Moreover, a function having a smaller difference separation as for at least one of a compliant standard of any instrument for commoditization, a generation, a scheme, a system, an instrument type, and a manufacturing vendor may be configured as the instrument independent app unit 130 in priority. Although predetermined functions of DBA and the like are disposed at the instrument dependent unit or the instrument independent app in the above description, both may be an instrument independent app or both may be the instrument dependent unit by function deployment. An example in which both are the instrument independent app is, for example, cases in which a processing unit for functions of DBA and the like is included in an information processing unit such as a processor included in a transceiver having low performance, an app or the like is included in an information processing unit such as an OSU having high information processing performance at another place, and inter-processor communication between devices or inter-device communication functions as middleware. A case in which both are included in the instrument dependent unit is, for example, a case in which each function of DBA and the like is compiled as part of firmware or the like, similarly to the above example.

A common IF for executing functions may be used to generalize any of functions of a compliant standard, a generation, a scheme, a system, an instrument type, and a manufacturing vendor even when it is not optimum for at least one of a compliant standard, a generation, a scheme, a system, an instrument type, and a manufacturing vendor. The common IF may include an IF or a parameter not used for any of the compliant standard, the generation, the scheme, the system, the instrument type, and the manufacturing vendor of the instrument dependent unit 110.

Figure 15:
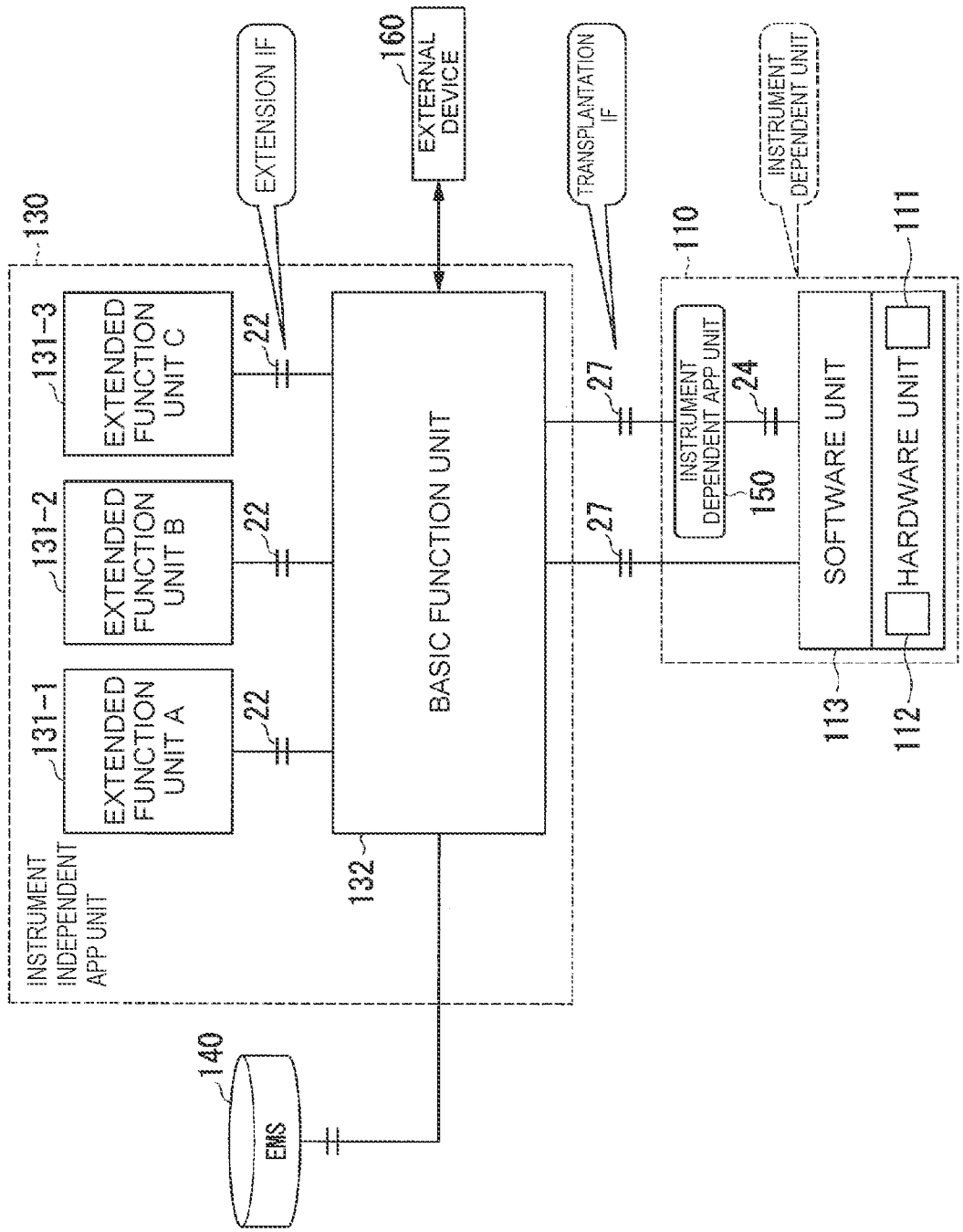
FIG. 15 is a diagram illustrating a second example of the architecture of the communication device in the embodiment.

A conversion function unit configured to convert an IF, a parameter, or the like for compatibility with the instrument dependent unit 110, or a function unit configured to perform automatic setting in accordance with an IF, a parameter, or the like that is insufficient may be further included in at least one of the middleware unit 120 illustrated in FIGS. 1 and 14, the driver of the instrument dependent unit 110 illustrated in FIGS. 1 and 14 and FIGS. 1 and 15 to be described later, and the instrument dependent app unit 150 (vendor dependent app unit) illustrated in FIGS. 1 and 14 and FIGS. 1 and 15 to be described later.

The instrument dependent unit 110 illustrated in FIGS. 1 and 14 includes the hardware unit 111 (PHY), the hardware unit 112 (MAC), and the software unit 113. The hardware unit 111 (PHY) executes processing (physical sublayer processing) related to a physical layer and light transmission and reception. The hardware unit 112 (MAC) executes media access control (MAC) processing. The hardware unit 111 (PHY) and the hardware unit 112 (MAC) depend on a compliant standard or a manufacturing vendor. The software unit 113 executes an instrument dependent driver, firmware, application, or the like.

The hardware unit 111 (PHY) and the hardware unit 112 (MAC) of the instrument dependent unit 110 may include other generalized server, layer 2SW, or the like. The instrument dependent unit 110 may include no hardware unit 112 (MAC). The instrument dependent unit 110 does not necessarily need to include part of the hardware unit 111 (PHY).

For example, the instrument dependent unit 110 may have only optical functions without low-level signal processing such as modulation-demodulation signal processing, forward error correction (FEC), coding-decoding processing, or encryption processing. The instrument dependent unit 110 may include no physical coding sublayer (PCS) as a part that encodes data. The instrument dependent unit 110 may include no physical medium attachment (PMA) nor PCS that serializes data. The instrument dependent unit 110 may include no PMD connected with a physical medium. The instrument dependent unit 110 may include no software unit 113 when the middleware unit 120 directly drives, controls, operates, or manages the hardware unit 111 (PHY) and the hardware unit 112 (MAC) of the instrument dependent unit 110 without through the software unit 113.

The instrument independent app unit 130 includes, for example, extended function units 131-1 to 131-3 (in FIGS. 1 and 14, an extended function A, an extended function B, and an extended function C), a basic function unit 132, and the management-control agent unit 133. The management-control agent unit 133 communicates data from an EMS 140.

In FIGS. 1 and 14, the EMS 140 and an external device 160 are connected with the instrument independent app unit 130 through the middleware unit 120, but the EMS 140 and the external device 160 do not necessarily need to be connected with the instrument independent app unit 130 through the middleware unit 120. The EMS 140 and the external device 160 may be connected with the middleware unit 120 as appropriate when needed or may be directly connected with the instrument independent app unit 130. The expression "being connected through the middleware unit 120" is an expression at a viewpoint from the instrument independent app unit 130. In reality, instrument independent apps are connected with each other through the middleware unit 120 after hardware connection.

Hereinafter, for matters common to the extended function units 131-1 to 131-3, part of the reference sign is omitted as "extended function unit 131". The EMS 140 is, for example, an OpS or the like. Note that the instrument independent app unit 130 does not necessarily need to include any of the extended function unit 131, the basic function unit 132, and the management-control agent unit 133, the management-control agent unit 133 may be included in the basic function unit 132, and the management-control agent unit 133 may be included in the basic function unit 132 or the middleware unit 120.

The instrument independent app unit 130 may further include a component other than the extended function unit 131, the basic function unit 132, and the management-control agent unit 133. For example, when the extended function unit 131 is not needed, the instrument independent app unit 130 may include no extended function unit 131. The instrument independent app unit 130 may include one or more extended function units 131.

It is preferable that the extended function unit 131 can be independently added, deleted, replaced, or changed without providing unnecessary influence on other functions. For example, the extended function unit 131 may be added, deleted, replaced, or changed as appropriate when the extended function unit 131 configured to execute, for example, multicast services and power saving control is needed in accordance with a service request.

The basic function unit 132 may be included in the instrument independent app unit 130 as part of the extended function unit 131 or may be substituted with a function unit at a level lower than the middleware unit 120. When the extended function unit 131 includes the basic function unit 132, the instrument independent app unit 130 may include no basic function unit 132. When the basic function unit 132 is substituted with a function unit at a level lower than the middleware unit 120, the instrument independent app unit 130 may include no basic function unit 132. When the extended function unit 131 includes the basic function unit 132 and the basic function unit 132 is substituted with a function unit at a level lower than the middleware unit 120, the instrument independent app unit 130 may include no basic function unit 132.

The management-control agent unit 133 does not need to perform inputting and outputting to and from the EMS 140 when automatically performing setting in accordance with predetermined settings without receiving communication from the EMS 140. Moreover, the instrument independent app unit 130 may include no management-control agent unit 133 when the management-control agent unit 133 has no management setting function but the other part of the instrument independent app unit 130, the basic function unit 132, or the instrument dependent unit 110 has a management setting function.

The EMS 140 and the instrument independent app unit 130 may directly input and output information. The instrument dependent unit 110 may be substituted with the NE management-control unit 115 and the instrument dependent app unit 150 (refer to FIGS. 1 and 15 to be described later) of a function unit at a level lower than the NE management-control unit 115.

The management-control agent unit 133 does not need to input and output information to and from the EMS 140 when automatically performing setting in accordance with predetermined settings. Moreover, the instrument independent app unit 130 may include no management-control agent unit 133 when the management-control agent unit 133 includes no management setting function but the other part of the instrument independent app unit 130, the basic function unit 132, or the instrument dependent unit 110 has a management setting function. The EMS 140 and the instrument independent app unit 130 may directly input and output information.

The instrument dependent app unit 150 may input and output information through the middleware unit 120, information may be directly input and output from the management-control agent unit 133, or information may be input to and output from any of both units or may be directly input to and output from the EMS 140. The instrument independent app unit 130 may include no management-control agent unit 133 when the instrument dependent app unit 150 is automatically set in accordance with predetermined settings without receiving communication from the EMS 140 and can acquire management and control information from the EMS 140 through the middleware unit 120.

The instrument independent app unit 130 inputs and outputs information at least to and from the hardware unit 111 (PHY) and the hardware unit 112 (MAC) of the instrument dependent unit 110 or to and from the software unit 113 through the middleware unit 120. The instrument independent app unit 130 mutually performs inputting and outputting through the middleware unit 120 when needed. In particular, when executing control or management in accordance with information input to and output from the EMS 140, the instrument independent app unit 130 inputs and outputs information to and from the management-control agent unit 133 that receives communication from the EMS 140.

An example of inputting and outputting between the instrument independent app unit 130 and the instrument dependent unit 110 is as follows.

For example, a DBA app unit and a protection app unit mutually input and output information to and from an embedded QAM engine of a TC layer. A dynamic wavelength and bandwidth assignment (DWBA) app and an ONU registration authentication app unit mutually input and output information to and from a PLOAM engine of the TC layer. A power saving app unit mutually inputs and outputs information to and from an OMCI and a L2 main signal processing function unit (L2 function (Layer 2 function) unit).

A multicast listener discover (MLD) proxy app unit mutually inputs and outputs information to and from the L2 function unit. A low speed monitoring app (OMCI) mutually inputs and outputs information to and from the OMCI. The OMCI and the L2 function unit operate XGPON Encapsulation Method Framer (XGEM framer) and encryption. DWBA and DBA may be separated, integrated, or combined. For example, the management-control agent unit 133 is a maintenance operation function app unit and mutually inputs and outputs information to and from the EMS 140 as an OpS or the like for the NE management-control unit 115.

Note that implementation of the instrument independent app unit 130 may have priorities. For example, the management-control agent unit 133 has a first priority that is most prioritized. A second priority and subsequent priorities are, for example, a DBA app, a DWBA app, a power saving app, an ONU registration authentication app, a MLD proxy app, a protection app, and the low speed monitoring app (OMCI) in the stated order.

An app for driving functions for some vendors, schemes, types, and generations through the instrument independent API 21, and an app that drives functions only for devices of some vendors, schemes, types, and generations may be included as apps of the extended function unit 131.

The management-control agent unit 133 performs inputting and outputting with the EMS 140 and the middleware unit 120. The middleware unit 120 inputs and outputs NE management information and control information to and from the NE management-control unit 115.

The NE management-control unit 115 may directly transmit and receive the NE management information and the control information to and from the EMS 140 without through the middleware unit 120 or may transmit and receive the NE management information and the control information through the management-control agent unit 133.

The instrument dependent app unit 150 inputs and outputs the NE management information and the control information to and from the management-control agent unit 133. The instrument dependent app unit 150 may directly input and output information to and from the EMS 140 without through the management-control agent unit 133. The management-control agent unit 133 inputs and outputs information to and from the EMS 140, the middleware unit 120, and the instrument dependent app unit 150. The middleware unit 120 inputs and outputs the NE management information and the control information to and from the NE management-control unit 115.

The middleware unit 120 inputs and outputs information to and from the instrument independent app unit 130 through each instrument independent API 21. The middleware unit 120 inputs and outputs information to and from the OAM unit 114, the driver, firmware, the hardware unit 111 (PHY), or the hardware unit 112 (MAC) of the instrument dependent unit 110 through the corresponding instrument dependent API 23. The middleware unit 120 outputs input information directly or in a predetermined format. For example, when the output destination is each component of the instrument independent app unit 130, the middleware unit 120 converts information into an input format of the corresponding instrument independent API 21. When the output destination is the OAM unit 114, the driver, the firmware, the hardware unit 111 (PHY), or the hardware unit 112 (MAC) of the instrument dependent unit 110, the middleware unit 120 transmits information to the output destination after converting the information into the format of the corresponding instrument dependent API 23 in the format of inputting to the component or after terminating and providing predetermined processing on the information.

At inputting, the middleware unit 120 desirably deletes input information unnecessary for each input destination and collects and supplements any insufficient information through another instrument independent API 21 and another instrument dependent API 23. At inputting to the middleware unit 120, multiple addressing may be performed to a relating app or the like through broadcast or multicast.

FIGS. 1 and 14 illustrate the single middleware unit 120 and the single instrument dependent unit 110, but each unit may be formed from a plurality of units. When a plurality of processors are included in the hardware of the instrument dependent unit 110, the middleware unit 120 may perform inputting and outputting by using inter-processor communication or the like over the processors and hardware. A link between the instrument independent app units 130 and each instrument independent app unit 130 may be disposed as an execution program such as a dynamic link library (DLL) in a user space on a single processor or in a user space on a plurality of processors.

The instrument independent app unit 130 may be disposed in a kernel space while an input-output IF such as an API is ensured, may be disposed together with the middleware unit 120 including an IF independently replaceable with firmware or the like, or may be incorporated in firmware or the like and compiled again. A user space and a kernel space may be optionally combined for each instrument independent app unit 130.

The instrument independent app units 130 corresponding to the same function may be implementable in both a user space and a kernel space. In this case, for example, any of them may be selected by switching, both of them may cooperatively perform processing, or only one of them may perform actual processing. This applies to the software of the instrument dependent unit 110.

Preferably, incorporation in a kernel space and firmware with which lower overhead and faster processing are expected is desirable, despite trade-off with scalability and replacement immediacy, as fast processing is more needed like main signal processing, DBA processing, and low-layer signal processing. A processor on which the instrument dependent app unit 150 (refer to FIGS. 1 and 15 to be described later) is disposed is desirably disposed in a user space, a kernel space, or firmware of a processor that performs actual processing or a processor in the vicinity thereof at a viewpoint of influence on another program due to, for example, restrictions on a bus, speed, and the like through inter-processor communication and occupation of a communication path. However, processing may be performed at a remote processor to reduce the capacity of a processor that performs actual processing or a processor in the vicinity thereof, although communication cost of inter-processor communication increases.

Each instrument independent API 21 is desirably included in the middleware unit 120 in advance on the assumption of an extended function unit 131 to be added, but may be added or deleted, when needed, without changes of the instrument dependent APIs 23 and the other part of the instrument independent app unit 130.

Note that, in the present example, software implementation regions are the basic function unit 132, the management-control agent unit 133, the extended function unit 131, and the middleware unit 120, but the software implementation regions may be targeted for service adaptation (encryption, fragment processing, GEM framing/XGEM framing, PHY adaptation FEC, scramble, synchronization block generation/extraction, GPON transmission convergences (GTC) framing, PHY framing, SP conversion, encoding scheme. An example of implementation of a software implementation function of the architecture and an example of deployment of a function corresponding to a hardware unit will be described below. The function deployment is, for example, deployment of the software implementation function at a network instrument or an external server. This applies to other examples.

When the instrument dependent app unit 150 is not needed, none of instrument dependent app unit 150, the instrument dependent API 24, and the API 26 may be provided. This configuration is referred to as a second example of the architecture. Since the instrument dependent app unit 150 is not provided, the middleware unit 120 becomes complicated.

Third Example of Architecture

FIGS. 1 and 15 are diagrams illustrating a third example of the architecture of the communication device. In FIGS. 1 and 15, in place of the middleware unit 120 described in the first example of the architecture illustrated in FIGS. 1 and 14, the basic function unit 132 performs inputting and outputting with the hardware unit 111 (PHY), the hardware unit 112 (MAC), and each extended function unit 131. The other part of the instrument independent app unit 130 and the instrument dependent app unit 150 are the same as those in the first example of the architecture.

Note that although the EMS 140 and the external device 160 are connected with the instrument independent app unit 130 through the basic function unit 132 in FIGS. 1 and 15, the EMS 140 and the external device 160 do not necessarily need to be connected with the instrument independent app unit 130 through the basic function unit 132. The EMS 140 and the external device 160 may be connected with the middleware unit 120 as appropriate when needed or may be directly connected with the instrument independent app unit 130. The expression "being connected through the middleware unit 120" is an expression at a viewpoint from the instrument independent app unit 130. In reality, instrument independent apps are connected with each other through the middleware unit 120 after hardware connection.

In the third example of the architecture, unlike the first example, the middleware unit 120 including the instrument dependent APIs 23 and 25 does not need to be produced for each instrument for which at least one of a compliant standard, a generation, a scheme, a system, an instrument type, and a manufacturing vendor is different. Accordingly, the communication device of the third example of the architecture has effects of generalizing a larger number of functions among instruments and generations, facilitating transplantation, and achieving easy verification of connectivity and robustness of instrument functions.

The communication device according to the third example of the architecture includes the instrument dependent unit 110 and the instrument independent app unit 130. The instrument dependent unit 110 includes the hardware unit 111 (PHY) and the hardware unit 112 (MAC) that depend on a compliant standard, an instrument manufacturing vendor, or the like, the software unit 113 such as the driver configured to drive the hardware unit 111 (PHY) and the hardware unit 112 (MAC), firmware, or the like, and the instrument dependent app unit 150 configured to drive at least part of the instrument dependent unit 110. The driver and the like hide a difference of the instrument dependent unit 110.

The instrument independent app unit 130 is a generalized instrument independent app configured to execute instrument independent processing and includes the extended function units 131 and the basic function unit 132. The basic function unit 132 is connected with the instrument dependent unit 110 through the driver that hides the difference of the hardware unit 111 (PHY) and the hardware unit 112 (MAC) from the instrument dependent software unit 113 or through an instrument independent API 27 (transplantation IF) or the instrument dependent app unit 150, and inputs and outputs data between the hardware unit 111 (PHY) and the hardware unit 112 (MAC) of the instrument dependent unit 110 and the instrument dependent software unit 113.

The basic function unit 132 and each extended function unit 131 in the instrument independent app unit 130 are connected with each other through an instrument independent API 22 (extension IF). The basic function unit 132 and the instrument dependent unit 110 are connected with each other through each instrument independent API 27. In place of the middleware unit 120, the basic function unit 132 in the instrument independent app unit 130 inputs and outputs information to and from the hardware unit 111 (PHY) and the hardware unit 112 (MAC) and each extended function unit 131. The basic function unit 132 and the instrument dependent app unit 150 in the instrument dependent unit 110 are connected with each other through the corresponding instrument independent API 27. The instrument dependent app unit 150 and the other function unit of the instrument dependent unit 110 are connected with each other through the instrument dependent API 24. In place of the middleware unit 120, the basic function unit 132 performs inputting and outputting with hardware and each extended function unit 131. An equivalent of the management-control agent unit 133 (refer to FIGS. 1 and 14) configured to receive communication from the EMS 140 may be included in the basic function unit 132, and the management-control agent unit 133 may be provided as an extended function unit 131.

The instrument independent app unit 130 mutually performs inputting and outputting through the basic function unit 132 when needed. Each extended function unit 131 of the instrument independent app unit 130 inputs and outputs information through the basic function unit 132 and the corresponding instrument independent API 22 (extension IF). The basic function unit 132 inputs and outputs information to and from each extended function unit 131 through the corresponding instrument independent API 22 and inputs and outputs information to and from the OAM unit, the driver, the firmware, the hardware unit 111 (PHY) and the hardware unit 112 (MAC) of the instrument dependent unit 110 and to and from the driver of the instrument dependent unit 110 or the instrument dependent app unit 150 that hides the difference of each instrument independent API 22 (transplantation IF) and the instrument dependent unit 110, through the instrument independent APIs 27.

Similarly to the middleware unit 120 illustrated in FIGS. 1 and 14, the basic function unit 132 inputs information directly or in a predetermined format. For example, the basic function unit 132 inputs information after converting the information into the format of each instrument independent API 22 in an input format in a case of the other part of the instrument independent app unit 130, or after converting information into the format of each instrument independent API 22 in an input format or terminating and providing predetermined processing on the information in a case of the OAM unit, the driver, the firmware, and the hardware units that are dependent on instruments. At inputting, the basic function unit 132 desirably deletes input information unnecessary for each input destination and collects and supplements any insufficient information through another instrument independent API 22 and another instrument independent API 27. However, the basic function unit 132 may perform, to a relating app or the like through broadcast or multicast, multiple addressing of inputting to each input destination.

The instrument independent app unit 130 includes, for example, the extended function units 131-1 to 131-3 and the basic function unit 132. The instrument independent app unit 130 does not necessarily need to include any of the extended function units 131 and the basic function unit 132. The instrument independent app unit 130 may further include a function unit other than the extended function units 131 and the basic function unit 132. For example, when the extended function units 131 are unnecessary, the instrument independent app unit 130 does not need to include the extended function units 131.

It is preferable to be able to independently add or delete each extended function unit 131 without affecting other functions. For example, when an extended function unit 131 is set for, for example, multicast services and power saving control in accordance with a service request, the extended function unit 131 may be added as appropriate when needed, may be deleted as appropriate when not needed, and may be replaced or changed in accordance with change.

Part of the basic function unit 132 may be substituted with the instrument dependent app unit 150. The instrument dependent app unit 150 directly inputs and outputs information from the basic function unit 132, but may input and output information to and from the EMS 140, directly or after predetermined conversion, without through the basic function unit 132.

Similarly to the first example of the architecture illustrated in FIGS. 1 and 14, the instrument independent APIs 22 and 27 are desirably included in the basic function unit 132 in advance on the assumption of an extended function unit 131 to be added, but may be added or deleted, when needed, without changes of the instrument independent APIs 22 and 27, the other part of the instrument independent app unit 130, the instrument dependent app unit 150, or the instrument dependent API 24. When the instrument dependent app unit 150 is not needed, none of the instrument dependent app unit 150 and the instrument dependent API 24 may be provided. This configuration is referred to as a fourth example of the architecture. Since the instrument dependent app unit 150 is not provided, the basic function unit 132 becomes complicated.

Fifth Example of Architecture

Figure 16:
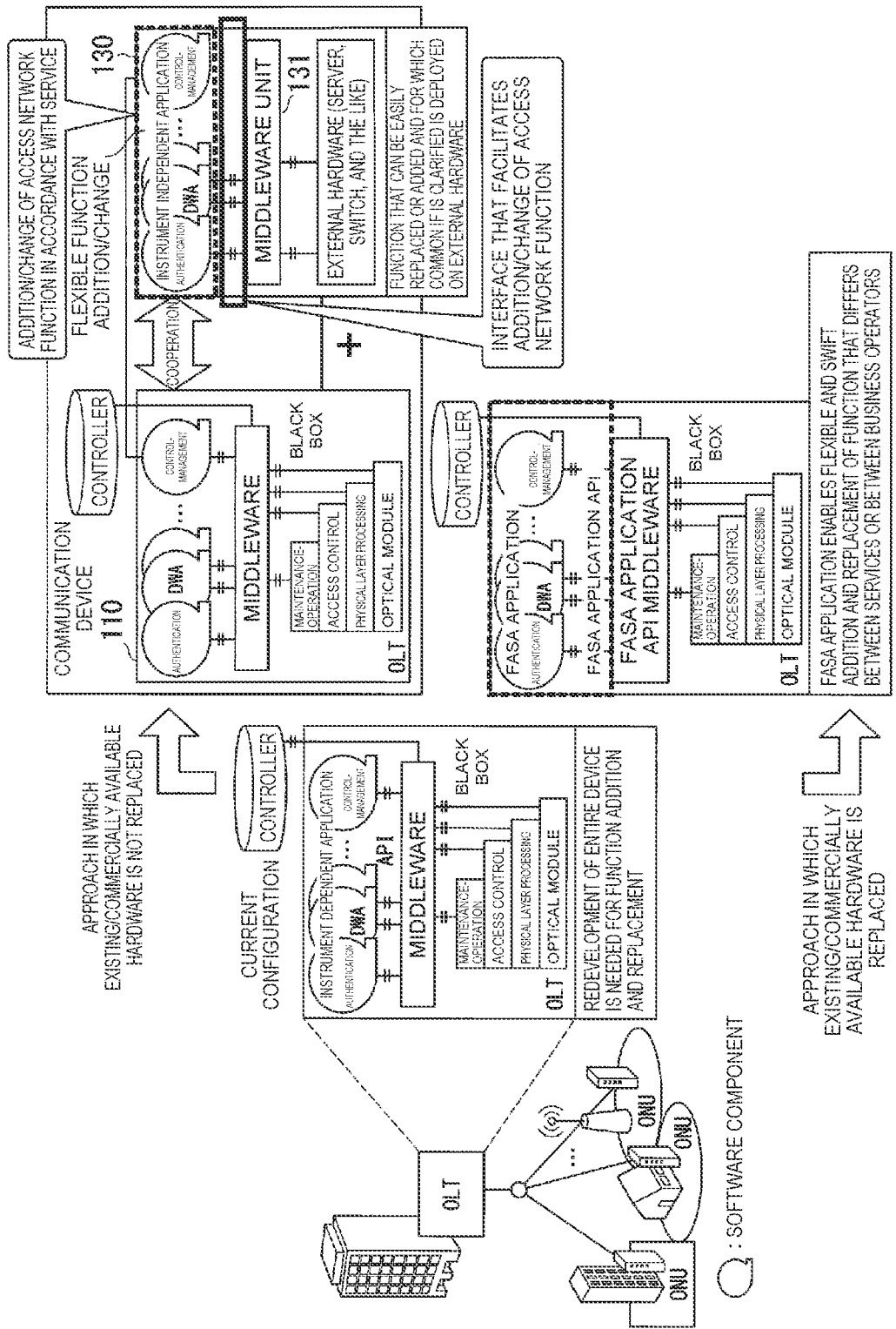
FIG. 16 is a diagram illustrating a third example of the architecture of the communication device in the embodiment.

The upper-right diagram of FIGS. 1 and 16 is a diagram illustrating a fifth example of the architecture. The lower-right diagram of FIGS. 1 and 16 corresponds to the first to fourth examples of the architecture. FIGS. 1 and 16 illustrate a case in which the communication device is an OLT. The fifth example of the architecture is preferable for approach to function clouding that utilizes existing/commercially available OLT hardware by implementing (clouding) functions of an OLT on external hardware and prepares function addition/change in accordance with a service.

In the present example, the communication device is made of existing/commercially available hardware and external hardware. For example, the existing/commercially available hardware is the instrument dependent unit 110 that is non-generalized and instrument dependent, and includes a middleware unit 121 that hides a hardware and software difference on the external hardware, and the instrument independent app unit 130 that is generalized and operates independently from instruments. Thus, the instrument dependent unit (vendor dependent unit) under middleware in FIGS. 1 and 16 is a function unit dependent on a standard with which each instrument of the communication device are compliant and the manufacturing vendor of the instrument. Similarly to the first example of the architecture, the instrument independent app unit 130 is a function unit independent from the standard with which each instrument of the communication device is compliant and the manufacturing vendor of the instrument.

The middleware unit 121 and the instrument independent app unit 130 are connected with each other through an instrument independent API that is an instrument independent input-output IF. For example, the software unit, the OAM, the hardware unit (PHY), and the hardware unit (MAC) of the instrument dependent unit 110 are connected with the middleware unit 121 on the external hardware through an instrument dependent API that is an instrument dependent input-output IF and inter-instrument connection between the existing/commercially available hardware and the external hardware.

In the present architecture, similarly to the first example of the architecture, it is possible to facilitate flexible and fast addition of an extended function unit (unique function unit) by the instrument independent app unit 130 and timely provide communication services. The instrument dependent unit 110 may be maintenance operation, access control, physical layer processing, or an optical module illustrated in FIGS. 1 and 16, depending on an instrument configuration.

A conversion function unit configured to convert an IF, a parameter, or the like for compatibility with the instrument dependent unit 110, and a function unit configured to perform automatic setting in accordance with an IF, a parameter, or the like that is insufficient may be further included in at least one of the middleware unit 121, the driver of the instrument dependent unit 110, and the instrument dependent app unit 150 (vendor dependency app unit).

The instrument dependent unit 110 includes a hardware unit and a software unit. The software unit executes a driver, firmware, an application, and the like that are instrument dependent.

The instrument dependent unit 110 does not necessarily need to include a PMD that is connected with a physical medium, a MAC, a PMA that serializes data, a PCS as a part that encodes data, or part of PHY. For example, the instrument dependent unit 110 may have only optical functions without low-level signal processing such as modulation-demodulation signal processing, FEC, coding-decoding processing, or encryption processing.

The instrument independent app unit 130 is, for example, the management-control agent unit 133 configured to acquire data from the EMS, the extended function units 131-1 to 131-3, and the basic function unit 132. Hereinafter, for matters common to the extended function units 131-1 to 131-3, part of the reference sign is omitted as "extended function unit 131". Note that the instrument independent app unit 130 does not necessarily include any of the management-control agent unit 133, the extended function unit 131, and the basic function unit 132.

The instrument independent app unit 130 may further include a component other than the management-control agent unit 133, the extended function unit 131, and the basic function unit 132. For example, when the extended function unit 131 is not needed, the instrument independent app unit 130 may include no extended function unit 131. The instrument independent app unit 130 may include one or more extended function units 131.

It is preferable that the extended function unit 131 can be independently added, deleted, replaced, or changed without providing unnecessary influence on other functions. For example, the extended function unit 131 may be added, deleted, replaced, or changed as appropriate when the extended function unit 131 configured to execute, for example, multicast services and power saving control is needed in accordance with a service request.

The basic function unit 132 may be included in the instrument independent app unit 130 as part of the extended function unit 131 or may be substituted with a function unit at a level lower than the middleware unit 121. When the extended function unit 131 includes the basic function unit 132, the instrument independent app unit 130 may include no basic function unit 132. When the basic function unit 132 is substituted with a function unit at a level lower than the middleware unit 121, the instrument independent app unit 130 may include no basic function unit 132. When the extended function unit 131 includes the basic function unit 132 and the basic function unit 132 is substituted with a function unit at a level lower than the middleware unit 120, the instrument independent app unit 130 may include no basic function unit 132.

The management-control agent unit 133 does not need to perform inputting and outputting to and from the EMS 140 when automatically performing setting in accordance with predetermined settings without receiving communication from the EMS 140. Moreover, the instrument independent app unit 130 may include no management-control agent unit 133 when the management-control agent unit 133 has no management setting function but the other part of the instrument independent app unit 130, the basic function unit 132, or the instrument dependent unit 110 has a management setting function.

The EMS 140 and the instrument independent app unit 130 may directly input and output information. The instrument dependent unit 110 does not necessarily need to include the NE management-control unit 115 and the IF of the NE management-control unit 115.

The basic function unit 132 may be included in the instrument independent app unit 130 as part of the extended function unit 131 or may be substituted with a function unit at a level lower than the middleware unit 120. When the extended function unit 131 includes the basic function unit 132, when the basic function unit 132 is substituted with a function unit at a level lower than the middleware unit 120, or in a case of combination of these configurations, the instrument independent app unit 130 may include no basic function unit 132. Part of the basic function unit 132 may be substituted with the instrument dependent app unit 150 of a function unit at a level lower than the middleware unit 120.

The management-control agent unit 133 does not need to input and output information to and from the EMS 140 when automatically performing setting in accordance with predetermined settings. Moreover, the instrument independent app unit 130 may include no management-control agent unit 133 when the management-control agent unit 133 includes no management setting function but the other part of the instrument independent app unit 130, the basic function unit 132, or the instrument dependent unit 110 has a management setting function. The EMS 140 and the instrument independent app unit 130 may directly input and output information.

An app for driving functions for some vendors, schemes, types, and generations through the instrument independent API 21, and an app that drives functions only for devices of some vendors, schemes, types, and generations may be included as apps of the extended function unit 131.

The management-control agent unit 133 performs inputting and outputting to and from the EMS 140 and the middleware unit 120. The middleware unit 120 inputs and outputs NE management information and control information to and from the NE management-control unit 115. The NE management-control unit 115 may directly transmit and receive the NE management information and the control information to and from the EMS 140 without through the middleware unit 120 or may transmit and receive the NE management information and the control information through the management-control agent unit 133.

The middleware unit 120 inputs and outputs information to and from the instrument independent app unit 130 through the instrument independent API 21. The middleware unit 120 inputs and outputs information to and from the OAM unit 114, the driver, the firmware, the hardware unit 111 (PHY), or the hardware unit 112 (MAC) of the instrument dependent unit 110 through the corresponding instrument dependent API 23. The middleware unit 120 outputs input information directly or in a predetermined format. For example, when the output destination is each component of the instrument independent app unit 130, the middleware unit 120 converts information into an input format of the corresponding instrument independent API 21. When the output destination is the OAM unit 114, the driver, the firmware, the hardware unit 111 (PHY), or the hardware unit 112 (MAC) of the instrument dependent unit 110, the middleware unit 120 transmits information to the output destination after converting the information into the format of the corresponding instrument dependent API 23 in the format of inputting or after terminating and providing predetermined processing on the information.

At inputting, the middleware unit 120 desirably deletes input information unnecessary for each input destination and collects and supplements any insufficient information through another instrument independent API 21 and another instrument dependent API 23. At inputting to the middleware unit 120, multiple addressing may be performed to a relating app or the like through broadcast or multicast.

The single middleware unit 120 and the single instrument dependent unit 110 are illustrated, but each unit may be formed from a plurality of units. When a plurality of processors are included in the hardware of the instrument dependent unit 110, the middleware unit 120 may perform inputting and outputting by using inter-processor communication or the like over the processors and hardware. A link between the instrument independent app units 130 and each instrument independent app unit 130 may be disposed as an execution program such as a DLL in a user space on a single processor or in a user space on a plurality of processors.

The instrument independent app unit 130 may be disposed in a kernel space while an input-output IF such as an API is ensured, may be disposed together with the middleware unit 120 including an IF independently replaceable with firmware or the like, or may be incorporated in firmware or the like and compiled again. A user space and a kernel space may be optionally combined for each instrument independent app unit 130.

The instrument independent app units 130 corresponding to the same function may be implementable in both a user space and a kernel space. In this case, for example, any of them may be selected by switching, both of them may cooperatively perform processing, or only one of them may perform actual processing. This applies to the software of the instrument dependent unit 110.

Preferably, incorporation in a kernel space and firmware with which lower overhead and faster processing are expected is desirable, despite trade-off with scalability and replacement immediacy, as fast processing is more needed like main signal processing, DBA processing, and low-layer signal processing. A processor on which the instrument dependent app unit 150 is disposed is desirably disposed in a user space, a kernel space, or firmware of a processor that performs actual processing or a processor in the vicinity thereof at a viewpoint of influence on another program due to, for example, restrictions on a bus, speed, and the like through inter-processor communication and occupation of a communication path. However, processing may be performed at a remote processor to reduce the capacity of a processor that performs actual processing or a processor in the vicinity thereof, although communication cost of inter-processor communication increases.

Each instrument independent API 21 is desirably included in the middleware unit 120 in advance on the assumption of an extended function unit 131 to be added, but may be added or deleted, when needed, without changes of the instrument dependent APIs 23 and the other part of the instrument independent app unit 130.

The other configuration is the same as that in the first example of the architecture.

Sixth Example of Architecture

In a sixth example of the architecture, the instrument dependent unit 110 includes the hardware unit 111 (PHY) and the hardware unit 112 (MAC) that depend on a compliant standard or an instrument manufacturing vendor, the software unit 113 such as the driver configured to drive the hardware unit 111 (PHY) and the hardware unit 112 (MAC), firmware, or the like, and the instrument dependent app unit 150 configured to drive at least part of the instrument dependent unit 110.

The instrument dependent app unit 150 and the instrument dependent unit 110 are connected with each other through the instrument dependent APIs 24. An equivalent of the management-control agent unit 133 that receives communication from the EMS 140 may be included in the instrument dependent app unit 150. Each instrument dependent API 24 may be added or deleted when needed without changes of the instrument dependent app unit 150 and the instrument dependent API 24.

Note that the configuration of the communication device described in each of the first to sixth examples of the architecture of the communication device is based on the assumption of an OLT of an ITU-T recommendation compliant PON such as a TWDM-PON but may be an ONU, may be an ITU-T recommendation compliant PON OLT or ONU other than a TWDM-PON, or may be an IEEE standard compliant PON such as a GE-PON or a 10GE-PON, and a TC layer or a PMD layer may be substituted with the corresponding layer.

Figure 17:
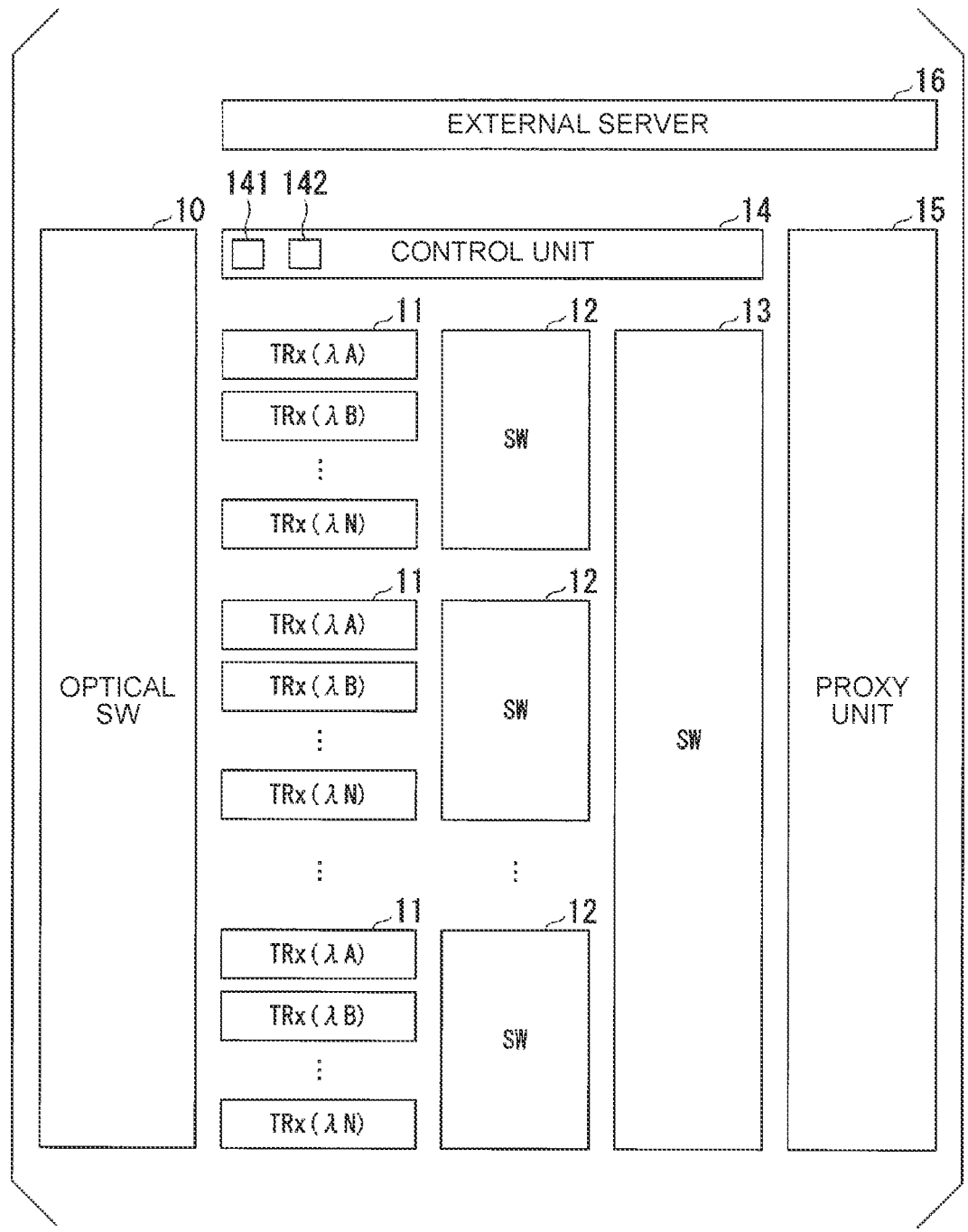
FIG. 17 is a diagram illustrating an example of a configurations of the communication device in the embodiment and an external server.

FIGS. 1 and 17 are diagrams illustrating an example of the configuration of a virtual communication device or communication system made of a group of components or devices. The communication device illustrated in FIGS. 1 and 17 includes at least some of an optical switch unit (optical SW) 10 configured to switch inputting and outputting of a transmission-reception unit (TRx: transceiver) 11 of mainly the same wavelength (in an example to be described later, may be the same frequency, mode, core, sign, frequency, (sub) carrier, or the like, or a combination thereof including wavelength), the TRx 11, a switch unit (SW) 12, a switch unit (SW) 13, a control unit 14, and a proxy unit 15. Note that the communication device may include an external server 16.

FIGS. 1 and 17 illustrate a configuration in which the TRxs 11 configured to transmit and receive (communicate) optical signals of different wavelengths ($\lambda A$ to $\lambda N$) are connected with the same SW 12, but Embodiment 1-1 is not limited thereto. For example, in addition to the configuration in which the TRxs 11 configured to transmit and receive optical signals of different wavelengths ($\lambda A$ to $\lambda N$) are connected with the same SW 12, the TRxs 11 configured to transmit and receive optical signals of the same wavelength may be connected with the same SW 12, the TRxs 11 of at least some wavelengths may be connected with a plurality of identical SWs 12, the TRxs 11 of at least some wavelengths may be wavelength-variable, or some or all TRxs 11 may be TRxs 11 configured to perform transmission or reception only.

The communication device such as an OLT may include the TRxs 11 to the control unit 14 or may further include the external server 16 in addition to these components. An OSU may be a TRx 11 and may additionally include the SW 12 or the SW 13.

The communication device may be a virtual device including an EMS. A configuration such as the configuration of an open networking operating system (ONOS) may be used as a configuration of mounting a component on the EMS. The component may be mounted on the EMS, may be mounted on a virtual OLT on the EMS, or may be mounted in parallel to the virtual OLT on the EMS.

A communication system of a communication system configuration (1-1) includes the optical SW 10, the TRxs 11, the SWs 12, the SW 13, the control unit 14, the proxy unit 15, and the external server 16 (FIGS. 1 and 17).

When the communication device is an OLT, the OLT may be constituted by the optical SW 10, the TRxs 11, the SWs 12, the SW 13, and the control unit 14 or may be constituted by the optical SW 10, the TRxs 11, the SWs 12, the SW 13, the control unit 14, and the external server 16. An OSU may be constituted by the optical SW 10 and the TRxs 11, may be constituted by the optical SW 10, the TRxs 11, and the SWs 12, or may be constituted by the optical SW 10, the TRxs 11, and the SW 13.

The optical SW 10 is connected with an ODN and the TRxs 11. The optical SW 10 performs autonomous control, is controlled by another component included in the device, an external OpS or the like (not illustrated), a controller (not illustrated), or an external device (not illustrated) or the like (the external OpS or the like (not illustrated), the controller (not illustrated), and the external device (not illustrated) or the like are referred to as the external device or the like), or is controlled by an instruction forwarded through another component included in the device or the external device or the like.

The optical SW 10 may switch inputs and outputs of the TRxs 11 of the same wavelength (in an example to be described later, may be the same frequency, mode, core, sign, frequency, (sub)carrier, or the like, or a combination thereof including wavelength; This applies to any following example), including inputs and outputs of the TRxs 11 of variable wavelengths, between different core wires (in an example to be described later, may be different modes, cores, or the like, or a combination thereof including core wires; This applies to any following example), or optical multiplexers/demultiplexers or the like connected therewith, may switch inputs and outputs of the TRxs 11 of a plurality of wavelengths including variable wavelengths (in an example to be described later, may be a plurality of frequencies, modes, cores, signs, frequencies, (sub)carriers, or the like, or a combination thereof including wavelengths; This applies to any following example) or a bundle thereof produced by optical multiplexers/demultiplexers or the like between different core wires, or may switch bundles of inputs and outputs of the TRxs 11 of wavelengths including variable wavelengths (in an example to be described later, may be frequencies, modes, cores, signs, frequencies, (sub)carriers, or the like, or a combination thereof including wavelengths; This applies to any following example) between different core wires or optical multiplexers/demultiplexers or the like connected therewith.

The optical SW 10 performs autonomous control, is controlled by another component included in the device, such as the TRx 11, the SW 12, the SW 13, the control unit 14, the proxy unit 15, or the external server 16, or by the external device or the like, or is controlled by an instruction forwarded through another component included in the device, such as the TRx 11, the SW 12, the SW 13, the control unit 14, the proxy unit 15, or the external server 16, or through the external device or the like.

The TRxs 11 configured to transmit and receive optical signals of different wavelengths ($\lambda A$ to $\lambda N$) are connected with the corresponding SW 12. Each TRx 11 performs autonomous control or is controlled by another component included in the device, such as the optical SW 10, the SW 12, the SW 13, the control unit 14, the proxy unit 15, or the external server 16, or by the external device or the like. The TRx 11 is controlled by an instruction forwarded through another component included in the device, such as the optical SW 10, the SW 12, the SW 13, the control unit 14, the proxy unit 15, or the external server 16, or through the external device or the like. The TRx 11 performs, in accordance with a predetermined procedure, processing of at least one or a combination of collection, distribution, sorting, copy, folding, and transmission on part or all of traffic of the optical SW 10 or each SW 12 with addition, deletion, and replacement of tags of at least some of a virtual local area network (VLAN), a priority, a discard priority, a destination, and the like, or a combination thereof, or without tag change.

Note that collection is not necessarily performed for upstream traffic. Each SW 12 mainly performs sorting for each wavelength in the configuration of the communication system configuration (1-1) but may perform collection, distribution, copy, folding, transmission, or tag addition or tag replacement of a virtual LAN identifier (VID), a tag indicating priority discarding, and the like. Collection is mainly performed for upstream traffic in the configuration of a communication system configuration (1-2) to be described later but may perform distributions, sorting, copy, folding, transmission, tag addition, or tag replacement. As for downstream traffic, any of collection, distribution, sorting, copy, folding, transmission, tag addition, or tag replacement may be performed, or a combination of at least some of them may be performed. Which of them to be performed is determined in accordance with service policy. This applies to communication system configurations described below.

Each SW 12 is connected with the SW 13. The SW 12 performs autonomous control, is controlled by another component included in the device, such as the optical SW 10, the TRx 11, the SW 13, the control unit 14, the proxy unit 15, or the external server 16 or by the external device or the like, or is controlled by an instruction forwarded through another component included in the device, such as the optical SW 10, the TRx 11, the SW 13, the control unit 14, the proxy unit 15, or the external server 16, or through the external device or the like. The SW 12 performs, on part or all of traffic of the TRx 11 or the SW 13 in accordance with a predetermined procedure, addition, deletion, and replacement of tags of at least some or a combination of a VLAN, priority, discard priority, a destination, and the like, or processing of at least some or a combination of collection, distribution, sorting, copy, folding, transmission, and tag addition or tag replacement without tag change. This applies to communication system configurations described below.

Note that the SW 12 is not necessarily controlled. The at least one proxy unit 15 is controlled by each TRx 11, or control information is forwarded from the TRx 11 to the at least one proxy unit 15 without controlling. A forwarding source is, for example, the proxy unit 15 or the external server 16. The proxy unit 15 autonomously operates independently from the TRx 11 in some cases. This applies to communication system configurations described below.

The SW 13 is connected with the proxy unit 15 directly or through a concentrator SW or the like. The concentrator SW performs at least some of collection, distribution, sorting, copy, folding, or transmission on traffic from or to a plurality of OLTs. The SW 13 performs autonomous control, is controlled by another component included in the device, such as the optical SW 10, the TRx 11, the SW 12, the control unit 14, the proxy unit 15, or the external server 16 or by the external device or the like, or is controlled by an instruction forwarded through another component included in the device, such as the optical SW 10, the TRx 11, the SW 12, the control unit 14, the proxy unit 15, or the external server 16, or through the external device or the like. The SW 13 performs, on part or all of traffic of the SW 12 or the proxy unit 15 in accordance with a predetermined procedure, addition, deletion, and replacement of tags of at least some or a combination of a VLAN, priority, discard priority, a destination, and the like, or processing of at least some or a combination of collection, distribution, sorting, copy, folding, and transmission without tag change.

The control unit 14 is connected with another component included in the device, such as the optical SW 10, the TRx 11, the SW 12, the SW 13, the proxy unit 15, or the external server 16, or with the external device or the like. The control unit 14 controls a component included in the device, such as the optical SW 10, the TRx 11, the SW 12, the SW 13, the proxy unit 15, or the external server 16, or the external device or the like, or forwards an instruction through a component included in the device, such as the optical SW 10, the TRx 11, the SW 12, the SW 13, the proxy unit 15, or the external server 16, or the external device or the like.

The proxy unit 15 illustrated in FIGS. 1 and 17 may be installed on a data path from or to an OLT. However, another device (for example, the concentrator SW for collection/distribution of traffic from or to a plurality of OLTs) is interposed in some cases, and thus direct connection is not necessarily made. As for control flow, the proxy unit 15 may be included in any of the optical SW 10, the TRx 11, the SW 12, the SW 13, the control unit 14, and the external server 16.

The proxy unit 15 is connected with a higher-level device (not illustrated) directly or through the concentrator SW or the like. The proxy unit 15 performs autonomous control, is controlled by another component included in the device, such as the optical SW 10, the TRx 11, the SW 12, the SW 13, the control unit 14, or the external server 16 or by the external device or the like, or is controlled by an instruction forwarded through another component included in the device, such as the optical SW 10, the TRx 11, the SW 12, the SW 13, the control unit 14, or the external server 16, or through the external device or the like. The proxy unit 15 performs, on part or all of traffic of the SW 13 or a higher-level device (not illustrated) in accordance with a predetermined procedure, addition, deletion, and replacement of tags of at least some or a combination of a VLAN, priority, discard priority, a destination, and the like, or processing of at least some or a combination of collection, distribution, sorting, copy, folding, and transmission without tag change.

The external server 16 is connected with the TRx 11, the SW 12, the SW 13, the control unit 14, the proxy unit 15, the external OpS or the like (not illustrated), the controller (not illustrated), or the external device (not illustrated). The external server 16 controls another component included in the device, such as the optical SW 10, the TRx 11, the SW 12, the SW 13, the control unit 14, or the proxy unit 15, or the external device or the like, or forwards an instruction through another component included in the device such as the optical SW 10, the TRx 11, the SW 12, the SW 13, the control unit 14, or the proxy unit 15, or through the external device or the like.

A component included in the device, such as the optical SW 10, the TRx 11, the SW 12, the SW 13, the proxy unit 15, or the external server 16 may transmit at least part of traffic of any other component included in the device, at least part of copy thereof, at least part of rewritten traffic of at least part thereof, or at least part of response thereto to another component included in the device, such as the optical SW 10, the TRx 11, the SW 12, the SW 13, the proxy unit 15, or the external server 16, or to the external device or the like.

Note that an element may be omitted as appropriate, and communication with an omitted element is, for example, skipped, and communication with the next element is performed. Communication may be performed between counterparts from which elements are omitted.

In a communication system of a communication system configuration (1-2), the TRxs 11 ($\lambda A$ to $\lambda A$), the TRxs 11 ($\lambda B$ to $\lambda B$), . . . , the TRxs 11 ($\lambda N$ to $\lambda N$) configured to transmit and receive optical signals of the same wavelength in place of different wavelengths are connected with the respective SWs 12 in addition to the configuration of the communication system configuration (1-1). Furthermore, a plurality of at least some of the TRxs 11 of different wavelengths may be connected with the SWs 12. The other configuration is the same.

A communication system of a communication system configuration (2-1) includes the optical SW 10, the TRxs 11, the SWs 12, the SW 13, the control unit 14, and the proxy unit 15 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths ($\lambda A$ to $\lambda N$) are connected with the corresponding SW 12. Each TRx 11 processes part or all of traffic of the optical SW 10 or the SW 12 as in 1-1. The TRx 11 performs autonomous control, is controlled by another component included in the device or by the external device or the like, or is controlled by an instruction forwarded through another component included in the device or the external device or the like.

Each SW 12 is connected with the SW 13. The SW 12 performs autonomous control, is controlled by another component included in the device or by the external device or the like, or is controlled by an instruction forwarded through another component included in the device or the external device or the like. The SW 12 processes part or all of traffic of each TRx 11 or the SW 13 as in 1-1.

The SW 13 is connected with the proxy unit 15 directly or through the concentrator SW or the like. The SW 13 performs autonomous control, is controlled by another component included in the device or by the external device or the like, or is controlled by an instruction forwarded through another component included in the device or the external device or the like. The SW 13 processes part or all of traffic of each SW 12 or the proxy unit 15 as in 1-1.

The control unit 14 is connected with the optical SW 10, the TRxs 11, the SWs 12, the SW 13, the proxy unit 15, or the external device or the like. The control unit 14 controls a component included in the device or the external device or the like, or forwards an instruction through a component included in the device or the external device or the like.

The proxy unit 15 is connected with a higher-level device (not illustrated) directly or through the concentrator SW or the like. The proxy unit 15 performs autonomous control, is controlled by another component included in the device or by the external device or the like, or is controlled by an instruction forwarded through another component included in the device or the external device or the like. The proxy unit 15 processes part or all of traffic of the SW 13 or the higher-level device (not illustrated) as in 1-1.

A component included in the device may transmit at least part of traffic of any other component included in the device, at least part of copy thereof, at least part of rewritten traffic of at least part thereof, or at least part of response thereto to another component included in the device or the external device or the like.

In a communication system of a communication system configuration (2-2), the TRxs 11 ($\lambda A$ to $\lambda A$), the TRxs 11 ($\lambda B$ to $\lambda B$), . . . , the TRxs 11 ($\lambda N$ to $\lambda N$) configured to transmit and receive optical signals of the same wavelength in place of different wavelengths are connected with the respective SWs 12 in addition to the configuration of the communication system configuration (2-1). Furthermore, a plurality of at least some of the TRxs 11 of different wavelengths may be connected with the SWs 12. The other configuration is the same.

A communication system of a communication system configuration (3-1) includes the optical SW 10, the TRxs 11, the SWs 12, the SW 13, the control unit 14, and the external server 16 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the corresponding SW 12. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 12 as in 1-1.

Each SW 12 is connected with the SW 13. The SW 12 performs autonomous control, is controlled by another component included in the device or by the external device or the like, or is controlled by an instruction forwarded through another component included in the device or the external device or the like. The SW 12 processes part or all of traffic of each TRx 11 or the SW 13 as in 1-1.

The SW 13 is connected with a higher-level device (not illustrated) directly or through the concentrator SW or the like. The SW 13 performs autonomous control, is controlled by another component included in the device or by the external device or the like, or is controlled by an instruction forwarded through another component included in the device or the external device or the like. The SW 13 processes part or all of traffic of each SW 12 as in 1-1.

The control unit 14 is connected with the optical SW 10, the TRxs 11, the SWs 12, the SW 13, the external server 16, the external OpS or the like (not illustrated), the controller (not illustrated), or the external device (not illustrated). The control unit 14 controls a component included in the device or the external device or the like, or forwards an instruction through a component included in the device or the external device or the like.

The external server 16 is connected with the optical SW 10, the TRxs 11, the SWs 12, the SW 13, the control unit 14, the external OpS or the like (not illustrated), the controller (not illustrated), or the external device (not illustrated). The external server 16 controls another component included in the device or the external device or the like or forwards an instruction through another component included in the device or the external device or the like.

A component included in the device may transmit at least part of traffic of another component included in the device or the external device or the like, at least part of copy thereof, at least part of rewritten traffic of at least part thereof, or at least part of response thereto to another component included in the device or the external device or the like.

In a communication system of a communication system configuration (3-2), the TRxs 11 (λA to λA), the TRxs 11 (λB to λB), . . . , the TRxs 11 (λN to λN) configured to transmit and receive optical signals of the same wavelength in place of different wavelengths are connected with the respective SWs 12 in addition to the configuration of the communication system configuration (3-1). Furthermore, a plurality of at least some of the TRxs 11 of different wavelengths may be connected with the SWs 12. The other configuration is the same.

A communication system of a communication system configuration (4-1) includes the optical SW 10, the TRxs 11, the SWs 12, the SW 13, the proxy unit 15, and the external server 16 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the corresponding SW 12. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 12 as in 1-1.

Each SW 12 is connected with the SW 13. The SW 12 performs autonomous control, is controlled by another component included in the device or by the external device or the like, or is controlled by an instruction forwarded through another component included in the device or the external device or the like. The SW 12 processes part or all of traffic of each TRx 11 or the SW 13 as in 1-1.

The SW 13 is connected with the proxy unit 15 directly or through the concentrator SW or the like. The SW 13 performs autonomous control, is controlled by another component included in the device or by the external device or the like, or is controlled by an instruction forwarded through another component included in the device or the external device or the like. The SW 13 processes part or all of traffic of the optical SW 10, the SW 12, or the proxy unit 15 as in 1-1.

The proxy unit 15 is connected with a higher-level device (not illustrated) directly or through the concentrator SW or the like. The proxy unit 15 performs autonomous control, is controlled by another component included in the device or by the external device or the like, or is controlled by an instruction forwarded through another component included in the device or the external device or the like. The proxy unit 15 processes part or all of traffic of the SW 13 or the higher-level device (not illustrated) as in 1-1.

The external server 16 is connected with the optical SW 10, the TRxs 11, the SWs 12, the SW 13, the proxy unit 15, or the external device or the like. The external server 16 controls another component included in the device or the external device or the like or forwards an instruction through another component included in the device or the external device or the like.

A component included in the device may transmit at least part of traffic of another component included in the device or the external device or the like, at least part of copy thereof, at least part of rewritten traffic of at least part thereof, or at least part of response thereto to another component included in the device or the external device or the like.

In a communication system of a communication system configuration (4-2), the TRxs 11 (λA to λA), the TRxs 11 (λB to λB), . . . , the TRxs 11 (λN to λN) configured to transmit and receive optical signals of the same wavelength in place of different wavelengths are connected with the respective SWs 12 in addition to the configuration of the communication system configuration (4-1). Furthermore, a plurality of at least some of the TRxs 11 of different wavelengths may be connected with the SWs 12. The other configuration is the same.

A communication system of a communication system configuration (5-1) includes the optical SW 10, the TRxs 11, the SWs 12, the control unit 14, the proxy unit 15, and the external server 16 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the corresponding SW 12. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 12 as in 1-1.

Each SW 12 is connected with the proxy unit 15 directly or through the concentrator SW or the like. The SW 12 performs autonomous control, is controlled by another component included in the device or by the external device or the like, or is controlled by an instruction forwarded through another component included in the device or the external device or the like. The SW 12 processes part or all of traffic of the TRxs 11 or the proxy unit 15 as in 1-1.

The control unit 14 is connected with the optical SW 10, the TRxs 11, the SWs 12, the proxy unit 15, the external server 16, the external OpS or the like (not illustrated), the controller (not illustrated), or the external device (not illustrated). The control unit 14 controls a component included in the device or the external device or the like, or forwards an instruction through a component included in the device or the external device or the like.

The proxy unit 15 is connected with a higher-level device (not illustrated) directly or through the concentrator SW or the like. The proxy unit 15 performs autonomous control, is controlled by another component included in the device or by the external device or the like, or is controlled by an instruction forwarded through another component included in the device or the external device or the like. The proxy unit 15 processes part or all of traffic of each SW 12 or the higher-level device (not illustrated) as in 1-1.

The external server 16 is connected with the optical SW 10, the TRxs 11, the SWs 12, the control unit 14, the proxy unit 15, the external OpS or the like (not illustrated), the controller (not illustrated), or the external device (not illustrated). The external server 16 controls another component included in the device or the external device or the like or forwards an instruction through another component included in the device or the external device or the like.

A component included in the device may transmit at least part of traffic of another component included in the device or the external device or the like, at least part of copy thereof, at least part of rewritten traffic of at least part thereof, or at least part of response thereto to another component included in the device or the external device or the like.

In a communication system of a communication system configuration (5-2), the TRxs 11 (λA to λA), the TRxs 11 (λB to λB), . . . , the TRxs 11 (λN to λN) configured to transmit and receive optical signals of the same wavelength in place of different wavelengths are connected with the respective SWs 12 in addition to the configuration of the communication system configuration (5-1). Furthermore, a plurality of at least some of the TRxs 11 of different wavelengths may be connected with the SWs 12. The other configuration is the same.

A communication system of a communication system configuration (6-1) includes the optical SW 10, the TRxs 11, the SW 13, the control unit 14, the proxy unit 15, and the external server 16 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the SW 13. Each transmission-reception unit 11 (TRx) performs autonomous control, is controlled by another component included in the device or by the external device or the like, or is controlled by an instruction forwarded through another component included in the device or the external device or the like. The TRx 11 processes part or all of traffic of the optical SW 10 or the SW 13 as in 1-1.

The SW 13 is connected with the proxy unit 15 directly or through the concentrator SW or the like. The SW 13 performs autonomous control, is controlled by another component included in the device or by the external device or the like, or is controlled by an instruction forwarded through another component included in the device or the external device or the like. The SW 13 processes part or all of traffic of each TRx 11 or the proxy unit 15 as in 1-1.

The control unit 14 is connected with the optical SW 10, the TRxs 11, the SW 13, the proxy unit 15, or the external server 16, or the external device or the like. The control unit 14 controls a component included in the device or the external device or the like, or forwards an instruction through a component included in the device or the external device or the like.

The proxy unit 15 is connected with a higher-level device (not illustrated) directly or through the concentrator SW or the like. The proxy unit 15 performs autonomous control, is controlled by another component included in the device or by the external device or the like, or is controlled by an instruction forwarded through another component included in the device or the external device or the like. The proxy unit 15 processes part or all of traffic of the SW 13 or the higher-level device (not illustrated) as in 1-1.

The external server 16 is connected with the optical SW 10, the TRxs 11, the SW 13, the control unit 14, the proxy unit 15, the external OpS or the like (not illustrated), the controller (not illustrated), or the external device (not illustrated). The external server 16 controls another component included in the device or the external device or the like or forwards an instruction through another component included in the device or the external device or the like.

A component included in the device may transmit at least part of traffic of another component included in the device or the external device or the like, at least part of copy thereof, at least part of rewritten traffic of at least part thereof, or at least part of response thereto to another component included in the device or the external device or the like.

In a communication system of a communication system configuration (6-2), the TRxs 11 (λA to λA), the TRxs 11 (λB toλB), . . . , the TRxs 11 (λN to λN) configured to transmit and receive optical signals of the same wavelength in place of different wavelengths are connected with the SW 13 in addition to the configuration of the communication system configuration (6-1). Furthermore, a plurality of at least some of the TRxs 11 of different wavelengths may be connected with the SW 13. The other configuration is the same.

A communication system of a communication system configuration (7-1) includes the optical SW 10, the TRxs 11, the SWs 12, the SW 13, and the control unit 14 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the corresponding SW 12. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 12 as in 1-1.

Each SW 12 is connected with the SW 13. The SW 12 performs autonomous control, is controlled by another component included in the device or by the external device or the like, or is controlled by an instruction forwarded through another component included in the device or the external device or the like. The SW 12 processes part or all of traffic of each TRx 11 or the SW 13 as in 1-1.

The SW 13 is connected with a higher-level device (not illustrated) directly or through the concentrator SW or the like. The SW 13 performs autonomous control, is controlled by another component included in the device or by the external device or the like, or is controlled by an instruction forwarded through another component included in the device or the external device or the like. The SW 13 processes part or all of traffic of each SW 12 or the higher-level device (not illustrated) as in 1-1.

The control unit 14 is connected with the optical SW 10, the TRxs 11, the SWs 12, the SW 13, the external OpS or the like (not illustrated), the controller (not illustrated), or the external device (not illustrated). The control unit 14 controls a component included in the device or the external device or the like, or forwards an instruction through a component included in the device or the external device or the like.

A component included in the device may transmit at least part of traffic of another component included in the device or the external device or the like, at least part of copy thereof, at least part of rewritten traffic of at least part thereof, or at least part of response thereto to another component included in the device or the external device or the like.

In a communication system of a communication system configuration (7-2), the TRxs 11 (λA to λA), the TRxs 11 (λB to λB), ..., the TRxs 11 (λN to λN) configured to transmit and receive optical signals of the same wavelength in place of different wavelengths are connected with the respective SWs 12 in addition to the configuration of the communication system configuration (7-1). Furthermore, a plurality of at least some of the TRxs 11 of different wavelengths may be connected with the SWs 12. The other configuration is the same.

A communication system of a communication system configuration (8-1) includes the optical SW 10, the TRxs 11, the SWs 12, the SW 13, and the proxy unit 15 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the corresponding SW 12. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 12 as in 1-1.

Each SW 12 is connected with the SW 13. The SW 12 performs autonomous control, is controlled by another component included in the device or by the external device or the like, or is controlled by an instruction forwarded through another component included in the device or the external device or the like. The SW 12 processes part or all of traffic of each TRx 11 or the SW 13 as in 1-1.

The SW 13 is connected with the proxy unit 15 directly or through the concentrator SW or the like. The SW 13 performs autonomous control, is controlled by another component included in the device or by the external device or the like, or is controlled by an instruction forwarded through another component included in the device or the external device or the like. The SW 13 processes part or all of traffic of each SW 12 or the proxy unit 15 as in 1-1.

The proxy unit 15 is connected with a higher-level device (not illustrated) directly or through the concentrator SW or the like. The proxy unit 15 performs autonomous control, is controlled by another component included in the device or by the external device or the like, or is controlled by an instruction forwarded through another component included in the device or the external device or the like. The proxy unit 15 processes part or all of traffic of the SW 13 or the higher-level device (not illustrated) as in 1-1.

A component included in the device may transmit at least part of traffic of another component included in the device or the external device or the like, at least part of copy thereof, at least part of rewritten traffic of at least part thereof, or at least part of response thereto to another component included in the device or the external device or the like.

In a communication system of a communication system configuration (8-2), the TRxs 11 (λA to λA), the TRxs 11 (λB to λB), ..., the TRxs 11 (λN to λN) configured to transmit and receive optical signals of the same wavelength in place of different wavelengths are connected with the respective SWs 12 in addition to the configuration of the communication system configuration (8-1). Furthermore, a plurality of at least some of the TRxs 11 of different wavelengths may be connected with the SWs 12. The other configuration is the same.

A communication system of a communication system configuration (9-1) includes the optical SW 10, the TRxs 11, the SWs 12, the control unit 14, and the proxy unit 15 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the corresponding SW 12. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 12 as in 1-1.

Each SW 12 is connected with the proxy unit 15 directly or through the concentrator SW or the like. The SW 12 performs autonomous control, is controlled by another component included in the device or by the external device or the like, or is controlled by an instruction forwarded through another component included in the device or the external device or the like. The SW 12 processes part or all of traffic of the TRxs 11 or the proxy unit 15 as in 1-1.

The control unit 14 is connected with the optical SW 10, the TRxs 11, the SWs 12, the proxy unit 15, the external OpS or the like (not illustrated), the controller (not illustrated), or the external device (not illustrated). The control unit 14 controls a component included in the device or the external device or the like, or forwards an instruction through a component included in the device or the external device or the like.

The proxy unit 15 is connected with a higher-level device (not illustrated) directly or through the concentrator SW or the like. The proxy unit 15 performs autonomous control, is controlled by another component included in the device or by the external device or the like, or is controlled by an instruction forwarded through another component included in the device or the external device or the like. The proxy unit 15 processes part or all of traffic of each SW 12 or the higher-level device (not illustrated) as in 1-1.

A component included in the device may transmit at least part of traffic of another component included in the device or the external device or the like, at least part of copy thereof, at least part of rewritten traffic of at least part thereof, or at least part of response thereto to another component included in the device or the external device or the like.

In a communication system of a communication system configuration (9-2), the TRxs 11 ($\lambda$A to $\lambda$A), the TRxs 11 ($\lambda$B to$\lambda$B), . . . , the TRxs 11 ($\lambda$N to $\lambda$N) configured to transmit and receive optical signals of the same wavelength in place of different wavelengths are connected with the respective SWs 12 in addition to the configuration of the communication system configuration (9-1). Furthermore, a plurality of at least some of the TRxs 11 of different wavelengths may be connected with the SWs 12. The other configuration is the same.

A communication system of a communication system configuration (10-1) includes the optical SW 10, the TRxs 11, the SW 13, the control unit 14, and the proxy unit 15 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths ($\lambda$A to $\lambda$N) are connected with the SW 13. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 13 as in 1-1.

The SW 13 is connected with the proxy unit 15 directly or through the concentrator SW or the like. The SW 13 performs autonomous control, is controlled by another component included in the device or by the external device or the like, or is controlled by an instruction forwarded through another component included in the device or the external device or the like. The SW 13 processes part or all of traffic of each TRx 11 or the proxy unit 15 as in 1-1.

The control unit 14 is connected with the optical SW 10, the TRxs 11, the SW 13, the proxy unit 15, or the external device or the like. The control unit 14 controls a component included in the device or the external device or the like, or forwards an instruction through a component included in the device or the external device or the like.

The proxy unit 15 is connected with a higher-level device (not illustrated) directly or through the concentrator SW or the like. The proxy unit 15 performs autonomous control, is controlled by another component included in the device or by the external device or the like, or is controlled by an instruction forwarded through another component included in the device or the external device or the like. The proxy unit 15 processes part or all of traffic of the SW 13 or the higher-level device (not illustrated) as in 1-1.

A component included in the device may transmit at least part of traffic of another component included in the device or the external device or the like, at least part of copy thereof, at least part of rewritten traffic of at least part thereof, or at least part of response thereto to another component included in the device or the external device or the like.

In a communication system of a communication system configuration (10-2), the TRxs 11 ($\lambda$A to $\lambda$A), the TRxs 11 ($\lambda$B to$\lambda$B), . . . , the TRxs 11 ($\lambda$N to $\lambda$N) configured to transmit and receive optical signals of the same wavelength in place of different wavelengths are connected with the SW 13 in addition to the configuration of the communication system configuration (10-1). Furthermore, a plurality of at least some of the TRxs 11 of different wavelengths may be connected with the SW 13. The other configuration is the same.

A communication system of a communication system configuration (11-1) includes the optical SW 10, the TRxs 11, the SWs 12, the SW 13, and the external server 16 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths ($\lambda$A to $\lambda$N) are connected with the corresponding SW 12. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 12 as in 1-1.

Each SW 12 is connected with the SW 13. The SW 12 performs autonomous control, is controlled by another component included in the device or by the external device or the like, or is controlled by an instruction forwarded through another component included in the device or the external device or the like. The SW 12 processes part or all of traffic of each TRx 11 or the SW 13 as in 1-1.

The SW 13 is connected with a higher-level device (not illustrated) directly or through the concentrator SW or the like. The SW 13 performs autonomous control, is controlled by another component included in the device or by the external device or the like, or is controlled by an instruction forwarded through another component included in the device or the external device or the like. The SW 13 processes part or all of traffic of each SW 12 or the higher-level device (not illustrated) as in 1-1.

The external server 16 is connected with the optical SW 10, the TRxs 11, the SWs 12, the SW 13, the external OpS or the like (not illustrated), the controller (not illustrated), or the external device (not illustrated). The external server 16 controls a component included in the device or the external device or the like, or forwards an instruction through a component included in the device or the external device or the like.

A component included in the device may transmit at least part of traffic of another component included in the device or the external device or the like, at least part of copy thereof, at least part of rewritten traffic of at least part thereof, or at least part of response thereto to another component included in the device or the external device or the like.

In a communication system of a communication system configuration (11-2), the TRxs 11 (λA to λA), the TRxs 11 (λB to λB), . . . , the TRxs 11 (λN to λN) configured to transmit and receive optical signals of the same wavelength in place of different wavelengths are connected with the respective SWs 12 in addition to the configuration of the communication system configuration (11-1). Furthermore, a plurality of at least some of the TRxs 11 of different wavelengths may be connected with the SWs 12. The other configuration is the same.

A communication system of a communication system configuration (12-1) includes the optical SW 10, the TRxs 11, the SWs 12, the control unit 14, and the external server 16 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the corresponding SW 12. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 12 as in 1-1.

Each SW 12 is connected with a higher-level device (not illustrated) directly or through the concentrator SW or the like. The SW 12 performs autonomous control, is controlled by another component included in the device or by the external device or the like, or is controlled by an instruction forwarded through another component included in the device or the external device or the like. The SW 12 processes part or all of traffic of the TRx 11 or the higher-level device (not illustrated) as in 1-1.

The control unit 14 is connected with the optical SW 10, the TRxs 11, the SWs 12, the external server 16, the external OpS or the like (not illustrated), the controller (not illustrated), or the external device (not illustrated). The control unit 14 controls a component included in the device or the external device or the like, or forwards an instruction through a component included in the device or the external device or the like.

The external server 16 is connected with the optical SW 10, the TRxs 11, the SWs 12, the control unit 14, or the external device or the like. The external server 16 controls another component included in the device or forwards an instruction through another component included in the device.

A component included in the device may transmit at least part of traffic of another component included in the device or the external device or the like, at least part of copy thereof, at least part of rewritten traffic of at least part thereof, or at least part of response thereto to another component included in the device or the external device or the like.

In a communication system of a communication system configuration (12-2), the TRxs 11 (λA to λA), the TRxs 11 (λB to λB), . . . , the TRxs 11 (λN to λN) configured to transmit and receive optical signals of the same wavelength in place of different wavelengths are connected with the respective SWs 12 in addition to the configuration of the communication system configuration (12-1). Furthermore, a plurality of at least some of the TRxs 11 of different wavelengths may be connected with the SWs 12. The other configuration is the same.

A communication system of a communication system configuration (13-1) includes the optical SW 10, the TRxs 11, the SW 13, the control unit 14, and the external server 16 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the SW 13. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 13 as in 1-1.

The SW 13 is connected with a higher-level device (not illustrated) directly or through the concentrator SW or the like. The SW 13 performs autonomous control, is controlled by another component included in the device or by the external device or the like, or is controlled by an instruction forwarded through another component included in the device or the external device or the like. The SW 13 processes part or all of traffic of each TRx 11 or the higher-level device (not illustrated) as in 1-1.

The control unit 14 is connected with the optical SW 10, the TRxs 11, the SW 13, the external server 16, or the external device or the like. The control unit 14 controls a component included in the device or the external device or the like, or forwards an instruction through a component included in the device or the external device or the like.

The external server 16 is connected with the optical SW 10, the TRxs 11, the SW 13, the control unit 14, or the external device or the like. The external server 16 controls another component included in the device or the external device or the like or forwards an instruction through another component included in the device or the external device or the like.

A component included in the device may transmit at least part of traffic of another component included in the device or the external device or the like, at least part of copy thereof, at least part of rewritten traffic of at least part thereof, or at least part of response thereto to another component included in the device or the external device or the like.

In a communication system of a communication system configuration (13-2), the TRxs 11 (λA to λA), the TRxs 11 (λB to λB), . . . , the TRxs 11 (λN to λN) configured to transmit and receive optical signals of the same wavelength in place of different wavelengths are connected with the SW 13 in addition to the configuration of the communication system configuration (13-1). Furthermore, a plurality of at least some of the TRxs 11 of different wavelengths may be connected with the SW 13. The other configuration is the same.

A communication system of a communication system configuration (14-1) includes the optical SW 10, the TRxs 11, the SWs 12, the proxy unit 15, and the external server 16 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the corresponding SW 12. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 12 as in 1-1.

Each SW 12 is connected with the proxy unit 15 directly or through the concentrator SW or the like. The SW 12 performs autonomous control, is controlled by another component included in the device or by the external device or the like, or is controlled by an instruction forwarded through another component included in the device or the external device or the like. The SW 12 processes part or all of traffic of the TRxs 11 or the proxy unit 15 as in 1-1.

The proxy unit 15 performs autonomous control, is controlled by another component included in the device or by the external device or the like, or is controlled by an instruction forwarded through another component included in the device or the external device or the like. The proxy unit 15 processes part or all of traffic of each SW 12 or a higher-level device (not illustrated) as in 1-1.

The external server 16 is connected with the optical SW 10, the TRxs 11, the SWs 12, the proxy unit 15, the external OpS or the like (not illustrated), the controller (not illustrated), or the external device (not illustrated). The external server 16 controls another component included in the device or the external device or the like or forwards an instruction through another component included in the device or the external device or the like.

A component included in the device may transmit at least part of traffic of another component included in the device or the external device or the like, at least part of copy thereof, at least part of rewritten traffic of at least part thereof, or at least part of response thereto to another component included in the device or the external device or the like.

In a communication system of a communication system configuration (14-2), the TRxs 11 (λA to λA), the TRxs 11 (λB to λB), . . . , the TRxs 11 (λN to λN) configured to transmit and receive optical signals of the same wavelength in place of different wavelengths are connected with the respective SWs 12 in addition to the configuration of the communication system configuration (14-1). Furthermore, a plurality of at least some of the TRxs 11 of different wavelengths may be connected with the SWs 12. The other configuration is the same.

A communication system of a communication system configuration (15-1) includes the optical SW 10, the TRxs 11, the SW 13, the proxy unit 15, and the external server 16 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the SW 13. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 13 as in 1-1.

The SW 13 is connected with the proxy unit 15 directly or through the concentrator SW or the like. The SW 13 performs autonomous control, is controlled by another component included in the device or by the external device or the like, or is controlled by an instruction forwarded through another component included in the device or the external device or the like. The SW 13 processes part or all of traffic of each TRx 11 or the proxy unit 15 as in 1-1.

The proxy unit 15 performs autonomous control, is controlled by another component included in the device or by the external device or the like, or is controlled by an instruction forwarded through another component included in the device or the external device or the like. The proxy unit 15 processes part or all of traffic of the SW 13 or a higher-level device (not illustrated) as in 1-1.

The external server 16 is connected with the optical SW 10, the TRxs 11, the SW 13, the proxy unit 15, or the external device or the like. The external server 16 controls another component included in the device or the external device or the like or forwards an instruction through another component included in the device or the external device or the like.

A component included in the device may transmit at least part of traffic of another component included in the device or the external device or the like, at least part of copy thereof, at least part of rewritten traffic of at least part thereof, or at least part of response thereto to another component included in the device or the external device or the like.

In a communication system of a communication system configuration (15-2), the TRxs 11 (λA to λA), the TRxs 11 (λB to λB), . . . , the TRxs 11 (λN to λN) configured to transmit and receive optical signals of the same wavelength in place of different wavelengths in addition to the configuration of the communication system configuration (15-1) are connected with the SW 13. Furthermore, a plurality of at least some of the TRxs 11 of different wavelengths may be connected with the SW 13. The other configuration is the same.

A communication system of a communication system configuration (16-1) includes the optical SW 10, the TRxs 11, the control unit 14, the proxy unit 15, and the external server 16 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the proxy unit 15 directly or through the concentrator SW or the like. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the proxy unit 15 as in 1-1.

The control unit 14 is connected with the optical SW 10, the TRxs 11, the proxy unit 15, the external server 16, the external OpS or the like (not illustrated), the controller (not illustrated), or the external device (not illustrated). The control unit 14 controls a component included in the device or the external device or the like, or forwards an instruction through a component included in the device or the external device or the like.

The proxy unit 15 is connected with a higher-level device (not illustrated) directly or through the concentrator SW or the like. The proxy unit 15 performs autonomous control, is controlled by another component included in the device or by the external device or the like, or is controlled by an instruction forwarded through another component included in the device or the external device or the like. The proxy unit 15 processes part or all of traffic of each TRx 11 or the higher-level device (not illustrated) as in 1-1.

The external server 16 is connected with the optical SW 10, the TRxs 11, the control unit 14, the proxy unit 15, the external OpS or the like (not illustrated), the controller (not illustrated), or the external device (not illustrated). The external server 16 controls another component included in the device or the external device or the like or forwards an instruction through another component included in the device or the external device or the like.

A component included in the device may transmit at least part of traffic of another component included in the device or the external device or the like, at least part of copy thereof, at least part of rewritten traffic of at least part thereof, or at least part of response thereto to another component included in the device or the external device or the like.

In a communication system of a communication system configuration (16-2), the TRxs 11 (λA to λA), the TRxs 11 (λB to λB), . . . , the TRxs 11 (λN to λN) configured to transmit and receive optical signals of the same wavelength in place of different wavelengths are connected with the proxy unit 15 directly or through the concentrator SW or the like in addition to the configuration of the communication system configuration (16-1). Moreover, a plurality of at least some of the TRxs 11 of different wavelengths may be connected with the proxy unit 15 directly or through the concentrator SW or the like. The other configuration is the same.

A communication system of a communication system configuration (17-1) includes the optical SW 10, the TRxs 11, the SWs 12, and the SW 13 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the corresponding SW 12. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 12 as in 1-1.

Each SW 12 is connected with the SW 13. The SW 12 performs autonomous control, is controlled by another component included in the device or by the external device or the like, or is controlled by an instruction forwarded through another component included in the device or the external device or the like. The SW 12 processes part or all of traffic of each TRx 11 or the SW 13 as in 1-1.

The SW 13 is connected with a higher-level device (not illustrated) directly or through the concentrator SW or the like. The SW 13 performs autonomous control, is controlled by another component included in the device or by the external device or the like, or is controlled by an instruction forwarded through another component included in the device or the external device or the like. The SW 13 processes part or all of traffic of each SW 12 or the higher-level device (not illustrated) as in 1-1.

A component included in the device may transmit at least part of traffic of another component included in the device or the external device or the like, at least part of copy thereof, at least part of rewritten traffic of at least part thereof, or at least part of response thereto to another component included in the device or the external device or the like.

In a communication system of a communication system configuration (17-2), the TRxs 11 (λA to λA), the TRxs 11 (λB to λB), . . . , the TRxs 11 (λN to λN) configured to transmit and receive optical signals of the same wavelength in place of different wavelengths are connected with the respective SWs 12 in addition to the configuration of the communication system configuration (17-1). Furthermore, a plurality of at least some of the TRxs 11 of different wavelengths may be connected with the SWs 12. The other configuration is the same.

A communication system of a communication system configuration (18-1) includes the optical SW 10, the TRxs 11, the SWs 12, and the control unit 14 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the corresponding SW 12. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 12 as in 1-1.

Each SW 12 is connected with a higher-level device (not illustrated) directly or through the concentrator SW or the like. The SW 12 performs autonomous control, is controlled by another component included in the device or by the external device or the like, or is controlled by an instruction forwarded through another component included in the device or the external device or the like. The SW 12 processes part or all of traffic of the TRx 11 or the higher-level device (not illustrated) as in 1-1.

The control unit 14 is connected with the optical SW 10, the TRxs 11, the SWs 12, the external OpS or the like (not illustrated), the controller (not illustrated), or the external device (not illustrated). The control unit 14 controls a component included in the device or the external device or the like, or forwards an instruction through a component included in the device or the external device or the like.

A component included in the device may receive part or all of traffic of another component included in the device or the external device or the like, or copy thereof and transmit part or all of the received traffic, traffic as rewrite of part or all of the received traffic, or a response to the received traffic to another component included in the device or the external device or the like.

In a communication system of a communication system configuration (18-2), the TRxs 11 ($\lambda$A to $\lambda$A), the TRxs 11 ($\lambda$B to $\lambda$B), . . . , the TRxs 11 ($\lambda$N to $\lambda$N) configured to transmit and receive optical signals of the same wavelength in place of different wavelengths are connected with the respective SWs 12 in addition to the configuration of the communication system configuration (18-1). Furthermore, a plurality of at least some of the TRxs 11 of different wavelengths may be connected with the SWs 12. The other configuration is the same.

A communication system of a communication system configuration (19-1) includes the optical SW 10, the TRxs 11, the SW 13, and the control unit 14 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths ($\lambda$A to $\lambda$N) are connected with the SW 13. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 13 as in 1-1.

The SW 13 is connected with a higher-level device (not illustrated) directly or through the concentrator SW or the like. The SW 13 performs autonomous control, is controlled by another component included in the device or by the external device or the like, or is controlled by an instruction forwarded through another component included in the device or the external device or the like. The SW 13 processes part or all of traffic of each TRx 11 or the higher-level device (not illustrated) as in 1-1.

The control unit 14 is connected with the optical SW 10, the TRxs 11, the SW 13, the external OpS or the like (not illustrated), the controller (not illustrated), or the external device (not illustrated). The control unit 14 controls a component included in the device or the external device or the like, or forwards an instruction through a component included in the device or the external device or the like.

A component included in the device may receive part or all of traffic of another component included in the device or the external device or the like, or copy thereof and transmit part or all of the received traffic, traffic as rewrite of part or all of the received traffic, or a response to the received traffic to another component included in the device or the external device or the like.

In a communication system of a communication system configuration (19-2), the TRxs 11 ($\lambda$A to $\lambda$A), the TRxs 11 ($\lambda$B to $\lambda$B), . . . , the TRxs 11 ($\lambda$N to $\lambda$N) configured to transmit and receive optical signals of the same wavelength in place of different wavelengths are connected with the SW 13 in addition to the configuration of the communication system configuration (19-1). Furthermore, a plurality of at least some of the TRxs 11 of different wavelengths may be connected with the SW 13. The other configuration is the same.

A communication system of a communication system configuration (20-1) includes the optical SW 10, the TRxs 11, the SWs 12, and the proxy unit 15 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths ($\lambda$A to $\lambda$N) are connected with the corresponding SW 12. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 12 as in 1-1.

Each SW 12 is connected with the proxy unit 15 directly or through the concentrator SW or the like. The SW 12 performs autonomous control, is controlled by another component included in the device or by the external device or the like, or is controlled by an instruction forwarded through another component included in the device or the external device or the like. The SW 12 processes part or all of traffic of the TRxs 11 or the proxy unit 15 as in 1-1.

The proxy unit 15 is connected with a higher-level device (not illustrated) directly or through the concentrator SW or the like. The proxy unit 15 performs autonomous control, is controlled by another component included in the device or by the external device or the like, or is controlled by an instruction forwarded through another component included in the device or the external device or the like. The proxy unit 15 processes part or all of traffic of each SW 12 or the higher-level device (not illustrated) as in 1-1.

A component included in the device may receive part or all of traffic of another component included in the device or the external device or the like, or copy thereof and transmit part or all of the received traffic, traffic as rewrite of part or all of the received traffic, or a response to the received traffic to another component included in the device or the external device or the like.

In a communication system of a communication system configuration (20-2), the TRxs 11 ($\lambda$A to $\lambda$A), the TRxs 11 ($\lambda$B to $\lambda$B), . . . , the TRxs 11 ($\lambda$N to $\lambda$N) configured to transmit and receive optical signals of the same wavelength in place of different wavelengths are connected with the respective SWs 12 in addition to the configuration of the communication system configuration (20-1). Furthermore, a plurality of at least some of the TRxs 11 of different wavelengths may be connected with the SWs 12. The other configuration is the same.

A communication system of a communication system configuration (21-1) includes the optical SW 10, the TRxs 11, the SW 13, and the proxy unit 15 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the SW 13. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 13 as in 1-1.

The SW 13 is connected with the proxy unit 15 directly or through the concentrator SW or the like. The SW 13 performs autonomous control, is controlled by another component included in the device or by the external device or the like, or is controlled by an instruction forwarded through another component included in the device or the external device or the like. The SW 13 processes part or all of traffic of each TRx 11 or the proxy unit 15 as in 1-1.

The proxy unit 15 is connected with a higher-level device (not illustrated) directly or through the concentrator SW or the like. The proxy unit 15 performs autonomous control, is controlled by another component included in the device or by the external device or the like, or is controlled by an instruction forwarded through another component included in the device or the external device or the like. The proxy unit 15 processes part or all of traffic of the SW 13 or the higher-level device (not illustrated) as in 1-1.

A component included in the device may receive part or all of traffic of another component included in the device or the external device or the like, or copy thereof and transmit part or all of the received traffic, traffic as rewrite of part or all of the received traffic, or a response to the received traffic to another component included in the device or the external device or the like.

In a communication system of a communication system configuration (21-2), the TRxs 11 (λA to λA), the TRxs 11 (λB to λB), . . . , the TRxs 11 (λN to λN) configured to transmit and receive optical signals of the same wavelength in place of different wavelengths are connected with the SW 13 in addition to the configuration of the communication system configuration (21-1). Furthermore, a plurality of at least some of the TRxs 11 of different wavelengths may be connected with the SW 13. The other configuration is the same.

A communication system of a communication system configuration (22-1) includes the optical SW 10, the TRxs 11, the control unit 14, and the proxy unit 15 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the proxy unit 15 directly or through the concentrator SW or the like. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the proxy unit 15 as in 1-1.

The control unit 14 is connected with the optical SW 10, the TRxs 11, the proxy unit 15, the external OpS or the like (not illustrated), the controller (not illustrated), or the external device (not illustrated). The control unit 14 controls a component included in the device or the external device or the like, or forwards an instruction through a component included in the device or the external device or the like.

The proxy unit 15 is connected with a higher-level device (not illustrated) directly or through the concentrator SW or the like. The proxy unit 15 performs autonomous control, is controlled by another component included in the device or by the external device or the like, or is controlled by an instruction forwarded through another component included in the device or the external device or the like. The proxy unit 15 processes part or all of traffic of each TRx 11 or the higher-level device (not illustrated) as in 1-1.

A component included in the device may receive part or all of traffic of another component included in the device or the external device or the like, or copy thereof and transmit part or all of the received traffic, traffic as rewrite of part or all of the received traffic, or a response to the received traffic to another component included in the device or the external device or the like.

In a communication system of a communication system configuration (22-2), the TRxs 11 (λA to λA), the TRxs 11 (λB to λB), . . . , the TRxs 11 (λN to λN) configured to transmit and receive optical signals of the same wavelength in place of different wavelengths are connected with the proxy unit 15 directly or through the concentrator SW or the like in addition to the configuration of the communication system configuration (22-1). Moreover, a plurality of at least some of the TRxs 11 of different wavelengths may be connected with the proxy unit 15 directly or through the concentrator SW or the like. The other configuration is the same.

A communication system of a communication system configuration (23-1) includes the optical SW 10, the TRxs 11, the SWs 12, and the external server 16 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the corresponding SW 12. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 12 as in 1-1.

Each SW 12 is connected with a higher-level device (not illustrated) directly or through the concentrator SW or the like. The SW 12 performs autonomous control, is controlled by another component included in the device or by the external device or the like, or is controlled by an instruction forwarded through another component included in the device or the external device or the like. The SW 12 processes part or all of traffic of the TRx 11 or the higher-level device (not illustrated) as in 1-1.

The external server 16 is connected with the optical SW 10, the TRxs 11, the SWs 12, the external OpS or the like (not illustrated), the controller (not illustrated), or the external device (not illustrated). The external server 16 controls another component included in the device or the external device or the like or forwards an instruction through another component included in the device or the external device or the like.

A component included in the device may receive part or all of traffic of another component included in the device or the external device or the like, or copy thereof and transmit part or all of the received traffic, traffic as rewrite of part or all of the received traffic, or a response to the received traffic to another component included in the device or the external device or the like.

In a communication system of a communication system configuration (23-2), the TRxs 11 ($\lambda$A to $\lambda$A), the TRxs 11 ($\lambda$B to $\lambda$B), . . . , the TRxs 11 ($\lambda$N to $\lambda$N) configured to transmit and receive optical signals of the same wavelength in place of different wavelengths are connected with the respective SWs 12 in addition to the configuration of the communication system configuration (23-1). Furthermore, a plurality of at least some of the TRxs 11 of different wavelengths may be connected with the SWs 12. The other configuration is the same.

A communication system of a communication system configuration (24-1) includes the optical SW 10, the TRxs 11, the SW 13, and the external server 16 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths ($\lambda$A to $\lambda$N) are connected with the SW 13. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 13 as in 1-1.

The SW 13 is connected with a higher-level device (not illustrated) directly or through the concentrator SW or the like. The SW 13 performs autonomous control, is controlled by another component included in the device or by the external device or the like, or is controlled by an instruction forwarded through another component included in the device or the external device or the like. The SW 13 processes part or all of traffic of each TRx 11 or the higher-level device (not illustrated) as in 1-1.

The external server 16 is connected with the optical SW 10, the TRxs 11, the SW 13, the external OpS or the like (not illustrated), the controller (not illustrated), or the external device (not illustrated). The external server 16 controls another component included in the device or the external device or the like or forwards an instruction through another component included in the device or the external device or the like.

A component included in the device may receive part or all of traffic of another component included in the device or the external device or the like, or copy thereof and transmit part or all of the received traffic, traffic as rewrite of part or all of the received traffic, or a response to the received traffic to another component included in the device or the external device or the like.

In a communication system of a communication system configuration (24-2), the TRxs 11 ($\lambda$A to $\lambda$A), the TRxs 11 ($\lambda$B to $\lambda$B), . . . , the TRxs 11 ($\lambda$N to $\lambda$N) configured to transmit and receive optical signals of the same wavelength in place of different wavelengths are connected with the SW 13 in addition to the configuration of the communication system configuration (24-1). Furthermore, a plurality of at least some of the TRxs 11 of different wavelengths may be connected with the SW 13. The other configuration is the same.

A communication system of a communication system configuration (25-1) includes the optical SW 10, the TRxs 11, the control unit 14, and the external server 16 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths ($\lambda$A to $\lambda$N) are connected with a higher-level device (not illustrated) directly or through the concentrator SW or the like. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the higher-level device (not illustrated) as in 1-1.

The control unit 14 is connected with the optical SW 10, the TRxs 11, the external server 16, the external OpS or the like (not illustrated), the controller (not illustrated), or the external device (not illustrated). The control unit 14 controls a component included in the device or the external device or the like, or forwards an instruction through a component included in the device or the external device or the like.

The external server 16 is connected with the optical SW 10, the TRxs 11, the control unit 14, the external OpS or the like (not illustrated), the controller (not illustrated), or the external device (not illustrated). The external server 16 controls a component included in the device or the external device or the like, or forwards an instruction through a component included in the device or the external device or the like.

A component included in the device may receive part or all of traffic of another component included in the device or the external device or the like, or copy thereof and transmit part or all of the received traffic, traffic as rewrite of part or all of the received traffic, or a response to the received traffic to another component included in the device or the external device or the like.

In a communication system of a communication system configuration (25-2), the TRxs 11 ($\lambda$A to $\lambda$A), the TRxs 11 ($\lambda$B to $\lambda$B), . . . , the TRxs 11 ($\lambda$N to $\lambda$N) configured to transmit and receive optical signals of the same wavelength in place of different wavelengths are each connected with a higher-level device (not illustrated) directly or through the concentrator SW or the like in addition to the configuration of the communication system configuration (25-1). Moreover, a plurality of at least some of the TRxs 11 of different wavelengths may be connected with the higher-level device (not illustrated) directly or through the concentrator SW or the like. The other configuration is the same.

A communication system of a communication system configuration (26-1) includes the optical SW 10, the TRxs 11, the proxy unit 15, and the external server 16 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the proxy unit 15 directly or through the concentrator SW or the like. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the proxy unit 15 as in 1-1.

The proxy unit 15 performs autonomous control, is controlled by another component included in the device or by the external device or the like, or is controlled by an instruction forwarded through another component included in the device or the external device or the like. The proxy unit 15 processes part or all of traffic of each TRx 11 or a higher-level device (not illustrated) as in 1-1.

The external server 16 is connected with the optical SW 10, the TRxs 11, the proxy unit 15, the external OpS or the like (not illustrated), the controller (not illustrated), or the other external device (not illustrated). The external server 16 controls another component included in the device or the external device or the like or forwards an instruction through another component included in the device or the external device or the like.

A component included in the device may receive part or all of traffic of another component included in the device or the external device or the like, or copy thereof and transmit part or all of the received traffic, traffic as rewrite of part or all of the received traffic, or a response to the received traffic to another component included in the device or the external device or the like.

In a communication system of a communication system configuration (26-2), the TRxs 11 (λA to λA), the TRxs 11 (λB to λB), . . . , the TRxs 11 (λN to λN) configured to transmit and receive optical signals of the same wavelength in place of different wavelengths are connected with the proxy unit 15 directly or through the concentrator SW or the like in addition to the configuration of the communication system configuration (26-1). Moreover, a plurality of at least some of the TRxs 11 of different wavelengths may be connected with the proxy unit 15 directly or through the concentrator SW or the like. The other configuration is the same.

A communication system of a communication system configuration (27-1) includes the optical SW 10, the TRxs 11, and the SWs 12 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the corresponding SW 12. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 12 as in 1-1.

Each SW 12 is connected with a higher-level device (not illustrated) directly or through the concentrator SW or the like. The SW 12 performs autonomous control, is controlled by another component included in the device or by the external device or the like, or is controlled by an instruction forwarded through another component included in the device or the external device or the like. The SW 12 processes part or all of traffic of the TRx 11 or the higher-level device (not illustrated) as in 1-1.

A component included in the device may receive part or all of traffic of another component included in the device or the external device or the like, or copy thereof and transmit part or all of the received traffic, traffic as rewrite of part or all of the received traffic, or a response to the received traffic to another component included in the device or the external device or the like.

In a communication system of a communication system configuration (27-2), the TRxs 11 (λA to λA), the TRxs 11 (λB to λB), . . . , the TRxs 11 (λN to λN) configured to transmit and receive optical signals of the same wavelength in place of different wavelengths are connected with the respective SWs 12 in addition to the configuration of the communication system configuration (27-1). Furthermore, a plurality of at least some of the TRxs 11 of different wavelengths may be connected with the SWs 12. The other configuration is the same.

A communication system of a communication system configuration (28-1) includes the optical SW 10, the TRxs 11, and the SW 13 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the SW 13. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the SW 13 as in 1-1.

The SW 13 is connected with a higher-level device (not illustrated) directly or through the concentrator SW or the like. The SW 13 performs autonomous control, is controlled by another component included in the device or by the external device or the like, or is controlled by an instruction forwarded through another component included in the device or the external device or the like. The SW 13 processes part or all of traffic of each TRx 11 or the higher-level device (not illustrated) as in 1-1.

A component included in the device may receive part or all of traffic of another component included in the device or the external device or the like, or copy thereof and transmit part or all of the received traffic, traffic as rewrite of part or all of the received traffic, or a response to the received traffic to another component included in the device or the external device or the like.

In a communication system of a communication system configuration (28-2), the TRxs 11 (λA to λA), the TRxs 11

(λB to λB), . . . , the TRxs 11 (λN to λN) configured to transmit and receive optical signals of the same wavelength in place of different wavelengths are connected with the SW 13 in addition to the configuration of the communication system configuration (28-1). Furthermore, a plurality of at least some of the TRxs 11 of different wavelengths may be connected with the SW 13. The other configuration is the same.

A communication system of a communication system configuration (29-1) includes the optical SW 10, the TRxs 11, and the control unit 14 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with a higher-level device (not illustrated) directly or through the concentrator SW or the like. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the higher-level device (not illustrated) as in 1-1.

The control unit 14 is connected with the optical SW 10, the TRxs 11, the external OpS or the like (not illustrated), the controller (not illustrated), or the external device (not illustrated). The control unit 14 controls a component included in the device or the external device or the like, or forwards an instruction through a component included in the device or the external device or the like.

A component included in the device may receive part or all of traffic of another component included in the device or the external device or the like, or copy thereof and transmit part or all of the received traffic, traffic as rewrite of part or all of the received traffic, or a response to the received traffic to another component included in the device or the external device or the like.

In a communication system of a communication system configuration (29-2), the TRxs 11 (λA to λA), the TRxs 11 (λB to λB), . . . , the TRxs 11 (λN to λN) configured to transmit and receive optical signals of the same wavelength in place of different wavelengths are each connected with a higher-level device (not illustrated) directly or through the concentrator SW or the like in addition to the configuration of the communication system configuration (29-1). Moreover, a plurality of at least some of the TRxs 11 of different wavelengths may be connected with the higher-level device (not illustrated) directly or through the concentrator SW or the like. The other configuration is the same.

A communication system of a communication system configuration (30-1) includes the optical SW 10, the TRxs 11, and the proxy unit 15 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with the proxy unit 15 directly or through the concentrator SW or the like. Each TRx 11 performs autonomous control, is controlled by a component included in the device or the external device or the like, or is controlled by an instruction forwarded through another component included in the device or the external device or the like. The TRx 11 processes part or all of traffic of the optical SW 10 or the proxy unit 15 as in 1-1.

The proxy unit 15 performs autonomous control, is controlled by another component included in the device or by the external device or the like, or is controlled by an instruction forwarded through another component included in the device or the external device or the like. The proxy unit 15 processes part or all of traffic of each TRx 11 or a higher-level device (not illustrated) as in 1-1.

A component included in the device may receive part or all of traffic of another component included in the device or the external device or the like, or copy thereof and transmit part or all of the received traffic, traffic as rewrite of part or all of the received traffic, or a response to the received traffic to another component included in the device or the external device or the like.

In a communication system of a communication system configuration (30-2), the TRxs 11 (λA to λA), the TRxs 11 (λB to λB), . . . , the TRxs 11 (λN to λN) configured to transmit and receive optical signals of the same wavelength in place of different wavelengths are connected with the proxy unit 15 directly or through the concentrator SW or the like in addition to the configuration of the communication system configuration (30-1). Moreover, a plurality of at least some of the TRxs 11 of different wavelengths may be connected with the proxy unit 15 directly or through the concentrator SW or the like. The other configuration is the same.

A communication system of a communication system configuration (31-1) includes the optical SW 10, the TRxs 11, and the external server 16 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with a higher-level device (not illustrated) directly or through the concentrator SW or the like. Each TRx 11 performs autonomous control, is controlled by another component included in the device or by the external device or the like, or is controlled by an instruction forwarded through another component included in the device or the external device or the like. The TRx 11 processes part or all of traffic of the optical SW 10 or the higher-level device (not illustrated) as in 1-1.

The external server 16 is connected with the optical SW 10, the TRxs 11, the external OpS or the like (not illustrated), the controller (not illustrated), or the external device (not illustrated). The external server 16 controls another component included in the device or the external device or the like or forwards an instruction through another component of any TRx 11 or the external device or the like.

A component included in the device may receive part or all of traffic of another component included in the device or the external device or the like, or copy thereof and transmit part or all of the received traffic, traffic as rewrite of part or all of the received traffic, or a response to the received traffic to another component included in the device or the external device or the like.

In a communication system of a communication system configuration (31-2), the TRxs 11 (λA to λA), the TRxs 11 (λB to λB), . . . , the TRxs 11 (λN to λN) configured to transmit and receive optical signals of the same wavelength in place of different wavelengths are each connected with a higher-level device (not illustrated) directly or through the concentrator SW or the like in addition to the configuration of the communication system configuration (31-1). Moreover, a plurality of at least some of the TRxs 11 of different wavelengths may be connected with the higher-level device (not illustrated) directly or through the concentrator SW or the like. The other configuration is the same.

A communication system of a communication system configuration (32-1) includes the optical SW 10 and the TRxs 11 (FIGS. 1 and 17).

The optical SW 10 is connected with an ODN and the TRxs 11. The optical SW 10 performs autonomous control, is controlled by another component included in the device or by the external device or the like, or is controlled by an instruction forwarded through another component included in the device or the external device or the like.

The TRxs 11 configured to transmit and receive optical signals of different wavelengths (λA to λN) are connected with a higher-level device (not illustrated) directly or through the concentrator SW or the like. Each TRx 11 performs autonomous control, is controlled by a component included in the device or the external device or the like, or is controlled by an instruction forwarded through another component included in the device or the external device or the like. The TRx 11 processes part or all of traffic of the optical SW 10 or the higher-level device (not illustrated) as in 1-1.

A component included in the device may receive part or all of traffic of another component included in the device or the external device or the like, or copy thereof and transmit part or all of the received traffic, traffic as rewrite of part or all of the received traffic, or a response to the received traffic to another component included in the device or the external device or the like.

In a communication system of a communication system configuration (32-2), the TRxs 11 (λA to λA), the TRxs 11 (λB to λB), . . . , the TRxs 11 (λN to λN) configured to transmit and receive optical signals of the same wavelength in place of different wavelengths are each connected with a higher-level device (not illustrated) directly or through the concentrator SW or the like in addition to the configuration of the communication system configuration (32-1). Moreover, a plurality of at least some of the TRxs 11 of different wavelengths may be connected with the higher-level device (not illustrated) directly or through the concentrator SW or the like. The other configuration is the same.

The communication system described as any of the above-described communication system configurations (1-1) to (32-2) includes the optical SW 10, but the communication system described as any of the communication system configurations (1-1) to (32-2) may include no optical SW 10. In the communication system illustrated in FIGS. 1 and 17, configurations including no optical SW 10 and corresponding to the respective communication system configurations (1-1) to (32-2) are referred to as communication system configurations (33-1) to (64-2), respectively. Specifically, the communication device includes at least some of the TRxs 11, the SWs 12, the SW 13, the control unit 14, and the proxy unit 15. Note that the communication device may include the external server 16. In the communication system configurations (33-1) to (64-2), the ODN and each TRx 11 are connected with each other without through the optical SW 10. Inputs and outputs of the TRxs 11 of the same wavelengths, including inputs and outputs of the TRxs 11 of variable wavelengths may be connected with different core wires of the ODN, or optical multiplexers/demultiplexers or the like connected therewith, inputs and outputs of the TRxs 11 of a plurality of wavelengths including variable wavelengths or a bundle thereof produced by optical multiplexers/demultiplexers or the like may be connected with different core wires of the ODN, or bundles of inputs and outputs of the TRxs 11 of wavelengths including variable wavelengths may be connected with different core wires of the ODN, or optical multiplexers/demultiplexers or the like connected therewith. The other configuration is the same.

First Configuration Example

An example in which an OLT includes a TRx 11 and separately deploys an execution unit and an instruction unit as functions will be described below. In this case, the OLT includes the execution unit at the TRx 11. The OLT includes the instruction unit at an information processing unit of the TRx 11 or at a unit, such as a CPU, capable of performing arithmetic processing. It is preferable from a viewpoint of response speed that the execution unit is disposed on the PON side of the instruction unit, but may be disposed at an opposite position, in a different device at the same position, or in a different VM on the same device. In a first configuration example, the OLT includes the optical SW 10 configured to mainly switch inputs and outputs of the TRxs 11 of the same wavelength (in an example to be described later, may be the same frequency, mode, core, sign, frequency, (sub)carrier, or the like, or a combination thereof including wavelength), including inputs and outputs of the TRxs 11 of variable wavelengths, between different core wires (in an example to be described later, may be different modes, cores, or the like, or a combination thereof including core wires) or optical multiplexers/demultiplexers or the like connected therewith, configured to switch inputs and outputs of the TRxs 11 of a plurality of wavelengths including variable wavelengths (in an example to be described later, may be a plurality of frequencies, modes, cores, signs, frequencies, (sub)carriers, or the like, or a combination thereof including wavelengths) or a bundle thereof produced by optical multiplexers/demultiplexers or the like between different core wires (in an example to be described later, may be different modes, cores, or the like, or a combination thereof including core wires), or configured to switch bundles of inputs and outputs of the TRxs 11 of wavelengths including variable wavelengths (in an example to be described later, may be frequencies, modes, cores, signs, frequencies, (sub)carriers, or the like, or a combination thereof including wavelengths) between different core wires (in an example to be described later, may be different modes, cores, or the like, or a combination thereof including core wires) or optical multiplexers/demultiplexers or the like connected therewith. Note that the OLT includes the optical SW 10 in second to sixty-fourth configuration examples described below as well.

Inputs and outputs of the execution unit and the instruction unit may be a path such as an internal wire, a backboard, the OAM unit 114, a main signal line, a dedicated wire, the OpS and the like, a controller, or the Cont. When directly terminated and input by the instruction unit, communication may be encapsulated in the OAM unit 114 or the main signal. Communication may be terminated at a place and input through the path such as the internal wire, the backboard, the OAM unit 114, the main signal line, the dedicated wire, the OpS and the like, the controller, or the control board. When the OAM unit 114 or the main signal line is used, it is desirable to perform encapsulation in the OAM unit 114 or the main signal. In a case of passing through the main signal line, it is desirable to perform sorting to the instruction unit at an OSU or a SW at another place.

Note that the first configuration example is applicable to an optional configuration including a TRx 11 and a unit of the TRx 11, capable of performing arithmetic processing, in the communication system configurations (1-1) to (64-2).

Second Configuration Example

In a second configuration example, the execution unit is included in a TRx 11, and the instruction unit is included in a unit of a SW 12, capable of performing arithmetic processing, such as an information processing unit or a CPU. The other configuration is the same as that of the first configuration example. Note that the second configuration example is applicable to an optional configuration including the TRx 11 and the unit of the SW 12, capable of performing arithmetic processing, in the communication system configurations (1-1) to (64-2). Note that the execution unit and the instruction unit may be provided at each of the TRx 11 and the unit of the SW 12, capable of performing arithmetic processing.

Third Configuration Example

In a third configuration example, the execution unit is included in a TRx 11, and the instruction unit is included in a unit of an OSU, capable of performing arithmetic processing, such as an information processing unit or a CPU. The other configuration is the same as that of the first configuration example. Note that the third configuration example is applicable to an optional configuration including a TRx 11 and a unit of an OSU, capable of performing arithmetic processing, in the communication system configurations (1-1) to (64-2). Note that the execution unit and the instruction unit may be provided at each of a TRx 11 and a unit of an OSU, capable of performing arithmetic processing.

Fourth Configuration Example

In a fourth configuration example, the execution unit is included in a TRx 11, and the instruction unit is included in a unit of the SW 13, capable of performing arithmetic processing, such as an information processing unit or a CPU. The other configuration is the same as that of the first configuration example. Note that the fourth configuration example is applicable to an optional configuration including the TRx 11 and the unit of the SW 13, capable of performing arithmetic processing, in the communication system configurations (1-1) to (64-2). Note that the execution unit and the instruction unit may be provided at each of the TRx 11 and the unit of the SW 13, capable of performing arithmetic processing.

Fifth Configuration Example

In a fifth configuration example, the execution unit is included in a TRx 11, and the instruction unit is included in a unit of an OLT, capable of performing arithmetic processing, such as the control unit 14, an information processing unit, a control board, or a CPU board. The other configuration is the same as that of the first configuration example. Note that the fifth configuration example is applicable to an optional configuration including the TRx 11 and the unit of the OLT, capable of performing arithmetic processing, in the communication system configurations (1-1) to (64-2). Note that the execution unit and the instruction unit may be provided at each of the TRx 11 and the unit of the OLT, capable of performing arithmetic processing.

Sixth Configuration Example

In a sixth configuration example, the execution unit is included in a TRx 11, and the instruction unit is included in a unit outside an OLT, capable of performing arithmetic processing, such as a center cloud, a local cloud, an edge cloud, the stand-alone external server 16, an information processing unit, or the OpS and the like. The other configuration is the same as that of the first configuration example. Note that the sixth configuration example is applicable to an optional configuration including the TRx 11 and the unit outside the OLT, capable of performing arithmetic processing, in the communication system configurations (1-1) to (64-2). Note that the execution unit and the instruction unit may be provided at each of the TRx 11 and the unit outside the OLT, capable of performing arithmetic processing.

Seventh Configuration Example

In a seventh configuration example, the execution unit is included in a TRx 11, and the instruction unit is included in a unit outside an OLT, capable of performing arithmetic processing, such as the proxy unit 15 in a main signal network. The other configuration is the same as that of the first configuration example. Note that the seventh configuration example is applicable to an optional configuration including the TRx 11 and the unit outside the OLT, capable of performing arithmetic processing in the main signal network, in the communication system configurations (1-1) to (64-2). Note that the execution unit and the instruction unit may be provided at each of the TRx 11 and the unit outside the OLT, capable of performing arithmetic processing in the main signal network.

Eighth Configuration Example

In an eighth configuration example, the execution unit is included in a SW 12, and the instruction unit is included in a unit of a TRx 11, such as an information processing unit or a CPU, capable of performing arithmetic processing. The other configuration is the same as that of the first configuration example. Note that the eighth configuration example is applicable to an optional configuration including the SW 12 and the unit of the TRx 11, capable of performing arithmetic processing, in the communication system configurations (1-1) to (64-2). Note that the execution unit and the instruction unit may be provided at each of the SW 12 and the unit of the TRx 11, capable of performing arithmetic processing.

Ninth Configuration Example

In a ninth configuration example, the execution unit is included in a SW 12, and the instruction unit is included in a unit of a SW 12, capable of performing arithmetic processing, such as an information processing unit or a CPU. It is preferable from a viewpoint of response speed that the execution unit is disposed on the PON side of the instruction unit, but may be disposed at an opposite position, in a different device at the same position, or in a different VM on the same device. The other configuration is the same as that of the first configuration example. Note that the ninth configuration example is applicable to an optional configuration including the SW 12 and the unit of a SW 12, capable of performing arithmetic processing, in the communication system configurations (1-1) to (64-2).

Tenth Configuration Example

In a tenth configuration example, the execution unit is included in a SW 12, and the instruction unit is included in a unit of an OSU, capable of performing arithmetic processing, such as an information processing unit or a CPU. The other configuration is the same as that of the first configuration example. Note that the tenth configuration example is applicable to an optional configuration including the SW 12 and the unit of an OSU, capable of performing arithmetic processing, in the communication system configurations (1-1) to (64-2). Note that the execution unit and the instruction unit may be provided at each of the SW 12 and the unit of the OSU, capable of performing arithmetic processing.

Eleventh Configuration Example

In an eleventh configuration example, the execution unit is included in a SW 12, and the instruction unit is included in an information processing unit, a CPU, or the like of the SW 13. The other configuration is the same as that of the first configuration example. Note that the eleventh configuration example is applicable to an optional configuration including the SW 12 and the unit of the SW 13, capable of performing arithmetic processing, in the communication system configurations (1-1) to (64-2). Note that the execution unit and the instruction unit may be provided at each of the SW 12 and the unit of the SW 13, capable of performing arithmetic processing.

Twelfth Configuration Example

In a twelfth configuration example, the execution unit is included in a SW 12, and the instruction unit is included in a unit of an OLT, capable of performing arithmetic processing, such as the control unit 14, an information processing unit, a control board, or a CPU board. The other configuration is the same as that of the first configuration example. Note that the twelfth configuration example is applicable to an optional configuration including the SW 12 and the unit of the OLT, capable of performing arithmetic processing, in the communication system configurations (1-1) to (64-2). Note that the execution unit and the instruction unit may be provided at each of the SW 12 and the unit of the OLT, capable of performing arithmetic processing.

Thirteenth Configuration Example

In a thirteenth configuration example, the execution unit is included in a SW 12, and the instruction unit is included in a unit outside an OLT, capable of performing arithmetic processing, such as a center cloud, a local cloud, an edge cloud, the stand-alone external server 16, an information processing unit, or the OpS and the like. The other configuration is the same as that of the first configuration example. Note that the thirteenth configuration example is applicable to an optional configuration including the SW 12 and the unit outside the OLT, capable of performing arithmetic processing, in the communication system configurations (1-1) to (64-2). Note that the execution unit and the instruction unit may be provided at each of the SW 12 and the unit outside the OLT, capable of performing arithmetic processing.

Fourteenth Configuration Example

In a fourteenth configuration example, the execution unit is included in a SW 12, and the instruction unit is included in a unit outside an OLT, such as the proxy unit 15, capable of performing arithmetic processing in a main signal network. The other configuration is the same as that of the first configuration example. Note that the fourteenth configuration example is applicable to an optional configuration including the SW 12 and the unit outside the OLT, capable of performing arithmetic processing in the main signal network, in the communication system configurations (1-1) to (64-2). Note that the execution unit and the instruction unit may be provided at each of the SW 12 and the unit outside the OLT, capable of performing arithmetic processing in the main signal network.

Fifteenth Configuration Example

In a fifteenth configuration example, the execution unit is included in an OSU, and the instruction unit is included in a unit of a TRx 11, such as an information processing unit or a CPU, capable of performing arithmetic processing. The other configuration is the same as that of the first configuration example. Note that the fifteenth configuration example is applicable to a configuration including the OSU and the unit of the TRx 11, capable of performing arithmetic processing, in the communication system configurations (1-1) to (64-2). Note that the execution unit and the instruction unit may be provided at each of the OSU and the unit of the TRx 11, capable of performing arithmetic processing.

Sixteenth Configuration Example

In a sixteenth configuration example, the execution unit is included in an OSU, and the instruction unit is included in a unit of a SW 12, capable of performing arithmetic processing, such as an information processing unit or a CPU. The other configuration is the same as that of the first configuration example. Note that the sixteenth configuration example is applicable to an optional configuration including the OSU and the unit of the SW 12, capable of performing arithmetic processing, in the communication system configurations (1-1) to (64-2). Note that the execution unit and the instruction unit may be provided at each of the OSU and the unit of the SW 12, capable of performing arithmetic processing.

Seventeenth Configuration Example

In a seventeenth configuration example, the execution unit is included in an OSU, and the instruction unit is included in a unit of an OSU, capable of performing arithmetic processing, such as an information processing unit or a CPU. It is preferable from a viewpoint of response speed that the execution unit is disposed closer to the PON than the instruction unit, but the units may be disposed at an opposite position, in a different device at the same position, or in a different VM on the same device. The other configuration is the same as that of the first configuration example. Note that the seventeenth configuration example is applicable to an optional configuration including the OSU and the unit of the OSU, capable of performing arithmetic processing, in the communication system configurations (1-1) to (64-2).

Eighteenth Configuration Example

In an eighteenth configuration example, the execution unit is included in an OSU, and the instruction unit is included in a unit of the SW 13, capable of performing arithmetic processing, such as an information processing unit or a CPU. The other configuration is the same as that of the first configuration example. Note that the eighteenth configuration example is applicable to an optional configuration including the OSU and the unit of the SW 13, capable of performing arithmetic processing, in the communication system configurations (1-1) to (64-2). Note that the execution unit and the instruction unit may be provided at each of the OSU and the unit of the SW 13, capable of performing arithmetic processing.

Nineteenth Configuration Example

In a nineteenth configuration example, the execution unit is included in an OSU, and the instruction unit is included in a unit of an OLT, capable of performing arithmetic processing, such as the control unit 14, an information processing unit, a control board, or a CPU board. The other configuration is the same as that of the first configuration example. Note that the nineteenth configuration example is applicable to an optional configuration including the OSU and the unit of the OLT, capable of performing arithmetic processing, in the communication system configurations (1-1) to (64-2). Note that the execution unit and the instruction unit may be provided at each of the OSU and the unit of the OLT, capable of performing arithmetic processing.

Twentieth Configuration Example

In a twentieth configuration example, the execution unit is included in an OSU, and the instruction unit is included in a unit outside an OLT, capable of performing arithmetic processing, such as a center cloud, a local cloud, an edge cloud, the stand-alone external server 16, an information processing unit, or the OpS and the like. The other configuration is the same as that of the first configuration example. Note that the twentieth configuration example is applicable to an optional configuration including the OSU and the unit outside the OLT, capable of performing arithmetic processing, in the communication system configurations (1-1) to (64-2). Note that the execution unit and the instruction unit may be provided at each of the OSU and the unit outside the OLT, capable of performing arithmetic processing.

Twenty-First Configuration Example

In a twenty-first configuration example, the execution unit is included in an OSU, and the instruction unit is included in a unit outside an OLT, capable of performing arithmetic processing, such as the proxy unit 15 in a main signal network. The other configuration is the same as that of the first configuration example. Note that the twenty-first configuration example is applicable to an optional configuration including the OSU and the unit outside the OLT, capable of performing arithmetic processing in the main signal network, in the communication system configurations (1-1) to (64-2). Note that the execution unit and the instruction unit may be provided at each of the OSU and the unit outside the OLT, capable of performing arithmetic processing in the main signal network.

Twenty-Second Configuration Example

In a twenty-second configuration example, the execution unit is included in the SW 13, and the instruction unit is included in a unit of a TRx 11, capable of performing arithmetic processing, such as an information processing unit or a CPU. The other configuration is the same as that of the first configuration example. Note that the twenty-second configuration example is applicable to an optional configuration including the SW 13 and the unit of the TRx 11, capable of performing arithmetic processing, in the communication system configurations (1-1) to (64-2). Note that the execution unit and the instruction unit may be provided at each of the SW 13 and the unit of the TRx 11, capable of performing arithmetic processing.

Twenty-Third Configuration Example

In a twenty-third configuration example, the execution unit is included in the SW 13, and the instruction unit is included in a SW 12. The other configuration is the same as that of the first configuration example. Note that the twenty-third configuration example is applicable to an optional configuration including the SW 13 and the SW 12 in the communication system configurations (1-1) to (64-2). Note that the execution unit and the instruction unit may be provided at each of the SW 13 and a unit of the SW 12, capable of performing arithmetic processing.

Twenty-Fourth Configuration Example

In a twenty-fourth configuration example, the execution unit is included in the SW 13, and the instruction unit is included in a unit of an OSU, capable of performing arithmetic processing. The unit of the OSU, capable of performing arithmetic processing is, for example, an information processing unit or a CPU. The other configuration is the same as that of the first configuration example. Note that the twenty-fourth configuration example is applicable to an optional configuration including the SW 13 and the unit of the OSU, capable of performing arithmetic processing, in the communication system configurations (1-1) to (64-2). Note that the execution unit and the instruction unit may be provided at each of the SW 13 and the unit of the OSU, capable of performing arithmetic processing.

Twenty-Fifth Configuration Example

In a twenty-fifth configuration example, the execution unit is included in the SW 13, and the instruction unit is included in a unit of the SW 13, capable of performing arithmetic processing, such as an information processing unit or a CPU. The other configuration is the same as that of the first configuration example. It is preferable from a viewpoint of response speed that the execution unit is disposed on the PON side of the instruction unit, but the unit may be disposed at an opposite position, in a different device at the same position, or in a different virtual machine (VM) on the same device. Note that the twenty-fifth configuration example is applicable to an optional configuration including the unit of the SW 13, capable of performing arithmetic processing, in the communication system configurations (1-1) to (64-2).

Twenty-Sixth Configuration Example

In a twenty-sixth configuration example, the execution unit is included in the SW 13, and the instruction unit is included in a unit of an OLT, capable of performing arithmetic processing, such as the control unit 14, an information processing unit, a control board, or a CPU board. The other configuration is the same as that of the first configuration example. Note that the twenty-sixth configuration example is applicable to an optional configuration including the SW 13 and the unit of the OLT, capable of performing arithmetic processing, in the communication system configurations (1-1) to (64-2). Note that the execution unit and the instruction unit may be provided at each of the SW 13 and the unit of the OLT, capable of performing arithmetic processing.

Twenty-Seventh Configuration Example

In a twenty-seventh configuration example, the execution unit is included in the SW 13, and the instruction unit is included in a unit outside an OLT, capable of performing arithmetic processing, such as a center cloud, a local cloud, an edge cloud, the stand-alone external server 16, an information processing unit, or the OpS and the like. The other configuration is the same as that of the first configuration example. Note that the twenty-seventh configuration example is applicable to an optional configuration including the SW 13 and the unit outside the OLT, capable of performing arithmetic processing, in the communication system configurations (1-1) to (64-2). Note that the execution unit and the instruction unit may be provided at each of the SW 13 and the unit outside the OLT, capable of performing arithmetic processing.

Twenty-Eighth Configuration Example

In a twenty-eighth configuration example, the execution unit is included in the SW 13, and the instruction unit is included in a unit outside an OLT, capable of performing arithmetic processing, such as the proxy unit 15 in a main signal network. The other configuration is the same as that of the first configuration example. Note that the twenty-eighth configuration example is applicable to an optional configuration including the SW 13 and the unit outside the OLT, capable of performing arithmetic processing in the main signal network, in the communication system configurations (1-1) to (64-2). Note that the execution unit and the instruction unit may be provided at each of the SW 13 and the unit outside the OLT, capable of performing arithmetic processing in the main signal network.

Twenty-Nineth Configuration Example

In a twenty-nineth configuration example, the execution unit is included in the control unit 14, an information processing unit, a control board, a CPU board, or the like of an OLT, and the instruction unit is included in a unit of the TRx 11, capable of performing arithmetic processing, such as an information processing unit or a CPU. The other configuration is the same as that of the first configuration example. Note that the twenty-nineth configuration example is applicable to an optional configuration including the control unit 14, the information processing unit, the control board, the CPU board, or the like of the OLT and the unit of the TRx 11, capable of performing arithmetic processing, in the communication system configurations (1-1) to (64-2). Note that the execution unit and the instruction unit may be provided at each of the control unit 14, the information processing unit, the control board, the CPU board, or the like of the OLT and the unit of the TRx 11, capable of performing arithmetic processing.

Thirtieth Configuration Example

In a thirtieth configuration example, the execution unit is included in the control unit 14, an information processing unit, a control board, a CPU board, or the like of an OLT, and the instruction unit is included in a unit of a SW 12, capable of performing arithmetic processing, such as an information processing unit or a CPU. The other configuration is the same as that of the first configuration example. Note that the thirtieth configuration example is applicable to an optional configuration including the control unit 14, the information processing unit, the control board, the CPU board, or the like of the OLT and the unit of the SW 12, capable of performing arithmetic processing, in the communication system configurations (1-1) to (64-2). Note that the execution unit and the instruction unit may be provided at each of the control unit 14, the information processing unit, the control board, the CPU board, or the like of the OLT and the unit of the SW 12, capable of performing arithmetic processing.

Thirty-First Configuration Example

In a thirty-first configuration example, the execution unit is included in the control unit 14, an information processing unit, a control board, a CPU board, or the like of an OLT, and the instruction unit is included in a unit of an OSU, capable of performing arithmetic processing, such as an information processing unit or a CPU. The other configuration is the same as that of the first configuration example. Note that the thirty-first configuration example is applicable to an optional configuration including the control unit 14, the information processing unit, the control board, the CPU board, or the like of the OLT and the unit of the OSU, capable of performing arithmetic processing, in the communication system configurations (1-1) to (64-2). Note that the execution unit and the instruction unit may be provided at each of the control unit 14, the information processing unit, the control board, the CPU board, or the like of the OLT and the unit of the OSU, capable of performing arithmetic processing.

Thirty-Second Configuration Example

In a thirty-second configuration example, the execution unit is included in the control unit 14, an information processing unit, a control board, a CPU board, or the like of an OLT, and the instruction unit is included in a unit of the SW 13, capable of performing arithmetic processing, such as an information processing unit or a CPU. The other configuration is the same as that of the first configuration example. Note that the thirty-second configuration example is applicable to an optional configuration including the control unit 14, the information processing unit, the control board, the CPU board, or the like of the OLT and the unit of the SW 13, capable of performing arithmetic processing, in the communication system configurations (1-1) to (64-2). Note that the execution unit and the instruction unit may be provided at each of the control unit 14, the information processing unit, the control board, the CPU board, or the like of the OLT and the unit of the SW 13, capable of performing arithmetic processing.

Thirty-Third Configuration Example

In a thirty-third configuration example, the execution unit is included in the control unit 14, an information processing unit, a control board, a CPU board, or the like of an OLT, and the instruction unit is included in a unit of an OLT, capable of performing arithmetic processing, such as the control unit 14, an information processing unit, a control board, or a CPU board. It is preferable from a viewpoint of response speed that the execution unit is disposed on the PON side of the instruction unit, but may be disposed at an opposite position, in a different device at the same position, or in a different VM on the same device. The other configuration is the same as that of the first configuration example. Note that the thirty-third configuration example is applicable to a configuration including the control unit 14, the information processing unit, the control board, the CPU board, or the like of the OLT and the unit of the OLT, capable of performing arithmetic processing, in the communication system configurations (1-1) to (64-2).

Thirty-Fourth Configuration Example

In a thirty-fourth configuration example, the execution unit is included in the control unit 14, an information processing unit, a control board, a CPU board, or the like of an OLT, and the instruction unit is included in a unit outside an OLT, capable of performing arithmetic processing, such as a center cloud, a local cloud, an edge cloud, the stand-alone external server 16, an information processing unit, or the OpS and the like. The other configuration is the same as that of the first configuration example. Note that the thirty-fourth configuration example is applicable to an optional configuration including the control unit 14, the information processing unit, the control board, the CPU board, or the like of the OLT and the unit outside the OLT, capable of performing arithmetic processing, in the communication system configurations (1-1) to (64-2). Note that the execution unit and the instruction unit may be provided at each of the control unit 14, the information processing unit, the control board, the CPU board, or the like of the OLT and the unit outside the OLT, capable of performing arithmetic processing.

Thirty-Fifth Configuration Example

In a thirty-fifth configuration example, the execution unit is included in the control unit 14, an information processing unit, a control board, a CPU board, or the like of an OLT, and the instruction unit is included in a unit outside an OLT, capable of performing arithmetic processing, such as the proxy unit 15 in a main signal network. The other configuration is the same as that of the first configuration example. Note that the thirty-fifth configuration example is applicable to an optional configuration including the control unit 14, the information processing unit, the control board, the CPU board, or the like of the OLT and the unit outside the OLT, capable of performing arithmetic processing in the main signal network, in the communication system configurations (1-1) to (64-2). Note that the execution unit and the instruction unit may be provided at each of the control unit 14, the information processing unit, the control board, the CPU board, or the like of the OLT and the unit outside the OLT, capable of performing arithmetic processing in the main signal network.

Thirty-Sixth Configuration Example

In a thirty-sixth configuration example, the execution unit is included in, for example, a center cloud, a local cloud, an edge cloud, the stand-alone external server 16, an information processing unit, or the OpS and the like outside an OLT, and the instruction unit is included in a unit of a TRx 11, capable of performing arithmetic processing, such as an information processing unit or a CPU. The other configuration is the same as that of the first configuration example. Note that the thirty-sixth configuration example is applicable to an optional configuration including, for example, the center cloud, the local cloud, the edge cloud, the stand-alone external server 16, the information processing unit, or the OpS and the like outside the OLT and the unit of the TRx 11, capable of performing arithmetic processing, in the communication system configurations (1-1) to (64-2). Note that the execution unit and the instruction unit may be provided at each of, for example, the center cloud, the local cloud, the edge cloud, the stand-alone external server 16, the information processing unit, or the OpS and the like outside the OLT and the unit of the TRx 11, capable of performing arithmetic processing.

Thirty-Seventh Configuration Example

In a thirty-seventh configuration example, the execution unit is included in, for example, a center cloud, a local cloud, an edge cloud, the stand-alone external server 16, an information processing unit, or the OpS and the like outside an OLT, and the instruction unit is included in a unit of a SW 12, capable of performing arithmetic processing, such as an information processing unit or a CPU. The other configuration is the same as that of the first configuration example. Note that the thirty-seventh configuration example is applicable to an optional configuration including, for example, the center cloud, the local cloud, the edge cloud, the stand-alone external server 16, the information processing unit, or the OpS and the like outside the OLT and the unit of the SW 12, capable of performing arithmetic processing, in the communication system configurations (1-1) to (64-2). Note that the execution unit and the instruction unit may be provided at each of, for example, the center cloud, the local cloud, the edge cloud, the stand-alone external server 16, the information processing unit, or the OpS and the like outside the OLT and the unit of the SW 12, capable of performing arithmetic processing.

Thirty-Eighth Configuration Example

In a thirty-eighth configuration example, the execution unit is included in, for example, a center cloud, a local cloud, an edge cloud, the stand-alone external server 16, an information processing unit, or the OpS and the like outside an OLT, and the instruction unit is included in a unit of an OSU, capable of performing arithmetic processing, such as an information processing unit or a CPU. The other configuration is the same as that of the first configuration example. Note that the thirty-eighth configuration example is applicable to an optional configuration including, for example, the center cloud, the local cloud, the edge cloud, the stand-alone external server 16, the information processing unit, or the OpS and the like outside the OLT and the unit of the OSU, capable of performing arithmetic processing, in the communication system configurations (1-1) to (64-2). Note that the execution unit and the instruction unit may be provided at each of, for example, the center cloud, the local cloud, the edge cloud, the stand-alone external server 16, the information processing unit, or the OpS and the like outside the OLT and the unit of the OSU, capable of performing arithmetic processing.

Thirty-Nineth Configuration Example

In a thirty-nineth configuration example, the execution unit is included in, for example, a center cloud, a local cloud, an edge cloud, the stand-alone external server 16, an information processing unit, or the OpS and the like outside an OLT, and the instruction unit is included in a unit of the SW 13, capable of performing arithmetic processing, such as an information processing unit or a CPU. The other configuration is the same as that of the first configuration example. Note that the thirty-nineth configuration example is applicable to an optional configuration including, for example, the center cloud, the local cloud, the edge cloud, the stand-alone external server 16, the information processing unit, or the OpS and the like outside the OLT and the unit of the SW 13, capable of performing arithmetic processing, in the communication system configurations (1-1) to (64-2). Note that the execution unit and the instruction unit may be provided at each of, for example, the center cloud, the local cloud, the edge cloud, the stand-alone external server 16, the information processing unit, or the OpS and the like outside the OLT and the unit of the SW 13, capable of performing arithmetic processing.

Fortieth Configuration Example

In a fortieth configuration example, the execution unit is included in, for example, a center cloud, a local cloud, an edge cloud, the stand-alone external server 16, an information processing unit, or the OpS and the like outside an OLT, and the instruction unit is included in a unit of an OLT, capable of performing arithmetic processing, such as the control unit 14, an information processing unit, a control board, or a CPU board. The other configuration is the same as that of the first configuration example. Note that the fortieth configuration example is applicable to an optional configuration including, for example, the center cloud, the local cloud, the edge cloud, the stand-alone external server 16, the information processing unit, or the OpS and the like outside the OLT and the unit of the OLT, capable of performing arithmetic processing, in the communication system configurations (1-1) to (64-2). Note that the execution unit and the instruction unit may be provided at each of, for example, the center cloud, the local cloud, the edge cloud, the stand-alone external server 16, the information processing unit, or the OpS and the like outside the OLT and the unit of the OLT, capable of performing arithmetic processing.

Forty-First Configuration Example

In a forty-first configuration example, the execution unit is included in, for example, a center cloud, a local cloud, an edge cloud, the stand-alone external server 16, an information processing unit, or the OpS and the like outside an OLT, and the instruction unit is included in a unit outside an OLT, capable of performing arithmetic processing, such as a center cloud, a local cloud, an edge cloud, the stand-alone external server 16, an information processing unit, or the OpS and the like. It is preferable from a viewpoint of response speed that the execution unit is disposed on the PON side of the instruction unit, but may be disposed at an opposite position, in a different server at the same position, or in a different VM on the same server. The other configuration is the same as that of the first configuration example. Note that the forty-first configuration example is applicable to an optional configuration including, for example, the center cloud, the local cloud, the edge cloud, the stand-alone external server 16, the information processing unit, or the OpS and the like outside the OLT and the unit outside the OLT, capable of performing arithmetic processing, in the communication system configurations (1-1) to (64-2). Note that the execution unit and the instruction unit may be provided at each of, for example, the center cloud, the local cloud, the edge cloud, the stand-alone external server 16, the information processing unit, or the OpS and the like outside the OLT and the unit outside the OLT, capable of performing arithmetic processing.

Forty-Second Configuration Example

In a forty-second configuration example, the execution unit is included in, for example, a center cloud, a local cloud, an edge cloud, the stand-alone external server 16, an information processing unit, or the OpS and the like outside an OLT, and the instruction unit is included in a unit outside an OLT, capable of performing arithmetic processing, such as the proxy unit 15 in a main signal network. The other configuration is the same as that of the first configuration example. Note that the forty-second configuration example is applicable to an optional configuration including, for example, the center cloud, the local cloud, the edge cloud, the stand-alone external server 16, the information processing unit, or the OpS and the like outside the OLT and the unit outside the OLT, capable of performing arithmetic processing in a main signal network, in the communication system configurations (1-1) to (64-2). Note that the execution unit and the instruction unit may be provided at each of, for example, the center cloud, the local cloud, the edge cloud, the stand-alone external server 16, the information processing unit, or the OpS and the like outside the OLT and the unit outside the OLT, capable of performing arithmetic processing in a main signal network.

Forty-Third Configuration Example

In a forty-third configuration example, the execution unit is included in the proxy unit 15 or the like outside an OLT in a main signal network, and the instruction unit is included in a unit of a TRx 11, capable of performing arithmetic processing, such as an information processing unit or a CPU. The other configuration is the same as that of the first configuration example. Note that the forty-third configuration example is applicable to an optional configuration including the proxy unit 15 or the like outside the OLT in the main signal network and the unit of the TRx 11, capable of performing arithmetic processing, in the communication system configurations (1-1) to (64-2). Note that the execution unit and the instruction unit may be provided at each of the proxy unit 15 or the like outside the OLT in the main signal network and the unit of the TRx 11, capable of performing arithmetic processing.

Forty-Fourth Configuration Example

In a forty-fourth configuration example, the execution unit is included in the proxy unit 15 or the like outside an OLT in a main signal network, and the instruction unit is included in a unit of a SW 12, capable of performing arithmetic processing, such as an information processing unit or a CPU. The other configuration is the same as that of the first configuration example. Note that the forty-fourth configuration example is applicable to an optional configuration including the proxy unit 15 or the like outside the OLT in the main signal network and the unit of the SW 12, capable of performing arithmetic processing, in the communication system configurations (1-1) to (64-2). Note that the execution unit and the instruction unit may be provided at each of the proxy unit 15 or the like outside the OLT in the main signal network and the unit of the SW 12, capable of performing arithmetic processing.

Forty-Fifth Configuration Example

In a forty-fifth configuration example, the execution unit is included in the proxy unit 15 or the like outside an OLT in a main signal network, and the instruction unit is included in a unit of an OSU, capable of performing arithmetic processing, such as an information processing unit or a CPU. The other configuration is the same as that of the first configuration example. Note that the forty-fifth configuration example is applicable to an optional configuration including the proxy unit 15 or the like outside the OLT in the main signal network and the unit of the OSU, capable of performing arithmetic processing, in the communication system configurations (1-1) to (64-2). Note that the execution unit and the instruction unit may be provided at each of the proxy unit 15 or the like outside the OLT in the main signal network and the unit of the OSU, capable of performing arithmetic processing.

Forty-Sixth Configuration Example

In a forty-sixth configuration example, the execution unit is included in the proxy unit 15 or the like outside an OLT in a main signal network, and the instruction unit is included in a unit of the SW 13, capable of performing arithmetic processing, such as an information processing unit or a CPU. The other configuration is the same as that of the first configuration example. Note that the forty-sixth configuration example is applicable to an optional configuration including the proxy unit 15 or the like outside the OLT in the main signal network and the unit of the SW 13, capable of performing arithmetic processing, in the communication system configurations (1-1) to (64-2). Note that the execution unit and the instruction unit may be provided at each of the proxy unit 15 or the like outside the OLT in the main signal network and the unit of the SW 13, capable of performing arithmetic processing.

Forty-Seventh Configuration Example

In a forty-seventh configuration example, the execution unit is included in the proxy unit 15 or the like outside an OLT in a main signal network, and the instruction unit is included in a unit of an OLT, capable of performing arithmetic processing, such as the control unit 14, an information processing unit, a control board, or a CPU board. The other configuration is the same as that of the first configuration example. Note that the forty-seventh configuration example is applicable to a configuration including the proxy unit 15 or the like outside the OLT in the main signal network and the unit of the OLT, capable of performing arithmetic processing, in the communication system configurations (1-1) to (64-2). Note that the execution unit and the instruction unit may be provided at each of the proxy unit 15 or the like outside the OLT in the main signal network and the unit of the OLT, capable of performing arithmetic processing.

Forty-Eighth Configuration Example

In a forty-eighth configuration example, the execution unit is included in the proxy unit 15 or the like outside an OLT in a main signal network, and the instruction unit is included in a unit outside an OLT, capable of performing arithmetic processing, such as a center cloud, a local cloud, an edge cloud, the stand-alone external server 16, an information processing unit, or the OpS and the like. The other configuration is the same as that of the first configuration example. Note that the forty-eighth configuration example is applicable to an optional configuration including the proxy unit 15 or the like outside the OLT in the main signal network and the unit outside the OLT, capable of performing arithmetic processing, in the communication system configurations (1-1) to (64-2). Note that the execution unit and the instruction unit may be provided at each of the proxy unit 15 or the like outside the OLT in the main signal network and the unit outside the OLT, capable of performing arithmetic processing.

Forty-Nineth Configuration Example

In a forty-nineth configuration example, the execution unit is included in the proxy unit 15 or the like outside an OLT in a main signal network, and the instruction unit is included in a unit outside an OLT, capable of performing arithmetic processing, such as the proxy unit 15 in a main signal network. It is preferable from a viewpoint of response speed that the execution unit is disposed on the PON side of the instruction unit, but may be disposed at an opposite position, in a different device at the same position, or in a different VM on the same device. The other configuration is the same as that of the first configuration example. Note that the forty-nineth configuration example is applicable to an optional configuration including the unit outside the OLT, capable of performing arithmetic processing, such as the proxy unit 15 in the main signal network in the communication system configurations (1-1) to (64-2).

Fiftieth Configuration Example

In a fiftieth configuration example, the execution unit is included in the optical SW 10, and the instruction unit is included in a unit of the optical SW 10, capable of performing arithmetic processing, such as an information processing unit or a CPU. It is preferable from a viewpoint of response speed that the execution unit is disposed on the PON side of the instruction unit, but the units may be disposed at an opposite position, in a different device at the same position, or in a different VM on the same device. The other configuration is the same as that of the first configuration example. Note that the fiftieth configuration example is applicable to an optional configuration including the unit of the optical SW 10, capable of performing arithmetic processing, in the communication system configurations (1-1) to (64-2). Note that the execution unit and the instruction unit may be provided at the unit of the optical SW 10, capable of performing arithmetic processing.

Fifty-First Configuration Example

In a fifty-first configuration example, the execution unit is included in the optical SW 10, and the instruction unit is included in a unit of a TRx 11, capable of performing arithmetic processing, such as an information processing unit or a CPU. The other configuration is the same as that of the first configuration example. Note that the fifty-first configuration example is applicable to an optional configuration including the optical SW 10 and the unit of the TRx 11, capable of performing arithmetic processing, in the communication system configurations (1-1) to (64-2). Note that the execution unit and the instruction unit may be provided at each of the optical SW 10 and the unit of the TRx 11, capable of performing arithmetic processing.

Fifty-Second Configuration Example

In a fifty-second configuration example, the execution unit is included in the optical SW 10, and the instruction unit is included in a unit of a SW 12, capable of performing arithmetic processing, such as an information processing unit or a CPU. The other configuration is the same as that of the first configuration example. Note that the fifty-second configuration example is applicable to an optional configuration including the optical SW 10 and the unit of the SW 12, capable of performing arithmetic processing, in the communication system configurations (1-1) to (64-2). Note that the execution unit and the instruction unit may be provided at each of the optical SW 10 and the unit of the SW 12, capable of performing arithmetic processing.

Fifty-Third Configuration Example

In a fifty-third configuration example, the execution unit is included in the optical SW 10, and the instruction unit is included in a unit of an OSU, capable of performing arithmetic processing, such as an information processing unit or a CPU. The other configuration is the same as that of the first configuration example. Note that the fifty-third configuration example is applicable to an optional configuration including the optical SW 10 and the unit of the OSU, capable of performing arithmetic processing, in the communication system configurations (1-1) to (64-2). Note that the execution unit and the instruction unit may be provided at each of the optical SW 10 and the unit of the OSU, capable of performing arithmetic processing.

Fifty-Fourth Configuration Example

In a fifty-fourth configuration example, the execution unit is included in the optical SW 10, and the instruction unit is included in an information processing unit, a CPU, or the like of the SW 13. The other configuration is the same as that of the first configuration example. Note that the fifty-fourth configuration example is applicable to an optional configuration including the optical SW 10 and the unit of the SW 13, capable of performing arithmetic processing, in the communication system configurations (1-1) to (64-2). Note that the execution unit and the instruction unit may be provided at each of the optical SW 10 and the unit of the SW 13, capable of performing arithmetic processing.

Fifty-Fifth Configuration Example

In a fifty-fifth configuration example, the execution unit is included in the optical SW 10, and the instruction unit is included in a unit of an OLT, capable of performing arithmetic processing, such as the control unit 14, an information processing unit, a control board, or a CPU board. The other configuration is the same as that of the first configuration example. Note that the fifty-fifth configuration example is applicable to an optional configuration including the optical SW 10 and the unit of the OLT, capable of performing arithmetic processing, in the communication system configurations (1-1) to (64-2). Note that the execution unit and the instruction unit may be provided at each of the optical SW 10 and the unit of the OLT, capable of performing arithmetic processing.

Fifty-Sixth Configuration Example

In a fifty-sixth configuration example, the execution unit is included in the optical SW 10, and the instruction unit is included in a unit outside an OLT, capable of performing arithmetic processing, such as a center cloud, a local cloud, an edge cloud, the stand-alone external server 16, an information processing unit, or the OpS and the like. The other configuration is the same as that of the first configuration example. Note that the fifty-sixth configuration example is applicable to an optional configuration including the optical SW 10 and the unit outside the OLT, capable of performing arithmetic processing, in the communication system configurations (1-1) to (64-2). Note that the execution unit and the instruction unit may be provided at each of the optical SW 10 and the unit outside the OLT, capable of performing arithmetic processing.

Fifty-Seventh Configuration Example

In a fifty-seventh configuration example, the execution unit is included in the optical SW 10, and the instruction unit is included in a unit outside an OLT, capable of performing arithmetic processing, such as the proxy unit 15 in a main signal network. The other configuration is the same as that of the first configuration example. Note that the fifty-seventh configuration example is applicable to an optional configuration including the optical SW 10 and the unit outside the OLT, capable of performing arithmetic processing in the main signal network, in the communication system configurations (1-1) to (64-2). Note that the execution unit and the instruction unit may be provided at each of the optical SW 10 and the unit outside the OLT, capable of performing arithmetic processing in the main signal network.

Fifty-Eighth Configuration Example

In a fifty-eighth configuration example, the execution unit is included in a TRx 11, and the instruction unit is included in a unit of the optical SW 10, capable of performing arithmetic processing, such as an information processing unit or a CPU. The other configuration is the same as that of the first configuration example. Note that the fifty-eighth configuration example is applicable to an optional configuration including the TRx 11 and the unit of the optical SW 10, capable of performing arithmetic processing, in the communication system configurations (1-1) to (64-2). Note that the execution unit and the instruction unit may be provided at each of the TRx 11 and the unit of the optical SW 10, capable of performing arithmetic processing.

Fifty-Ninth Configuration Example

In a fifty-ninth configuration example, the execution unit is included in a SW 12, and the instruction unit is included in a unit of the optical SW 10, capable of performing arithmetic processing, such as an information processing unit or a CPU. The other configuration is the same as that of the first configuration example. Note that the fifty-ninth configuration example is applicable to an optional configuration including the SW 12 and the unit of the optical SW 10, capable of performing arithmetic processing, in the communication system configurations (1-1) to (64-2). Note that the execution unit and the instruction unit may be provided at each of the SW 12 and the unit of the optical SW 10, capable of performing arithmetic processing.

Sixtieth Configuration Example

In a sixtieth configuration example, the execution unit is included in an OSU, and the instruction unit is included in a unit of the optical SW 10, capable of performing arithmetic processing, such as an information processing unit or a CPU. The other configuration is the same as that of the first configuration example. Note that the sixtieth configuration example is applicable to a configuration including the OSU and the unit of the optical SW 10, capable of performing arithmetic processing, in the communication system configurations (1-1) to (64-2). Note that the execution unit and the instruction unit may be provided at each of the OSU and the unit of the optical SW 10, capable of performing arithmetic processing.

Sixty-First Configuration Example

In a sixty-first configuration example, the execution unit is included in the SW 13, and the instruction unit is included in a unit of the optical SW 10, capable of performing arithmetic processing, such as an information processing unit or a CPU. The other configuration is the same as that of the first configuration example. Note that the sixty-first configuration example is applicable to an optional configuration including the SW 13 and the unit of the optical SW 10, capable of performing arithmetic processing, in the communication system configurations (1-1) to (64-2). Note that the execution unit and the instruction unit may be provided at each of the SW 13 and the unit of the optical SW 10, capable of performing arithmetic processing.

Sixty-Second Configuration Example

In a sixty-second configuration example, the execution unit is included in the control unit 14, an information processing unit, a control board, a CPU board, or the like of an OLT, and the instruction unit is included in a unit of the optical SW 10, capable of performing arithmetic processing, such as an information processing unit or a CPU. The other configuration is the same as that of the first configuration example. Note that the sixty-second configuration example is applicable to an optional configuration including the control unit 14, the information processing unit, the control board, the CPU board, or the like of the OLT and the unit of the optical SW 10, capable of performing arithmetic processing, in the communication system configurations (1-1) to (64-2). Note that the execution unit and the instruction unit may be provided at each of the control unit 14, the information processing unit, the control board, the CPU board, or the like of the OLT and the unit of the optical SW 10, capable of performing arithmetic processing.

Sixty-Third Configuration Example

In a sixty-third configuration example, the execution unit is included in, for example, a center cloud, a local cloud, an edge cloud, the stand-alone external server 16, an information processing unit, or the OpS and the like outside an OLT, and the instruction unit is included in a unit of the optical SW 10, capable of performing arithmetic processing, such as an information processing unit or a CPU. The other configuration is the same as that of the first configuration example. Note that the sixty-third configuration example is applicable to an optional configuration including, for example, the center cloud, the local cloud, the edge cloud, the stand-alone external server 16, the information processing unit, or the OpS and the like outside the OLT and the unit of the optical SW 10, capable of performing arithmetic processing, in the communication system configurations (1-1) to (64-2). Note that the execution unit and the instruction unit may be provided at each of, for example, the center cloud, the local cloud, the edge cloud, the stand-alone external server 16, the information processing unit, or the OpS and the like outside the OLT and the unit of the optical SW 10, capable of performing arithmetic processing.

Sixty-Fourth Configuration Example

In a sixty-fourth configuration example, the execution unit is included in the proxy unit 15 or the like outside an OLT in a main signal network, and the instruction unit is included in a unit of the optical SW 10, capable of performing arithmetic processing, such as an information processing unit or a CPU. The other configuration is the same as that of the first configuration example. Note that the sixty-fourth configuration example is applicable to an optional configuration including the proxy unit 15 or the like outside the OLT in the main signal network and the unit of the optical SW 10, capable of performing arithmetic processing, in the communication system configurations (1-1) to (64-2). Note that the execution unit and the instruction unit may be provided at each of the proxy unit 15 or the like outside the OLT in the main signal network and the unit of the optical SW 10, capable of performing arithmetic processing.

Note that, in the first to sixty-fourth configuration examples, an IF for changing settings or algorithms of the instruction unit may be provided to change software of the instruction unit. In addition, in the first to sixty-fourth configuration examples, the instruction unit is disposed on a device component, capable of performing arithmetic processing, but may be achieved by processing on a plurality of component devices capable of performing arithmetic processing, for example, a plurality of information processing units.

Figure 18:
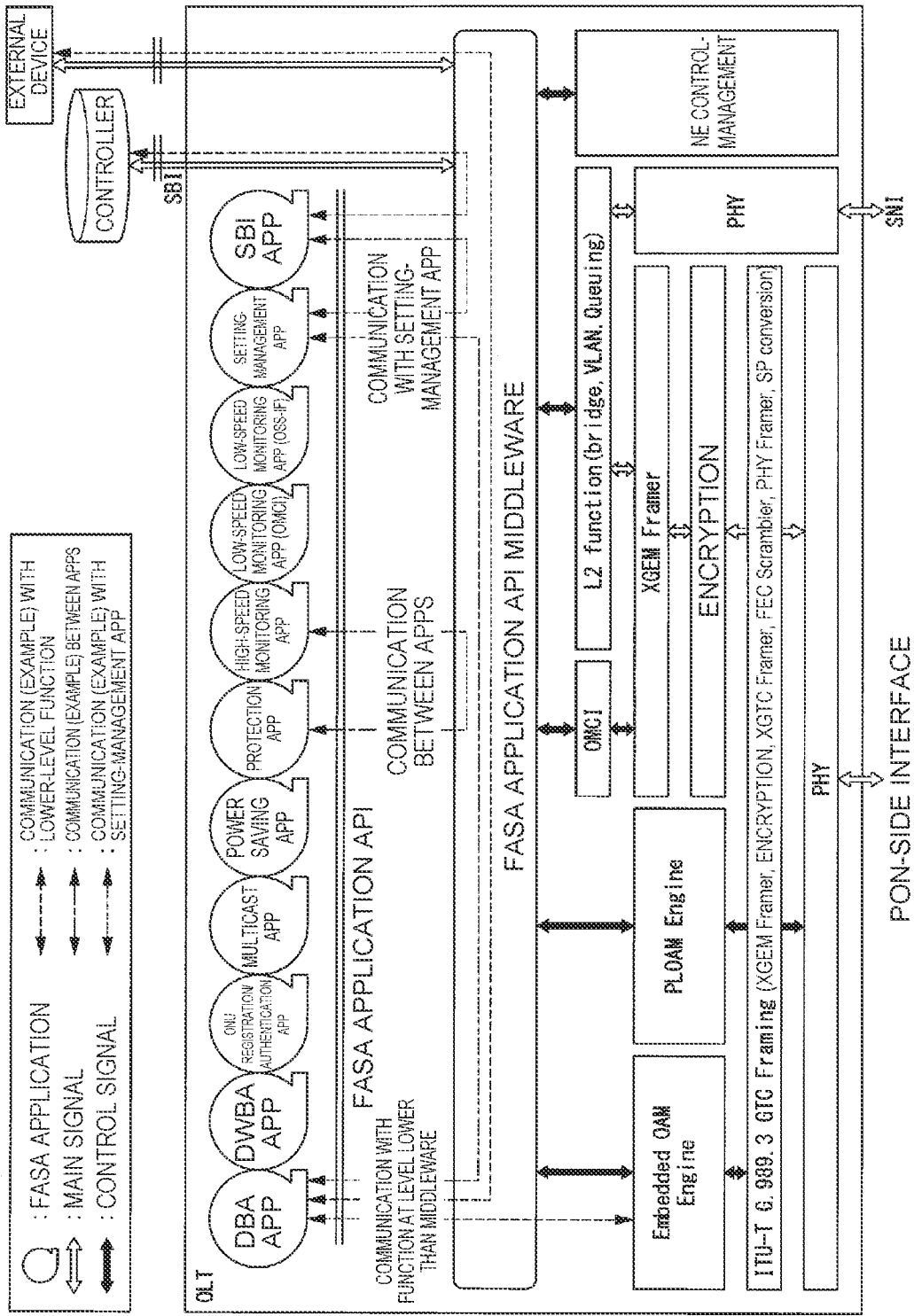
FIG. 18 is a diagram illustrating an example of a configuration of an optical access system in the embodiment.

FIGS. 1 and 18 are diagrams illustrating an configuration example of an optical access system. An OLT illustrated in FIGS. 1 and 18 is an exemplary communication device. The optical access system according to FIGS. 1 and 18 is compliant with ITU-T G.989 series. In FIGS. 1 and 18, a controller and an external device are illustrated for exemplary description of communication with a FASA application API although not included in the OLT.

A logical model is constituted by a FASA application and a FASA board that provides a FASA application API to the FASA application. The FASA board includes FASA application API middleware. The FASA application API middleware absorbs a difference in the vendors and schemes of hardware and software included in the FASA board. A FASA application API set not depending on vendors and schemes is defined on the FASA application API middleware, and functions necessary for each service or each telecommunication carrier are achieved through replacement of the FASA application. Communication between FASA applications and setting management by a controller or the like are performed through the FASA application API middleware. Note that the communication and the setting management may be performed not through the FASA application API middleware. The FASA application API set is common APIs used by FASA applications, and an API necessary for each FASA application is selected from the API set and used.

Connection relations described below are exemplary, and connection with interposition in between may be connection without interposition, only some of a plurality of connection relations may have connections, and there may be any other connections. This applies to other descriptions.

In the OLT, apps are disposed so that an EMS is connected with setting management applications (for example, a low-speed monitoring app (EMS-IF) and a setting-management app) through an IF conversion app connected through the FASA application API middleware. The IF conversion app and the setting management application are also connected with each other through the FASA application API middleware. The IF conversion app corresponds to a south band interface (SBI) app configured to convert a command from an OpS and the like to a SBI that is a control IF for a NE such as the OLT. Although the IF conversion app performs IF conversion in the present description, no IF conversion app may be included when the low-speed monitoring app (EMS-IF) and the setting-management app perform IF conversion or include an API with which IF conversion is unnecessary. The low-speed monitoring app (EMS-IF) and the setting-management app are connected, through the FASA application API middleware, with the EMS and an NE control-management configured to perform NE management or the like. The low-speed monitoring app (OMCI), a MLD proxy app (multicast app), and a power saving app are each connected with an L2 function through the FASA application API middleware.

A protection app is connected with a PLOAM engine and an embedded OAM engine through the FASA application API middleware. The power saving app is connected with the OMCI, the PLOAM engine, and the L2 function through the FASA application API middleware.

An ONU registration authentication app and a DWBA app are connected with the PLOAM engine through the FASA application API middleware, and a DBA app is connected with the embedded OAM engine through the FASA application API middleware. The power saving app may operate among the protection app, the ONU registration authentication app, the DWBA app, and the DBA app through the FASA application API middleware. A high-speed monitoring app is connected with the PLOAM engine through the FASA application API middleware. The low-speed monitoring app is connected with the OMCI through the FASA application API middleware.

Input from an external device is connected with the DBA app through the FASA application API middleware. Note that this connection is exemplary, and input from the external device may be connected with another app other than the DBA app, for example, the protection app or the DWBA app. Input from the external device may be subjected to IF conversion through the IF conversion app via the FASA application API middleware and may be connected with the DBA app or the like through the setting-management app via the FASA application API middleware.

Main functions of the access system and FASA application targets are illustrated in FIGS. 1 and 19 and FIGS. 1 and 20. The following describes an example in which a TWDM-PON mainly has a PON multicast function, a power saving control function, a frequency-time synchronization function, a protection function, a maintenance-operation function, an L2 main signal processing function, a PON access control function, and a PON main signal processing function. Hereinafter, the PON multicast function, the power saving control function, the frequency-time synchronization function, the protection function, the maintenance-operation function, the L2 main signal processing function, the PON access control function, and the PON main signal processing function are referred to as "eight main functions".

The communication device includes a PON main signal processing function unit 300, a PMD unit 310, a PON access control function unit 320, a maintenance-operation function unit 330 (PLOAM processing, OMCI processing), an L2 main signal processing function unit 340, a PON multicast function unit 350, a power saving control function unit 360, a frequency-time synchronization function unit 370, and a protection function unit 380.

The PON main signal processing function unit 300 may be connected with the PMD unit 310, the PON access control function unit 320, the maintenance-operation function unit 330 (PLOAM processing, OMCI processing), and the L2 main signal processing function unit 340.

The PON multicast function unit 350 may be connected with a group consisting of the PON main signal processing function unit 300, the PMD unit 310, the PON access control function unit 320, the maintenance-operation function unit 330, and the L2 main signal processing function unit 340.

The power saving control function unit 360 may be connected with the group consisting of the PON main signal processing function unit 300, the PMD unit 310, the PON access control function unit 320, the maintenance-operation function unit 330, and the L2 main signal processing function unit 340.

The frequency-time synchronization function unit 370 may be connected with the group consisting of the PON main signal processing function unit 300, the PMD unit 310, the PON access control function unit 320, the maintenance-operation function unit 330, and the L2 main signal processing function unit 340.

The protection function unit 380 may be connected with the group consisting of the PON main signal processing function unit 300, the PMD unit 310, the PON access control function unit 320, the maintenance-operation function unit 330, and the L2 main signal processing function unit 340.

The PON main signal processing function unit 300 has the PON main signal processing function. The PON main signal processing function is a function group configured to process a main signal transmitted and received to and from an ONU and may include, in an upstream signal processing order (opposite direction for downstream signal processing), PHY adaptation, framing, and service adaptation as processing included in the PON main signal processing function. These pieces of processing may be configured as pieces of basic processing. The pieces of basic processing includes synchronization block generation/extraction, scramble/descramble, FEC decode/encode, frame generation/separation, G-PON encapsulation method (GEM) encapsulation, fragment processing, and encryption.

The PHY adaptation may include synchronization block extraction, descramble, and FEC decoding in the upstream signal processing order. The PHY adaptation may include FEC encoding, scramble, and synchronization block generation in the downstream signal processing order.

The PON main signal processing function unit 300 may have no PHY adaptation processing, framing processing, nor service adaptation processing but may achieve equivalent processing as a combination of the pieces of basic processing. The orders of the PHY adaptation processing, the framing processing, and the service adaptation processing may be exchanged. The PHY adaptation may have, for example, FEC processing in processing other than the PHY adaptation. Software implementation of the PON main signal processing function is difficult.

The PON access control function that the PON access control function unit 320 has is a control function group for the above-described main signal transmission and reception and has ONU registration or authentication, DBA, and λ setting switching (DWA) as pieces of constituent processing. These pieces of processing may be configured as the pieces of basic processing. For example, the ONU registration or authentication may be configured as ranging, authentication deletion, registration, activation stop, which are included in initial processing, the DBA may be configured as some or all of band request reception, traffic measurement, history holding, allocation calculation, allocation processing, setting switching calculation, setting switching processing, and setting switching situation determination, and the λ setting switching may be configured as some or all of band request reception, traffic measurement, history holding, allocation calculation, allocation processing, setting switching calculation, setting switching processing, and setting switching situation determination. No ONU registration or authentication, DBA, nor λ setting switching (DWA) may be provided, and equivalent processing may be achieved as a combination of the pieces of basic processing. In addition, their orders may be exchanged.

ONU high-speed activation, BWMap in a DBA period, uninterrupted λ setting switching, and the like are required as main functions of the PON access control function unit 320 when needed. In an example of function assignment, as for registration or authentication, time-critical ranging processing may be assigned to the instrument dependent unit 110, and following authentication and key replacement may be assigned to apps. In the DBA and the λ setting switching, simple repetitive processing may be assigned to the instrument dependent unit 110, and reflection on an ideal state may be assigned to an app. It is desirable that the ONU registration authentication app has an authentication scheme hide, the DBA app has a flexible QoS, and a DWA app (including wavelength protection and wavelength sleep) is implemented as software to have a flexible QoS.

The L2 main signal processing function unit 340 is a function group configured to forward and process a main signal between a PON-side port and an SNI-side port and has MAC learning, VLAN control, path control, band control, priority control, and delay control as pieces of constituent processing. These pieces of processing may be configured as address management, a classification unit (classifier), a modification unit (modifier), a policer/shaper, a cross connect (XC), a queue, a scheduler, a copy, and a traffic monitor, which are pieces of basic processing. No MAC learning, VLAN control, path control, band control, priority control, delay control, nor copy may be provided, and equivalent processing may be achieved as a combination of the pieces of basic processing. In addition, their orders may be exchanged. Software implementation of the L2 main signal processing function is difficult.

The maintenance-operation function that the maintenance-operation function unit 330 (PLOAM processing, OMCI processing) has is a function group for smooth service maintenance and operation by an access device and has, as first constituent processing, setting (manual, overall, automatic, operation-triggered)-management of devices and services of an ONU, an OSU, an OLT, or a SW, setting backup, software update such as FW, device control (reset), monitoring of normal function operation, alert issue at anomaly occurrence, anomaly range and factor inspecting test, and redundant configuration handling. These pieces of processing may be configured as CLI-IF, device management IF, operation IF, generalized config-IF (such as Netconf or SNMP), and table management, which are pieces of basic processing.

The maintenance-operation function unit 330 has, as second constituent processing, device state monitoring (CPU/memory/power source/switching), traffic monitoring, alert monitoring (ONU anomaly, OLT anomaly), and test (loop back). These pieces of processing may be configured as alert notification, log record, L3 packet generation/processing, and table management, which are pieces of basic processing.

The maintenance-operation function unit 330 has, as third constituent processing, monitoring-control inputting and outputting (such as sleep instruction/reply or λ setting switching instruction/reply), which need to be fast. A physical layer QAM (PLOAM) message and bit expression (embedded OAM) in a header are used as means for the present processing. These pieces of processing may be configured as PLOAM processing, embedded OAM processing, communication with the power saving control function unit 360, communication with the protection function unit 380, and communication with the PON access control function unit 320, which are pieces of basic processing.

Equivalent processing may be achieved as a combination of the pieces of basic processing. In addition, their orders may be exchanged.

As exemplary function assignment of the first processing, processing except for hardware Config may be processing by an app, and software and setting data may be processing by an app on the external server 16 in FIGS. 1 and 17 without being held at an ONU or an OLT. This may be achieved through command unification and sequence definition.

As exemplary function assignment of the second processing, only a notification/display IF may be processing by an app, items (such as a CPU load, a memory use amount, a power source state, electric power consumption, and an Ethernet link state) that need to be monitored may be achieved by the instrument dependent unit 110, and an IF of notification reading from the instrument dependent unit 110, network (NW) transmission of a notification, writing to a file, or the like may be processing by an app.

The maintenance-operation function is connected with a maintenance-operation system configured to manage a large number of access devices and remotely achieves smooth maintenance and operation. In the maintenance-operation function, the setting-management app, the low-speed monitoring (OMCI) app, and the high-speed monitoring app can be implemented as software, and the low-speed monitoring app (ONU/OLT monitoring) depends on a situation. As a scalability effect (differentiation element) of each function, the setting-management app has an effect of achieving radical Opex reduction through cooperation with a controller, and the low-speed monitoring app (ONU/OLT monitoring: EMS) has an effect of achieving radical Opex reduction through cooperation with the EMS.

The PON multicast function that the PON multicast function unit 350 has is a function group configured to forward a multicast stream received from the SNI side to an appropriate user and has, as pieces of constituent processing, multicast stream identification and sorting, MLD/IGMP proxy/snooping, ONU filter setting, multicast (frame treatment), and inter-wavelength setting transition. These pieces of processing may be configured as L2 identification and sorting, L3 packet processing (desirably includes IPv6 Parse), L3 packet generation, table management, and communication with an OMCI function, which are pieces of basic processing. Processing equivalent to the multicast stream identification or sorting, the MLD proxy/snooping, the ONU filter setting, the inter-wavelength setting transition may be achieved as a combination of the pieces of basic processing. In addition, their orders may be exchanged. An MLD/IGMP proxy app can be implemented as software.

As exemplary function assignment, software processing of the multicast (MC) stream identification and sorting is possible by a CPU or the like having high-speed processing capacity, but "hardware+config" is desirable. In addition, an app system and ONU settings for upstream is processing by an app because of their loose frequency and delay constraint.

A function (access control) that the power saving control function unit 360 has is a function group for reducing ONU and OLT power consumption and may have, in addition to a power saving function defined by standardization, a function for obtaining a maximum effect with minimum influence on service through cooperation with a traffic monitor. The function has, as pieces of constituent processing, sleep proxy/traffic monitor, ONU wavelength setting, and inter-wavelength setting transition. These pieces of processing may be configured as L3 packet processing (desirably includes IPv6 Parse), L3 packet generation, table management, OSU power saving state diagram (SD), and communication with an OMCI function, which are pieces of basic processing. Processing equivalent to the sleep proxy/traffic monitor, the ONU wavelength setting, and the inter-wavelength setting transition may be achieved as a combination of the pieces of basic processing. In addition, their orders may be exchanged.

As exemplary function assignment, a power save (PS) app, and proxy processing, depending on a signal, may be processing by an app. Power saving control state transition management (driver unit) requires speed but may be processing by an app. Only config of the traffic monitor may be processing by an app. The power saving app can be implemented as software. As a scalability effect (differentiation element) of each function, the power saving app has an effect of a flexible QoS.

The frequency-time synchronization function that the frequency-time synchronization function unit 370 has is a function group configured to provide accurate frequency synchronization and time synchronization to a device under control of an ONU and may have a function that performs slave synchronization of a real time clock (RTC) thereof with a higher-level device through a synchronous ethernet (SyncE) (for frequency synchronization) and IEEE 1588v2 (time synchronization), and a function that notifies the ONU of time information by using a PON frame by notifying the ONU of the correspondence between PON superframe counter (SFC) and absolute time (Time of Day: ToD) information by using the OMCI. These pieces of processing may be configured as real time clock holding and the like, which are pieces of basic processing. Equivalent processing may be achieved as a combination of the pieces of basic processing. In addition, their orders may be exchanged.

As exemplary function assignment, the real time clock may be achieved by the instrument dependent unit 110, and calculation of time adjustment to a higher-level device may be processing by an app (or may be achieved by the instrument dependent unit 110, depending on accuracy).

Software implementation of frequency and time synchronization functions is difficult.

The protection function that the protection function unit 380 has is a function group for continuing a service by performing switching or handover from an active system to a backup system upon failure sensing in a configuration that has redundancy among a plurality of hardware pieces such as SWs or OSUs, and has switching trigger detection and redundant switching (CT, SW, NNI, Cont, PON (Type A, B, C)) as pieces of constituent processing. These pieces of processing may be configured as redundant path setting, switching trigger detection, switching notification transmission and reception, switching processing, and the like, which are pieces of basic processing. Equivalent processing may be achieved as a combination of the pieces of basic processing. In addition, their orders may be exchanged. A protection algorithm can be implemented as software. The protection algorithm has a scalability effect.

Note that the eight main functions may be provided when needed, for example, only the PON main signal processing function, the PON access control function, the L2 main signal processing function, and the maintenance-operation function may be provided, and other functions may be provided. Evaluation of possibility of software implementation of each function is an example when OLT processing capacity and software SW application, which are assumed in 2018, are not assumed. The assumed processing capacity and software SW application may be assumed and changed as appropriate. Any function that can be implemented as software does not necessarily need to be implemented as software. The internal configuration of each function may be any other configuration with which the same function can be achieved.

Consideration and examples of whether each function is implemented as a FASA application or implemented on the FASA board as illustrated above will be described below. Among functions, a function to be changed due to a service and a function to be extended to satisfy a requirement unique to a telecommunication carrier are achieved as FASA applications. However, a function less likely to be extended since it is defined by standardization or the like is implemented on the FASA board. This indicates that, for example, the PON main signal processing function is achieved as the FASA board. To achieve an access device compliant with ITU-T G.989 series, basic PON main signal processing functions such as frame format, frame encryption, and FEC functions need to be implemented in accordance with the standard. Such basic functions are common irrespective of a service and thus implemented on the FASA board.

As another example, FIGS. 1 and 18 illustrate that "response to a service request" of a DBA function included in the PON access control function is achieved as a FASA application. For example, depending on a provided service, there are a case in which low latency is provided and a case in which bands are efficiently allocated to a large number of users. To satisfy a request different for each service, the procedure and policy of band allocation are desirably separated as a FASA application from typical processing (conversion to a BWmap format or the like, defined as a standard). In some cases, even when a provided service is targeted to the same mass, a fairness policy is different, for example, a heavy user handling policy is different between telecommunication carriers. For example, it is assumed that a telecommunication carrier that needs fairness control of small granularity such as the unit of PON performs fairness control even inside a DBA application, and a telecommunication carrier that performs fairness control of only large granularity such as the unit of access device satisfies each QoS definition by using a concentrator function.

In this manner, since different requests are achieved by replacement of FASA applications in a FASA, means for FASA application replacement is needed, and what is employed as the replacement means is different among telecommunication carriers and operations. For example, Trivial File Transfer Protocol (TFTP) is provided when TETP is used for software update by an existing maintenance-operation system used by a telecommunication carrier, and SFTP (SSH FTP) is provided when the update is performed by using SFTP from the outside of the maintenance-operation system. Argument of standardization related to an interface between a device and a controller is expected to proceed in the future, and interface addition and change that follow the progress of standardization need to be considered. Thus, a function that needs to be customized in accordance with any other system connected with an access device and operation thereof may achieved as a FASA application.

In addition, in the FASA, not only protection performed with complete duplication of the entire FASA board but also protection performed at part of the FASA board are assumed. A plurality of redundant configurations are thought of, such as a case in which the FASA board includes an optical SW to achieve PON protection, or a plurality of wavelengths for one PON are provided to achieve wavelength protection, a case in which only a SW is duplicated, or a case as a combination of these cases. An expected redundant configuration can be achieved by implementing the protection function as a FASA application, and various kinds of redundant configurations can be easily achieved by reusing corresponding parts.

A function implemented as a FASA application, in other words, an extended function may be an extended function in accordance with the update frequency of a function and the importance of realization of unique specifications or the like among functions that can be implemented as software. A function, the update frequency of which is low or for which a demand for realization of unique specifications or the like is low is preferably FASA application API middleware or instrument dependent software or hardware, other than a basic function and an instrument independent app. In particular, a function having restriction due to software processing capacity is preferably maintained as hardware. For example, a function that has a high renewal frequency of DBA or the like for improving main signal priority processing and line use efficiency or contributes to service differentiation, and a management control function that is closely related to a task flow of an operator and for which unique specifications of each operator are requested are achieved as extended functions.

Thus, an algorithm included in the eight main functions is set as a main software implementation region. A function set as a software implementation region is set as the instrument independent app unit 130 on the instrument independent APIs 21 and 22. For example, an algorithm in an ONU registration or authentication function, a DWBA function, a setting-management-monitoring control function, and a power saving control function, which contribute to a differentiation service, is treated as the extended function unit 131 in the instrument independent app unit 130. The MLD proxy app has a multicast function.

As for the extended function unit 131, an app is set as the extended function unit 131 in accordance with the update frequency of a function and the importance of realization of unique specifications or the like. An app, the update frequency of which is low or for which a demand for unique specification is low is preferably the middleware unit 120, an instrument dependent software, the hardware unit 111 (PHY), or the hardware unit 112 (MAC), other than the basic function unit 132 and the instrument independent app unit 130. In particular, a function having restriction due to software processing capacity is preferably maintained as the hardware unit 111 (PHY) and the hardware unit 112 (MAC). For example, a function that has a high renewal frequency of DBA or the like for improving main signal priority processing and line use efficiency or contributes to service differentiation, and a management control function that is closely related to a task flow of an operator and for which unique specifications for each operator are requested are achieved as the extended function unit 131.

Figure 21:
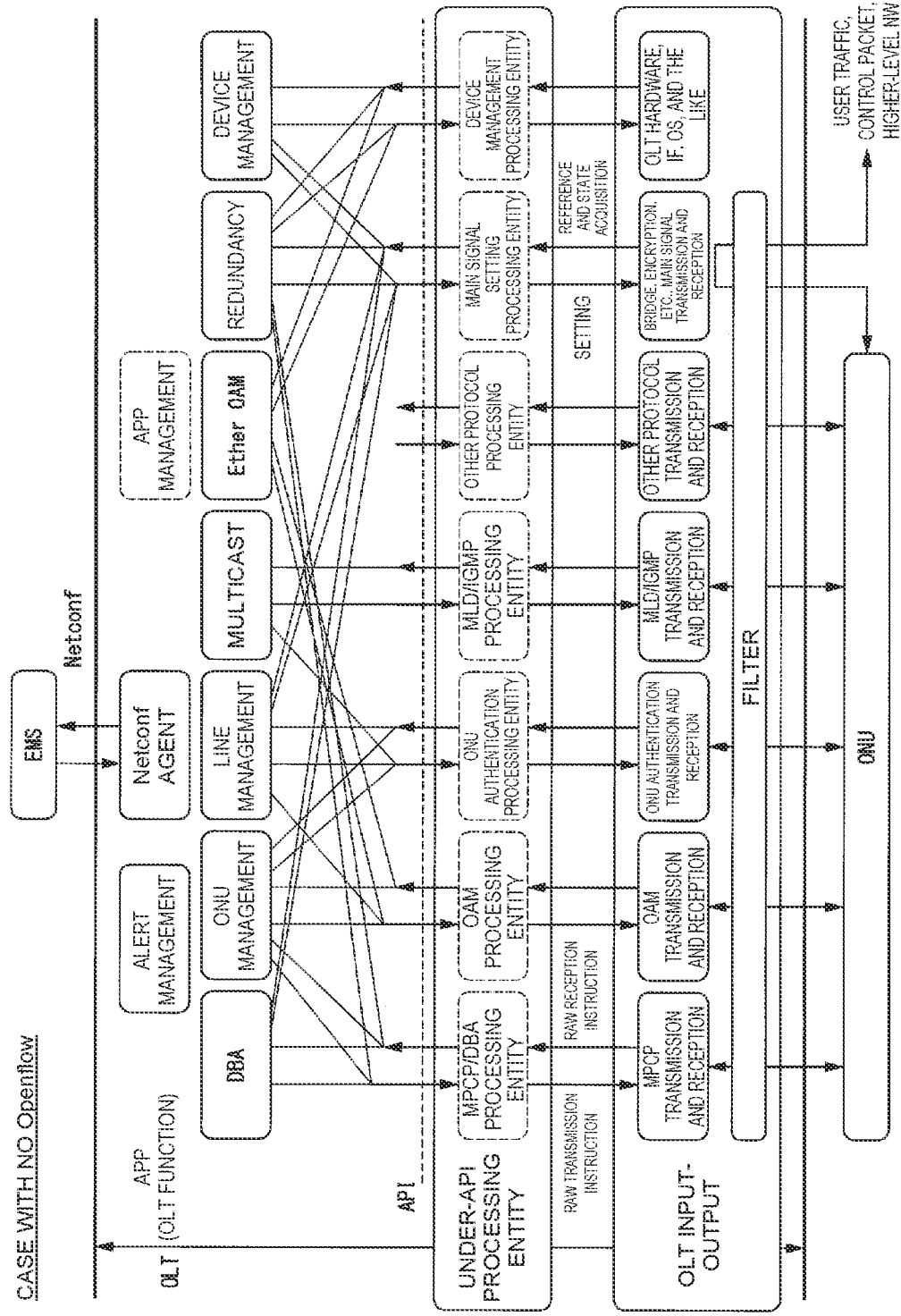
FIG. 21 is a diagram illustrating an example of a signal and information flow among function units in the communication device in the embodiment.

FIGS. 1 and 21 are diagrams illustrating signal/information flow among function units in the communication device. In FIGS. 1 and 21, signal/information flow among function units in the communication device is illustrated with focus on In/Out of an OLT. As illustrated in FIGS. 1 and 21, the OLT as the communication device is constituted by an under-API processing entity (FASA platform) and apps (FASA applications).

The under-API processing entity is illustrated as an MPCP/DBA processing entity in which subjects of OLT input-output are transmission instruction and reception notification for MPCP transmission and reception, OAM processing entity in which subjects of OLT input-output are OAM transmission and reception, ONU authentication processing entity in which subjects of OLT input-output are ONU authentication transmission and reception, an MLD/IGMP processing entity in which subjects of OLT input-output are MLD/IGMP transmission and reception, an other-protocol processing entity in which subjects of OLT input-output are other-protocol transmission and reception, a main signal setting processing entity in which an OLT input/output is setting, reference, and state acquisition for main signal processing such as bridge and encryption, and a device management processing entity in which subjects of OLT input-output are OLT hardware, an IF, an OS, and the like. The transmission instruction and reception notification for MPCP transmission and reception are desirably "send_frame (*raw_frame);" or the like on assumption of driver direct hitting. When viewed from an API upper-side app, there is desirably, for an API lower-side processing unit, a processing entity that (a) easily (feasibly), (b) in common (among a plurality of kinds), and (c) conveniently performs processing as compared to processing such as driver direct hitting.

In FIGS. 1 and 21, DBA, ONU management, line management, multicast, EtherOAM, redundancy, device management, alert management, Netconf agent, and app management are illustrated as apps.

Function assignment of the under-API processing entity is illustrated below. Each app has processing corresponding thereto. Function assignment of the under-API processing entity and the app may be any form described below or other form or may be different between processing entities.

(0) Message-through: a message is transmitted through at the API upper side and an ONU/higher-level NW.

(1) Framing: a frame is removed and a message is disassembled into elements or processed when needed and is provided to the API upper side. Information is passed from an API upper part to the API lower side. The under-API processing entity performs framing. The API has large dependency on each protocol and thus may be included in an instrument dependent app unit. A fixed parameter (such as a type value) is desirably set by the API upper part at initialization or the like and held. A setting parameter is replied in response to reference from the API upper part.

(2) Automatic response: message transmission and reception, such as periodic transmission and fixed response, which do not need determination are performed by a processing entity. Operation setting is desirably performed by the API upper part in advance. For example, a response period. A result is notified only when notification to the API upper part is necessary.

(3) Autonomous determination: processing that involves determination is performed by a processing entity. Policy setting is performed by the API upper part in advance.

FIGS. 1 and 21 are illustrated for an IEEE compliant 10GEPON but are same for a device compliant with ITU-T or other when corresponding functions and processing are substituted. Functions and processing entities are exemplary, and addition, deletion, replacement, and change thereof are possible as appropriate in accordance with a condition.

Description is added below for each API with reference to FIGS. 1 and 19 and FIGS. 1 and 20.

For example, when it is assumed that processing basically has no or gentle time constraint, In/Out (such as a FASA application API) of an OLT can be roughly classified into three, namely, setting-control/information notification-acquisition (setting-control API) for the OLT, input-output for an ONU (API of message transmission and reception to and from the ONU), and other input-output to and from the EMS (other API).

When an app performs setting and management, for example, the setting-control API receives a setting instruction and a control message from a controller/EMS in Netconf/YANG or the like and loads a message basically based on a YANG model or the like, and the app provides an instruction to the under-API processing entity in accordance with the content thereof or forwards information notification/acquisition of an OLT to the controller/EMS. When an app performs, on an ONU, setting and control or some instruction, information acquisition, and notification, for example, the API of message transmission and reception to and from the ONU assembles a message toward the ONU, passes the message to the under-API processing entity, and instructs transmission, or reads a message from the under-API processing entity. A plurality of protocols such as extended OAM and OMCI are available for message exchange with the ONU and can be summarized as message transmission instruction and reading as an interface.

The other API needs the interface in a case of cooperation with an instrument other than an OLT, for example.

An exemplary API (API having a time constraint) of DBA, sleep, or the like, which needs processing having a time constraint when processed by an app, for example, highly frequent messaging with an ONU will be described below.

For example, an API having a time constraint in a case of DBA is (1) notification of information (for example, total information) related to an upstream transmission permit from the app to the under-API processing entity, and (2) notification of information (for example, total information) related to an upstream transmission request from the under-API processing entity to the app. Information passed by the API is desirably a value that does not need recalculation at a passing destination. This is because, when dependency between the app and the under-API processing entity is reduced to increase independency, the app can perform only algorithm processing and the under-API processing entity can perform only message implementation processing.

Examples are described below.

```
- Transmission permitted amount setting API
Format: fasa_api_set_grant_config (UINT64 sfc, UINT8 ch,
int n_of_configs, grant_config_t grant_config[ ]);
Argument:
  UINT64 sfc; /* superframe counter value. Ignored
for IEEE 802.3 */
UINT8 ch; /* downstream wavelength channel ID in TWDM.
Ignored in a non-compliant case */
int n_of_configs; /* the number of transmission permits
notified at the present API */
grant_config_t grant_config[ ]; /* transmission permits
(array of the number of n_of_configs) */
typedef struct {/* IEEE 802.3 ITU-T G.989 */
UINT16 id; /* LLID Alloc-ID */
UINT8 flags; /* Flags Flags/FWI/Burst Profile */
UINT32 grant_start_time; /* Grant Start Time Start Time
*/
UINT16 grant_length; /* Grant Length GrantSize */
}grant_config_t;
```

Through the present API, the DBA app, for example, directly notifies the under-API processing entity of DBA of a transmission permitted amount. The under-API processing entity assembles a transmission permit message to an ONU based on the notified transmission permitted amount and transmits the transmission permit message to the ONU. Operation of each of IEEE 802.3 and ITU-T G.989 will be illustrated below.

In an IEEE 802.3 Ethernet PON, upstream transmission control is performed by transferring a GATE message to an ONU. The ONU at the destination is identified based on an LLID stored in the preamble. A transmission start time is instructed by "grant starttime", and a transmission permitted amount is instructed by "grant length". The kind of a transmission permit is instructed by flag fields of "Discovery GATE" and "force report". One GATE message can store four transmission permits at maximum.

Upon reception through the present API, the under-API processing entity parses arguments and operates as follows.
sfc and ch values are ignored.
One "grant_config" corresponds to one Grant/transmission permit (pair of "grantstart time" and "grant length"), and the number of "grant_config" is equal to the number of n_of_configs.
The lower 15 bits of "id" are, for example, an LLID provided to GATE.
The least significant bit of "flags" is, for example, "discovery flag", and the second least significant bit is the value of "force_report".
32 bits of "grant_start_time" are the value of Grant StartTime.
"grant_length" is, for example, the value of Grant Length.
When there are a plurality of "grant_config" for one id (LLID), the plurality of "grant_config" are packed into one GATE message as much as possible. Four grants at maximum can be packed in the GATE message. The value of "number of grants" in the GATE message is calculated based on the GATE message packed by the under-API processing entity, and the value is stored. The value of "force_report" is calculated based on the order of the corresponding "grant" by the under-API processing entity, and the value is stored.
The value of any other GATE frame field is not specified by the app.
After completion of argument parse upon reception through the API, for example, a completely established GATE frame is immediately transmitted downstream.

Note that app processing is based on an assumption that the current value of MPCP local time, ONU identification, an LLID number, an RTT value, link state acquisition, notification of a QoS parameter (set value of a maximum band or the like) for each ONU/LLID, and the like are performed by other processes.

In a TWDM-PON of ITU-T G.989.3, upstream transmission control is performed by notifying an ONU of BWmap. The BWmap is constituted by a plurality of "allocation structures", and one transmission permit is included in one "allocation structure". Each transmission permit is constituted by StartTime and GrantSize.

Upon reception through the present API, the under-API processing entity performs parsing and operates as follows.

Mounting is performed on BWmap of a downstream frame of "super framecounter" equal to the value of received "super frame counter".

The BWmap is transmitted downstream through a downstream wavelength channel of "DWLCH ID" indicated by the value of "ch". This value is ignored in a case in which TWDM is not compliant.

One "grant_config" corresponds to one "Allocation structure", and "n_of_configs" indicates the number of "Allocation structures".

The lower 14 bits of "id" are, for example, "Alloc-ID" provided to Allocation structure.

The least significant bit, the second least significant bit, the third least significant bit, and the fourth and fifth least significant bits of "flags" are, for example, the values of "PLOAMu", "DBRu", "FWI", and "Burst Profile", respectively, in "Flags" in "Allocation structure".

The lower 32 bits of "grant_start_time" are, for example, the value of "StartTime".

"grant_length" is, for example, the value of "GrantSize".

One "grant_config" is, for example, one "Allocation structure". "HEC" in "Allocation Structure" is calculated by the under-API processing entity and stored.

For example, one BWmap is established for one API.

After being established upon reception through the API, BWmap is transmitted downstream being included in the FS header in accordance with a downstream frame of a "superframe counter" value specified by the present API. Note that the app is based on an assumption that the current "superframe counter" value, ONU identification, "Alloc-ID" number association, RTT value acquisition, link state acquisition, and the like are performed through other processes and the app is notified of a QoS parameter (such as a maximum band) for each "Alloc-ID" through another process.

- Transmission request amount acquisition API
Format: fasa_api_get_onu_request (UINT64 sfc, UINT8 ch, int n_of_configs, request_config_t request_config[ ]);
Arguments:
   UINT64 sfc; /* superframe counter value. Ignored for IEEE 802.3 */
   UINT8 ch; /* upstream wavelength channel ID in TWDM. Ignored in a non-compliant case */
   int n_of_requests; /* the number of transmission requests notified by the present API */
   request_config_t request_config[ ]; /* transmission request (array of the number of "n_of_configs") */
   typedef struct {/* IEEE 802.3 ITU-T G.989 */
   UINT16 id; /* LLID ONU-ID */

-continued

UINT8 flags; /* QSet/Qreport number Ind */
   UINT32 request; /* queue report value "BufOcc" value */
   }request_config_t;

Through the present API, the DBA app directly acquires information related to transmission requests received and accumulated at the under-API processing entity. The present API is in the format of polling but may be callback. Operation of each of IEEE 802.3 and ITU-T G.989 is illustrated below.

In an IEEE 802.3 Ethernet PON, upstream transmission request is performed by transferring a REPORT message from an ONU to an OLT. The ONU at the transmission source is identified based on an LLID stored in the preamble. A "REPORT" frame includes one or more pairs of "Report bitmap" and "Queue Report", each pair being referred to as "Queue Set". The number of "Queue Set" is expressed by "number of queue sets". The value of a transmission request amount is stored in "Queue Report". Eight kinds of "Queue Report" at maximum can be stored in one "Queue Set", and only "Queue Report" having a value can be notified. "Report bitmap" indicates which of the eight kinds of "Queue Report" is notified.

Upon reception through the present API, the under-API processing entity returns, as a return value for an argument, information related to transmission request, and requires operations below for returning.

Accumulation of transmission request information included in a received "REPORT" frame. Specifically, accumulation of an LLID, a "Queue Set" number, a "Queue Report" number, and a "queue report" value indicated by these numbers.

Return of these three values to the app as a return value for the argument "request_config" of the API.

Storage of the value of the LLID in the argument "id".

Storage of "Queue report" numbers 0 to 7 in the lower 3 bits of the argument "flags", and storage of the "Queue Set" number in the higher 5 bits of the argument "flags".

Storage of the "queue report" value corresponding to these numbers in the argument "request".

Handover of the accumulated transmission request information to the app in accordance with reading by the present API, and deletion of the handed-over information or overwriting thereof with new information.

Storage, in the argument "sfc", of the MPCP local time at latest reception of the "REPORT" frame in the accumulated transmission request information.

Note that the app is based on an assumption that the current MPCP local time value, ONU identification, LLID number and RTT value acquisition, link state acquisition, and the like are performed through other processes and the DBA app is notified of a QoS parameter (such as a maximum band) for each ONU/LLID through another process.

In a TWDM-PON of ITU-T G.989.3, upstream transmission request is performed by transferring BufOcc in DBRu from an ONU to an OLT. The ONU at the transmission source is identified based on an ONU-ID stored in the FS header. By using a "PLOAM queuestatus" bit in the "Ind" field in the FS header, the ONU notifies the OLT of whether transmission of an upstream PLOAM message is to be waited.

Upon reception through the present API, the under-API processing entity returns, as a return value for an argument, information related to transmission request, and requires operation below for returning.

Accumulation of received transmission request information. Specifically, accumulation of an ONU-ID, a "BufOcc" value, and a "PLOAM queuestatus" bit value.

Return of these three values to the app as a return value for the argument "request_config" of the API.

Storage of the value of ONU-ID in the argument "id".

Storage of the "PLOAM queuestatus" bit value in the least significant bit of the argument "flags".

Storage of the "BufOcc" value in the argument "request".

Accumulation of the "BufOcc" values in the order of reception when there are a plurality of "Allocation" in one burst. In this case, the values of ONU-ID and PLOAM queuestatus are the same for each "BufOcc" value, API argument simplicity and unification are prioritized over redundancy as information.

Handover of the accumulated transmission request information to the app in accordance with reading by the present API, and deletion of the handed-over information or overwriting thereof with new information.

Storage, in the argument "sfc", of the "Superframe counter" value at latest reception of "BufOcc" in the accumulated transmission request information.

Note that the app is based on an assumption that the current "superframe counter" value, ONU identification, "Alloc-ID" number association, RTT value acquisition, link state acquisition, and the like are performed through other processes and the DBA app is notified of a QoS parameter (such as a maximum band) for each "Alloc-ID" through another process.

L2 main signal processing at an OLT is appropriate forwarding of user data to upstream and downstream paths. Thus, functions of the app are reception of an instruction in Netconf/YANG or Openflow from an EMS/higher-level OpS, and based on the instruction, (1) setting of forwarding to upstream and downstream paths, (2) acquisition of statistics information, and (3) loading, onto the under-API processing entity, of setting of forwarding to an ONU. (1) and (2) are processing that loads setting onto the under-API processing entity based on the YANG model, and (3) is processing that assembles contents of setting to the ONU and loads, onto the under-API processing entity, an instruction of message transmission to the ONU.

A large number of functions are available as maintenance-operation functions at the OLT and can be roughly classified into two, namely, (1) instruction of setting and operation for the OLT and (2) notification of the states of the OLT and the ONU.

In (1) setting and operation instruction, the app receives an instruction in Netconf from an EMS/higher-level OpS and loads contents thereof onto the under-API processing entity based on the YANG model. In (2) state notification, the app receives a notification from the under-API processing entity based on the YANG model or an OAM/OMCI message and notifies the EMS/higher-level OpS of contents thereof in Netconf.

The PON multicast function at the OLT is mainly used for video distribution and the like and has some implementation schemes. The following describes overviews of the schemes and aspects of function assignment and message flow at the app and the under-API processing entity.

Multicast is multiple addressing of the same information to a plurality of optional forwarding destinations (may be one). Typically, the forwarding destination of a multicast stream is dynamically controlled in accordance with a participation request/withdrawal request to a multicast group from a terminal. IGMPv3 of IPv4 and MLDv2 of IPV6 are often used for a message such as a participation request/withdrawal request and a protocol for multicast forwarding control. In a PON of a TDM system, typically, a downstream path from an OLT to an ONU is logically unicast and physically broadcast, and thus inventive ways are needed to achieve multicast. Mainly, three ways of (1) multicast by a higher-level node, (2) ONU snoop, and (3) OLT proxy are used. Aspects of function assignment and message flow of each scheme are described below.

In a scheme that achieves multicast forwarding by a higher-level node, an ONU and an OLT are each set to perform transmission forwarding of an IGMP/MLD message. Then, a node at a level higher than an OLT having received a participation request message forwards a multicast stream to a terminal having issued the participation request. In this case, when participation request is made to the same multicast group by each terminal under control of a plurality of ONUs connected with the same OLT, a higher-level node forwards a multicast stream toward each terminal, and thus a plurality of streams of the same content are transmitted to the OLT. The OLT performs transmission forwarding of the plurality of streams to the respective ONUs as individual unicast streams.

When participation request is made to the same multicast group by a plurality of terminals under control of the same ONU, response is different depending on functional configurations of the ONU and a controlled node. When the ONU or the controlled node has a multicast router function, the ONU or the controlled node distributes, in response to participation request from a second terminal, a multicast stream to the second terminal by multiple addressing without forwarding a participation request message to the OLT and the higher level. In a case of a configuration that does not have the multicast router function, a multicast stream to each terminal is distributed by a node at a level higher than the OLT.

There is a method of achieving PON multicast by ONU snoop that snoops an IGMP/MLD message flowing through an ONU. In this method, PON multicast is performed by snooping, at the ONU, an IGMP/MLD message transmitted from a terminal under control of the ONU to a node (multicast router) at a level higher than an OLT. First, the OLT forwards a multicast stream received from the higher-level node so that the multicast stream can be received by all ONUs. The ONU opens and closes a downstream forwarding filter thereof in accordance with the snooped IGMP/MLD message. Specifically, the forwarding filter is set to forward downstream traffic of a multicast group as a participation target when the snooped message is a participation request or to block the traffic when the snooped message is a withdrawal request. Filter setting for forwarding and blocking is performed by a predetermined method using various regions of IP address, MAC address, VLAN tag, other identifier, and the like. Accordingly, the multicast stream forwarded from the OLT can be forwarded to an under-ONU part in a state in which the filter of the ONU is opened, or the multicast stream received from the OLT by the ONU is discarded without being forwarded to an under-ONU part in a state in which the filter is closed. This achieves multicast forwarding. In this case, in function assignment at the app and the under-API processing entity, the app receives an instruction of whether to activate an IGMP/MLD snoop function of the ONU by initial setting or service order in Netconf or the like from the EMS/higher-level OpS. Upon the reception, transmission of an extended OAM or OMCI message is instructed to the under-API processing entity through a communication API for the ONU. The under-API processing entity transmits, to the ONU, the message for which the instruction is received, and instructs whether to activate the snoop function. Accordingly, PON multicast is controlled by ONU snoop.

In another method, an IGMP/MLD message forwarded from an ONU to a higher-level node through an OLT is collected and responded by the OLT by proxy, and whether to open or close the downstream forwarding filter is instructed to the ONU, and this method is typically called OLT proxy. In this method as well, the OLT forwards a multicast stream from the higher-level node so that the multicast stream can be received by all ONUs. The OLT receives an IGMP/MLD message from a terminal at an under-ONU part and forwards the message to the higher-level node in accordance with the content of the message. The OLT instructs, by an extended OAM or OMCI message, the ONU to open the downstream forwarding filter of a corresponding multicast group of the ONU when the message is a participation request or to close the downstream forwarding filter when the message is a withdrawal request. Accordingly, the multicast stream is forwarded only to the terminal having issued the participation request, which achieves multicast forwarding. In this case, ONU filter operation and message forwarding to the higher-level node can be performed so that multicast forwarding is efficiently performed with taken into account, for example, a case in which there are a plurality of terminals under control of the ONU or a state of a terminal under control of an ONU different from the ONU having forwarded the IGMP/MLD message. In this case, in function assignment at the app and the under-API processing entity, the app sets a main signal path in advance so that the IGMP/MLD message transmitted upstream from the ONU is received by the OLT and then forwarded to the app API upper side. This path setting is part of setting of a main signal to the OLT, from the app to the under-API processing entity, and is assumed to be set as Netconf/YANG or as Openflow or the like. A trigger of the path setting is setting from the EMS/higher-level OpS. In addition, a method of downstream forwarding of a multicast stream is performed when a setting instruction from the EMS/higher-level OpS is received by the app in Netconf/YANG or Openflow and the content thereof is loaded onto the under-API processing entity. An OLT proxy function is achieved by instructing, based on the content of the IGMP/MLD message forwarded to the app, the under-API processing entity to transmit an extended QAM or OMCI message that instructs whether to open or close the downstream filter of the ONU.

With the power saving control function, an ONU stops power supply to some functions when needed, thereby reducing electric power consumption at the ONU. Functions of the app are reception of setting and service order related to a power saving mode of the ONU from the EMS/higher-level OpS, assembly of an extended OAM/OMCI message based on the content thereof, and notification to the ONU to transmit the message to the under-API processing entity. The app receives state change notification by PLOAM or the like from the under-API processing entity.

Note that, similarly to the above-described DBA, when the state of the power saving mode of an ONU is to be controlled directly from the app, assembly of a transmission message to the ONU and acquisition of a reception message from the ONU are performed by the app in real time, and message transmission and message reception instruction to the under-API processing entity are performed.

A frequency/time synchronization function is a function that accurately outputs, from an ONU through a PON interval, a reference signal and time information input to an OLT. Functions on the app side are assembly of a transmission message to notify the ONU of setting needed for the synchronization function and a parameter or the like related to signal propagation from the OLT to the ONU, and instruction of message transmission to the under-API processing entity side.

An external cooperation function is used, for example, in a case of function execution through cooperation with an external instrument, such as low-latency DBA with a mobile base station. In the external cooperation function, for example, a message from an external instrument is received on the app side. A function of message reception from the external instrument strongly depends on a connection configuration and a message format with mounted and external instruments, and thus functions of the app are desirably reception and parsing of a message without disassembly. Moreover, a typical function of an installed OS may be utilized, or a unique API may be defined.

In the above-described example, the app performs processing of an algorithm such as DBA, and the under-API processing entity performs messaging. This function assignment is suitable for a case in which messaging is common and only the algorithm is changed. Note that, for generalization, an interface desirably has low algorithm dependency.

The above-described configurations according to Embodiment 1-1 apply to embodiments described below and may be combined as appropriate. For example, FIGS. 1 and 17 illustrate a case in which the configuration of the execution unit in the present system includes only the TRxs 11, the SWs 12, and the SW 13, but the execution unit may be a unit other than the TRxs 11, the SWs 12, and the SW 13, another place, a place at which the PON terminates, or the control unit 14.

Embodiment 1-2

A configuration used for a TWDM-PON is illustrated in Embodiment 1-1 but may be applied to a TDM-PON. Embodiment 1-2 is the same as Embodiment 1-1 except that no function, such as λ setting switching (DWA), which performs wavelength division multiplexing of wavelength resources of a PON interval between ONUs or between an ONU and an OLT needs to be provided in the TDM-PON.

Embodiment 1-3

A configuration used for a TWDM-PON is illustrated in Embodiment 1-1 but may be applied to a WDM-PON. Embodiment 1-3 is the same as Embodiment 1-1 except that no function, such as DBA, which performs time division multiplexing of band resources of a PON interval between ONUs or between an ONU and an OLT needs to be provided in the WDM-PON.

Embodiment 1-4

The present embodiment is a combination including an orthogonal frequency division multiplexing (OFDM)-PON, a code division multiplexing (CDM)-PON, a subcarrier multiplexing (SCM)-PON, and a core wire division multiplexing.

A configuration used for a TWDM-PON is illustrated in Embodiment 1-1 but may be applied to a PON that shares resources other than wavelength and time. For example, the configuration may be applied to an OFDM-PON that performs division multiplexing of electricity frequency resources of one wavelength, an SCM-PON that performs division multiplexing of electricity frequency resources of one wavelength, or a CDM-PON that performs division multiplexing with signs, core wire division multiplexing may be used as well, space division multiplexing using a multi core fiber or the like may be used as well, or no wavelength division multiplexing may be used. The same description applies when a function that performs wavelength division multiplexing of wavelength resources of a TWDM-PON is substituted with a function corresponding to a function needed for division multiplexing of each multiplexed resource.

Embodiment 2

In Embodiment 2, a configuration used for a TWDM-PON performs GEM encapsulation. In this case, a SW includes an adapter configured to generate a GEM frame, and the GEM frame is guided between the SW and the other part. With transferring to the SW until GEM encapsulation, the L2 function unit can be excluded from a protocol stack at the other part, and duplication of the L2 function unit at the SW and the other part can be avoided.

Note that a TWDM-PON is illustrated above, but the same effect can be obtained with any other PON when a frame for identification at a PON interval is handled in the same manner as in Embodiments 1-2 to 1-4. For example, in a case of an IEEE standard GE-PON, 10GE-PON or the like, an LLID may be applied and a frame to which the LLID is applied may be guided between the SW and the other part in place of the GEM frame.

Embodiment 3

In Embodiment 3, control information used for a TWDM-PON passes through a SW. In this case, instead of transferring a bridge function and the like to the SW, any of PLOAM, embedded OAM, and OMCI that hold the control information is framed and processed through the SW when needed. When the control information is input and output through the SW, an effect of reducing processing at places other than the SW is obtained. Note that transfer of the bridge function to the SW in Embodiments 1 and 2 may be performed in addition to the transfer in Embodiment 3.

Note that a TWDM-PON is illustrated above, but the same effect can be obtained with any other PON as in Embodiments 1-2 to 1-4 when the control information is handled in the same manner and processed through the SW.

At least part of the communication device in each above-described embodiment may be achieved by a computer. In this case, a program for achieving functions thereof may be recorded in a computer-readable recording medium, and the program recorded in the recording medium may be achieved by a computer system through reading and execution. Note that the "computer system" includes an OS and hardware such as a peripheral instrument. The "computer-readable recording medium" is a portable medium such as a flexible disk, a magneto optical disc, a read only memory (ROM), or a compact disc read only memory (CD-ROM), or is a storage device such as a hard disk built in the computer system. Moreover, the "computer-readable recording medium" may include a medium that dynamically holds the program for a short time, such as a communication line when the program is transmitted through a network such as the Internet or a communication line such as a phone line, and may include a medium that holds the program for a certain time, such as a volatile memory inside the computer system serving as a server or a client in that case. The above-described program may be used to achieve some of the above-described functions, may be capable of achieving the above-described functions in combination with the program already recorded in the computer system, or may be achieved by using a programmable logic device such as a field programmable gate array (FPGA).

The embodiments of the present invention are described above in detail with reference to the accompanying drawings, but specific configurations are not limited by the embodiments. The above-described embodiments are merely exemplary, and the present invention may be performed in a form provided with various kinds of change and modification based on the knowledge of the skilled person in the art and includes designing and the like without departing from the scope of the present invention.

INDUSTRIAL APPLICABILITY

The present invention is applicable to a communication device such as a PON system.

REFERENCE SIGNS LIST 1 communication system
2 ONU
3 ODN
4 OLT
5 controller
6 controller
7 optical multiplexer/demultiplexer
10 optical switch unit
11, 11a, 11b, 11c, 11d transmission-reception unit
12 switch unit
13, 13a, 13b, 13c, 13d switch unit
14, 14a, 14b, 14c, 14d control unit
15 proxy unit
16 external server
21 instrument independent API
22 instrument independent API
23 instrument dependent API
24 instrument dependent API
25 instrument dependent API
26 API
27 instrument independent API
100 processor
101 memory
102 storage device
103 port
110 instrument dependent unit
111 hardware unit
112 hardware unit
113 software unit
114 OAM unit
114a embedded OAM engine
114b PLOAM engine
115 NE management-control unit
115a NE management unit
115b NE control
120 middleware unit
121 middleware unit
130 instrument independent app unit
131 extended function unit
131-1 extended function unit 131-2 extended function unit
131-3 extended function unit
132 basic function unit
133 management-control agent unit
140 EMS
150 instrument dependent app unit
160 external device
300 PON main signal processing function unit
310 PMD unit
320 PON access control function unit
330 maintenance-operation function unit
340 L2 main signal processing function unit
350 PON multicast function unit
360 power saving control function unit
370 frequency-time synchronization function unit
380 protection function unit

The invention claimed is:

1. A communication device comprising:
a first transmission-reception unit connected with a first optical line terminal;
a second transmission-reception unit being connected with a second optical line terminal replaceable with a third optical line terminal; and
a control unit, wherein the communication device executes any of processing in which
the first transmission-reception unit acquires a control signal having a destination at the second or third optical line terminal from the first optical line terminal,
the control unit forwards the control signal toward the second transmission-reception unit connected with the second or third optical line terminal, where the second transmission-reception unit to which a virtual local area network (VLAN) is same as a VLAN allocated to the first transmission-reception unit having acquired the control signal is allocated, and
the second transmission-reception unit forwards the control signal toward the second or third optical line terminal, and
processing in which
the second transmission-reception unit acquires a control signal having a destination at the first optical line terminal from the second or third optical line terminal,
the control unit forwards the control signal toward the first transmission-reception unit connected with the first optical line terminal, where the first transmission-reception unit to which a VLAN is same as a VLAN allocated to the second transmission-reception unit having acquired the control signal is allocated, and
the first transmission-reception unit forwards the control signal toward the first optical line terminal.

2. The communication device according to claim 1, wherein the control unit executes any of
processing of forwarding the control signal toward the second or third optical line terminal to which an identifier same as a virtual local area network (VLAN) identifier allocated to the first transmission-reception unit having acquired the control signal or the first optical line terminal is allocated or toward the second transmission-reception unit connected with the second or third optical line terminal to which an identifier same as the VLAN identifier allocated to the first transmission-reception unit or the first optical line terminal is allocated, based on the VLAN identifier, and
processing of forwarding the control signal toward the first optical line terminal to which a VLAN identifier same as a VLAN identifier allocated to the second transmission-reception unit having acquired the control signal or the second optical line terminal is allocated or toward the first transmission-reception unit connected with the first optical line terminal to which an identifier same as the VLAN identifier allocated to the second transmission-reception unit or the second optical line terminal is allocated, based on the VLAN identifier.

3. The communication device according to claim 1, wherein the control unit executes any of
processing of converting a virtual local area network (VLAN) identifier written to the control signal acquired by the first transmission-reception unit into a VLAN identifier of the second transmission-reception unit or the second optical line terminal and forwarding the control signal to which the converted VLAN identifier is written toward the second transmission-reception unit based on the converted VLAN identifier, and
processing of converting a VLAN identifier written to the control signal acquired by the second transmission-reception unit into a VLAN identifier of the first transmission-reception unit or the first optical line terminal and forwarding the control signal to which the converted VLAN identifier is written toward the first transmission-reception unit based on the converted VLAN identifier.

4. The communication device according to claim 1, wherein the control unit executes any of
processing of forwarding, to the third optical line terminal, a control signal to which an identifier having a destination at the second optical line terminal is written, and
processing of forwarding, to the first optical line terminal, a control signal to which an identifier having a destination at the first optical line terminal is written.

5. The communication device according to claim 1, wherein the control unit executes any of
processing of rewriting an identifier having a destination at the third optical line terminal to a control signal to which an identifier having a destination at the second optical line terminal is written and forwarding the control signal, and processing of rewriting an identifier having a destination at the third optical line terminal to a control signal to which an identifier having a destination at the first optical line terminal is written and forwarding the control signal.

6. The communication device according to claim 1, wherein the control unit notifies the third optical line terminal of an identifier of the second optical line terminal as an identifier of the third optical line terminal connected with the second transmission-reception unit, and
the third optical line terminal transmits the control signal to which the notified identifier of the second optical line terminal is written to the second transmission-reception unit.

7. A communication method executed by a communication device including a first transmission-reception unit, a second transmission-reception unit, and a control unit, the first transmission-reception unit being connected with a first optical line terminal, the second transmission-reception unit being connected with a second optical line terminal replaceable with a third optical line terminal, the communication method comprising:
a step of acquiring, by the first transmission-reception unit, a control signal having a destination at the second or third optical line terminal from the first optical line terminal;
a step of forwarding, by the control unit, the control signal toward the second transmission-reception unit connected with the second or third optical line terminal, where the second transmission-reception unit to which a virtual local area network (VLAN) is same as a VLAN allocated to the first transmission-reception unit having acquired the control signal is allocated; and a step of forwarding, by the second transmission-reception unit, the control signal to the second or third optical line terminal, or the communication method comprising:

a step of acquiring, by the second transmission-reception unit, a control signal having a destination at the first optical line terminal from the second or third optical line terminal;

a step of forwarding, by the control unit, the control signal toward the first transmission-reception unit connected with the first optical line terminal, where the first transmission-reception unit to which a VLAN is same as a VLAN allocated to the second transmission-reception unit having acquired the control signal is allocated; and a step of forwarding, by the first transmission-reception unit, the control signal to the first optical line terminal.

8. The communication method according to claim 7, further comprises forwarding, by the control unit, the control signal toward the second or third optical line terminal to which an identifier same as a virtual local area network (VLAN) identifier allocated to the first transmission-reception unit having acquired the control signal or the first optical line terminal is allocated or toward the second transmission-reception unit connected with the second or third optical line terminal to which an identifier same as the VLAN identifier allocated to the first transmission-reception unit or the first optical line terminal is allocated, based on the VLAN identifier, and forwarding, by the control unit, the control signal toward the first optical line terminal to which a VLAN identifier same as a VLAN identifier allocated to the second transmission-reception unit having acquired the control signal or the second optical line terminal is allocated or toward the first transmission-reception unit connected with the first optical line terminal to which an identifier same as the VLAN identifier allocated to the second transmission-reception unit or the second optical line terminal is allocated, based on the VLAN identifier.

9. The communication method according to claim 7, further comprises

Converting, by the control unit, a virtual local area network (VLAN) identifier written to the control signal acquired by the first transmission-reception unit into a VLAN identifier of the second transmission-reception unit or the second optical line terminal and forwarding the control signal to which the converted VLAN identifier is written toward the second transmission-reception unit based on the converted VLAN identifier, and Converting, by the control unit, a VLAN identifier written to the control signal acquired by the second transmission-reception unit into a VLAN identifier of the first transmission-reception unit or the first optical line terminal and forwarding the control signal to which the converted VLAN identifier is written toward the first transmission-reception unit based on the converted VLAN identifier.

10. The communication method according to claim 7, further comprises forwarding, by the control unit, a control signal to which an identifier having a destination at the second optical line terminal is written to the third optical line terminal, and forwarding, by the control unit, a control signal to which an identifier having a destination at the first optical line terminal is written to the first optical line terminal.

11. The communication method according to claim 7, further comprises rewriting, by the control unit, an identifier having a destination at the third optical line terminal to a control signal to which an identifier having a destination at the second optical line terminal is written and forwarding the control signal, and rewriting, by the control unit, an identifier having a destination at the third optical line terminal to a control signal to which an identifier having a destination at the first optical line terminal is written and forwarding the control signal.

12. The communication method according to claim 7, wherein the control unit notifies the third optical line terminal of an identifier of the second optical line terminal as an identifier of the third optical line terminal connected with the second transmission-reception unit, and the third optical line terminal transmits the control signal to which the notified identifier of the second optical line terminal is written to the second transmission-reception unit.

* * * * *